(12) United States Patent
Godfrey et al.

(10) Patent No.: US 8,291,212 B2
(45) Date of Patent: *Oct. 16, 2012

(54) SYSTEM AND METHOD FOR COMPRESSING SECURE E-MAIL FOR EXCHANGE WITH A MOBILE DATA COMMUNICATION DEVICE

(75) Inventors: James A. Godfrey, Waterloo (CA); Herbert A. Little, Waterloo (CA); Michael K. Brown, Waterloo (CA); Neil P. Adams, Waterloo (CA); Carl L. Cherry, Waterloo (CA); Timothy R. Tyhurst, Waterloo (CA); Michael S. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 64 days.

This patent is subject to a terminal disclaimer.

(21) Appl. No.: 12/691,204

(22) Filed: Jan. 21, 2010

(65) Prior Publication Data

US 2010/0122089 A1 May 13, 2010

Related U.S. Application Data

(63) Continuation of application No. 11/776,099, filed on Jul. 11, 2007, now Pat. No. 7,657,736, which is a continuation of application No. 10/480,613, filed as application No. PCT/CA02/00889 on Jun. 12, 2002, now Pat. No. 7,254,712.

(60) Provisional application No. 60/365,535, filed on Mar. 20, 2002, provisional application No. 60/297,681, filed on Jun. 12, 2001.

(51) Int. Cl.
*H04L 9/00* (2006.01)
*G06F 21/00* (2006.01)
*G06F 15/16* (2006.01)

(52) U.S. Cl. ......................... 713/150; 380/270; 709/206
(58) Field of Classification Search ....................... None
See application file for complete search history.

(56) References Cited

U.S. PATENT DOCUMENTS 4,028,500 A    6/1977    McClure et al.
(Continued)

FOREIGN PATENT DOCUMENTS

CA    2476914    2/2006
(Continued)

OTHER PUBLICATIONS

Levien: "Protecting Internet E-Mail From Prying Eyes," Data Communications, McGraw Hill, New York, US, vol. 25, No. 6 (May 1, 1996), pp. 117-118, 120, 122, XP 000587586.

(Continued)

*Primary Examiner* — Christopher Revak
(74) *Attorney, Agent, or Firm* — Bereskin & Parr LLP/S.E.N.C.R.L., s.r.l.

(57) ABSTRACT

A system and method are provided for pre-processing encrypted and/or signed messages at a host system before the message is transmitted to a wireless mobile communication device. The message is received at the host system from a message sender. There is a determination as to whether any of the message receivers has a corresponding wireless mobile communication device. For each message receiver that has a corresponding wireless mobile communication device: the message is processed so as to modify the message with respect to encryption and/or authentication aspect. The processed message is transmitted to a wireless mobile communication device that corresponds to the first message receiver. The system and method may include post-processing messages sent from a wireless mobile communications device to a remote system. Authentication and/or encryption message processing is performed upon the message. The processed message may then be sent through the remote system to one or more receivers.

23 Claims, 22 Drawing Sheets

U.S. PATENT DOCUMENTS

| | | | |
|---|---|---|---|
| 5,410,602 A | 4/1995 | Finkelstein et al. |
| 5,457,748 A | 10/1995 | Bergum et al. |
| 5,623,546 A | 4/1997 | Hardy et al. |
| 5,666,530 A | 9/1997 | Clark et al. |
| 5,710,922 A | 1/1998 | Alley |
| 5,727,202 A | 3/1998 | Kucala |
| 5,778,068 A | 7/1998 | Johnson et al. |
| 5,778,346 A | 7/1998 | Frid-Nielson |
| 5,812,671 A | 9/1998 | Ross |
| 5,870,030 A | 2/1999 | DeLuca et al. |
| 5,956,707 A | 9/1999 | Chu |
| 5,991,399 A | 11/1999 | Graunke et al. |
| 6,000,000 A | 12/1999 | Hawkins |
| 6,061,448 A | 5/2000 | Smith et al. |
| 6,073,237 A | 6/2000 | Ellison |
| 6,081,601 A | 6/2000 | Raivisto |
| 6,084,969 A | 7/2000 | Wright et al. |
| 6,085,323 A | 7/2000 | Shimizu et al. |
| 6,108,788 A | 8/2000 | Moses et al. |
| 6,119,228 A | 9/2000 | Angelo et al. |
| 6,125,369 A | 9/2000 | Wu |
| 6,209,098 B1 | 3/2001 | Davis |
| 6,219,694 B1 | 4/2001 | Lazaridis |
| 6,229,894 B1 | 5/2001 | Van Oorschot et al. |
| 6,230,186 B1 | 5/2001 | Yaker |
| 6,266,420 B1 | 7/2001 | Langford et al. |
| 6,266,775 B1 | 7/2001 | Kamba |
| 6,289,105 B1 | 9/2001 | Murota |
| 6,301,658 B1 | 10/2001 | Koehler |
| 6,313,732 B1 | 11/2001 | DeLuca et al. |
| 6,348,972 B1 | 2/2002 | Taniguchi et al. |
| 6,389,455 B1 | 5/2002 | Fuisz |
| 6,531,985 B1 | 3/2003 | Jones |
| 6,564,320 B1 | 5/2003 | de Silva et al. |
| 6,591,367 B1 | 7/2003 | Kobata et al. |
| 6,661,927 B1 | 12/2003 | Suarez et al. |
| 6,697,942 B1 | 2/2004 | L'Heureux et al. |
| 6,708,200 B1 | 3/2004 | Ura |
| 6,732,144 B1 | 5/2004 | Kizu et al. |
| 6,744,874 B2 | 6/2004 | Wu |
| 6,745,024 B1 | 6/2004 | DeJaco et al. |
| 6,779,115 B1 | 8/2004 | Naim |
| 6,819,766 B1 | 11/2004 | Weidong |
| 6,829,357 B1 | 12/2004 | Alrabady et al. |
| 6,904,521 B1 | 6/2005 | Jivsov |
| 6,918,038 B1 | 7/2005 | Smith et al. |
| 6,925,568 B1 | 8/2005 | Heinonen |
| 6,931,532 B1 | 8/2005 | Davis et al. |
| 6,983,367 B1 | 1/2006 | Go et al. |
| 6,993,137 B2 | 1/2006 | Franksdonk |
| 6,996,720 B1 | 2/2006 | DeMello et al. |
| 7,003,667 B1 | 2/2006 | Slick et al. |
| 7,020,708 B2 | 3/2006 | Nelson et al. |
| 7,032,240 B1 | 4/2006 | Cronce et al. |
| 7,113,927 B1 | 9/2006 | Tanaka et al. |
| 7,127,604 B2 | 10/2006 | Lide et al. |
| 7,171,552 B1 | 1/2007 | Bell |
| 7,200,749 B2 | 4/2007 | Wheeler et al. |
| 7,228,418 B1 | 6/2007 | Girault |
| 7,254,712 B2 * | 8/2007 | Godfrey et al. ............... 713/176 |
| 7,299,502 B2 | 11/2007 | Schmeling |
| 7,529,374 B2 | 5/2009 | Huttunen |
| 7,546,453 B2 | 6/2009 | Little et al. |
| 7,613,182 B2 | 11/2009 | Lecomte et al. |
| 7,653,815 B2 | 1/2010 | Godfrey |
| 7,657,736 B2 * | 2/2010 | Godfrey et al. ............... 713/150 |
| 7,827,406 B2 | 11/2010 | Brown |
| 8,205,084 B2 | 6/2012 | Godfrey et al. |
| 2001/0011308 A1 | 8/2001 | Clark et al. |
| 2001/0046307 A1 | 11/2001 | Wong |
| 2001/0050990 A1 | 12/2001 | Sudia |
| 2002/0007453 A1 | 1/2002 | Nemovicher |
| 2002/0032861 A1 | 3/2002 | Azuma |
| 2002/0035685 A1 | 3/2002 | Ono et al. |
| 2002/0035687 A1 | 3/2002 | Skantze |
| 2002/0038420 A1 | 3/2002 | Collins et al. |
| 2002/0051544 A1 | 5/2002 | Kikuchi et al. |
| 2002/0053023 A1 | 5/2002 | Patterson et al. |
| 2002/0053032 A1 | 5/2002 | Dowling et al. |
| 2002/0059375 A1 | 5/2002 | Pivowar et al. |
| 2002/0059383 A1 | 5/2002 | Katsuda |
| 2002/0080752 A1 | 6/2002 | Johansson et al. |
| 2002/0099766 A1 | 7/2002 | Tuli |
| 2002/0147905 A1 | 10/2002 | Perlman |
| 2002/0165967 A1 | 11/2002 | Morgan |
| 2002/0169954 A1 | 11/2002 | Bandini et al. |
| 2002/0173295 A1 | 11/2002 | Nykanen et al. |
| 2002/0176067 A1 | 11/2002 | Charbon |
| 2003/0002671 A1 | 1/2003 | Inchalik et al. |
| 2003/0074555 A1 | 4/2003 | Fahn et al. |
| 2003/0126085 A1 | 7/2003 | Srinivasan |
| 2003/0172122 A1 | 9/2003 | Little et al. |
| 2003/0198350 A1 | 10/2003 | Foster et al. |
| 2003/0212888 A1 | 11/2003 | Wildish et al. |
| 2004/0083364 A1 | 4/2004 | Andreaux et al. |
| 2004/0093493 A1 | 5/2004 | Bisbee et al. |
| 2004/0133520 A1 | 7/2004 | Callas et al. |
| 2004/0133775 A1 | 7/2004 | Callas et al. |
| 2004/0196978 A1 | 10/2004 | Godfrey et al. |
| 2004/0202327 A1 | 10/2004 | Little |
| 2004/0205248 A1 | 10/2004 | Little et al. |
| 2004/0205330 A1 * | 10/2004 | Godfrey et al. ............... 713/150 |
| 2005/0005097 A1 | 1/2005 | Murakawa |
| 2005/0039100 A1 | 2/2005 | Bade et al. |
| 2005/0114671 A1 | 5/2005 | Little et al. |
| 2005/0148323 A1 | 7/2005 | Little et al. |
| 2005/0149442 A1 | 7/2005 | Adams et al. |
| 2005/0163320 A1 | 7/2005 | Brown et al. |
| 2005/0188219 A1 | 8/2005 | Annicet et al. |
| 2005/0203855 A1 | 9/2005 | Malcolm |
| 2005/0210289 A1 | 9/2005 | Brown |
| 2005/0222991 A1 | 10/2005 | Ikenoya |
| 2005/0246763 A1 | 11/2005 | Corcoran et al. |
| 2006/0015722 A1 | 1/2006 | Rowan et al. |
| 2006/0036848 A1 | 2/2006 | Brown et al. |
| 2006/0036849 A1 | 2/2006 | Brown et al. |
| 2006/0036865 A1 | 2/2006 | Brown et al. |
| 2006/0059332 A1 | 3/2006 | Adams et al. |
| 2007/0083749 A1 | 4/2007 | Fang |
| 2007/0118874 A1 | 5/2007 | Adams et al. |
| 2007/0123307 A1 | 5/2007 | Adams et al. |
| 2007/0165844 A1 | 7/2007 | Little et al. |
| 2008/0016359 A1 | 1/2008 | Godfrey et al. |
| 2010/0115264 A1 * | 5/2010 | Godfrey et al. ............... 713/153 |
| 2010/0122089 A1 | 5/2010 | Godfrey |
| 2010/0124333 A1 * | 5/2010 | Godfrey et al. ............... 380/270 |

FOREIGN PATENT DOCUMENTS

| | | |
|---|---|---|
| CA | 2450631 | 12/2010 |
| CN | ZL02815759.1 | 1/2012 |
| EP | 0500222 | 8/1992 |
| EP | 0500245 | 8/1992 |
| EP | 0841770 | 5/1998 |
| EP | 0942568 | 9/1999 |
| EP | 1096725 | 5/2001 |
| EP | 1096727 | 5/2001 |
| EP | 1119132 | 7/2001 |
| EP | 1580953 | 9/2005 |
| EP | 1806683 | 7/2007 |
| GB | 2328125 | 2/1999 |
| JP | 2000-10477 | 6/1994 |
| JP | 06-276221 | 9/1994 |
| JP | 07-162407 | 6/1995 |
| JP | 7-509333 | 10/1995 |
| JP | 8-251221 | 9/1996 |
| JP | 09-046330 | 2/1997 |
| JP | 10-22992 | 1/1998 |
| JP | 10-107832 | 4/1998 |
| JP | 11-272581 | 10/1999 |
| JP | 11-272582 | 10/1999 |
| JP | 2001-69137 | 3/2001 |
| JP | 2001-103571 | 4/2001 |
| JP | 2001-197055 | 7/2001 |
| JP | 2001-237821 | 8/2001 |
| JP | 2002-535884 | 10/2002 |
| JP | 2004-048139 | 2/2004 |
| KR | 1020030059303 | 7/2003 |

| | | |
|---|---|---|
| WO | 94/12938 | 6/1994 |
| WO | 96/36934 | 11/1996 |
| WO | 9741661 | 11/1997 |
| WO | 9834374 | 8/1998 |
| WO | 99/05814 | 2/1999 |
| WO | 99/06900 | 2/1999 |
| WO | 99/17564 | 4/1999 |
| WO | 99/27678 | 6/1999 |
| WO | 99/63709 | 12/1999 |
| WO | 99/64946 | 12/1999 |
| WO | 00/31931 | 6/2000 |
| WO | 00/72506 | 11/2000 |
| WO | 0069114 | 11/2000 |
| WO | 01/01644 | 1/2001 |
| WO | 01/16933 | 3/2001 |
| WO | 0124434 | 4/2001 |
| WO | 01/41353 | 6/2001 |
| WO | 01-63386 | 8/2001 |
| WO | 0171608 | 9/2001 |
| WO | 01/78491 | 10/2001 |
| WO | 02-101580 | 12/2002 |
| WO | 02/102009 | 12/2002 |
| WO | 03/005636 | 1/2003 |
| WO | 03/009561 | 1/2003 |
| WO | 03/079627 | 9/2003 |
| WO | 03/079628 | 9/2003 |

OTHER PUBLICATIONS

Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.
Gong et al.: "Multicast Security and its Extension to a Mobile Environment," SRI International, Computer Science Laboratory, J.C. Baltzer AG, Science Publishers, Wireless Networks I (1995) pp. 281-295.
Brown I., et al.: "A Proxy Approach to E-Mail Security", Software Practice & Experience, John Wiley & Sons Ltd. Chichester, GB, vol. 29, No. 12, Oct. 1999, pp. 1049-1060, XP000852351.
Subramanyam V., et al.: "Security in mobile systems", Reliable Distributed Systems, 1998 Proceedings. 17th IEEE Symposium on W. Lafayette, IN, USA, Oct. 20-23, 1998, Los Alamitos, CA, USA, IEEE Comput. Soc., US, Oct. 20, 1998, pp. 407-412, XP010319125.
International Search Report of Application No. PCT/CA02/00890, date of mailing Dec. 23, 2002—12 pgs.
Lai, M.K.E., et al.: "A Mobile Subscriber Proxy Preserving Writer-to-Reader Message Security", Military Communications Conference, 1996, Milcom '96, Conference Proceedings, IEEE McLean, VA, USA Oct. 21-24, 1996, New York, NY, USA, IEEE, US, Oct. 21, 1996, pp. 461-467, XP010203896.
Cole R., et al: "An Acrhitecture for a Mobile OSI Mail Access System", IEEE Journal on Selected Areas in Communications, IEEE Inc., New York, US, vol. 7, No. 2, Feb. 1989, pp. 249-256, XP000904914.
Harris A.: "Content Privacy and Content Security Working Together", Internet Article. Content Technologies White Paper, 'Online! Sep. 1999, XP002223158, pp. 8-9.
Torvinen V.: "Wireless PKI: Fundamentals", Internet Article, Radicchio White Paper, 'Online! 2000, XP002223159, pp. 12-13.
Mambo M., et al: "Proxy Signatures: Delegation of the Power to Sign Messages" IEICE Transactions on Fundamentals of Electronics, Communications and Computer Sciences, IEICE Tokyo, JP, vol. E79-A, No. 9, Sep. 1, 1996, pp. 1338-1353, XP000679624.
Brown M., et al.: "PGP in Constrained Wireless Devices", Proceedings of the 9th Usenix Security Symposium, Denver, CO, Aug. 14-17, 2000, XP002210575.
Stallings, W.: "S/MIME: E-Mail Gets Secure". Byte, McGraw-Hill Inc., St. Peterborough, US, vol. 23, No. 7, Jul. 1998, pp. 41-42, XP000774260.
Crocker S. et al.: "MIME Object Security Services; rfc1848.text". IETF Standard, Internet Engineering Task Force, IETF, CH, Oct. 1995, XP015007633.

Katsuro Inaya, et al., "Use Windows CE Now", ASCII, Oct. 1, 1999, vol. 23, No. 10, pp. 266-285.
Hiroyuki Sawano, Create a Secure Electronic Mail Environment with S/MIME!, @IT Security & Trust, May 30, 2001, URL. http://www.atmarkit.co.jp/fsecurity/special/04smime/smime01.html.
European Supplementary Search Report. Application No. 05826460.7, Feb. 14, 2008.
European Examination Report. Application No. 05826460.7, Apr. 4, 2008.
PCT International Search Report and Written Opinion of the International Searching Authority, International App. No. PCT/CA2005/D01956, Jul. 29, 2006.
Blom et al. "Conversational IP Multimedia Security", 4th International Workshop on Mobile and Wireless Communications Network, Sep. 9-11, 2002, pp. 147-151.
Fumy et al. Principles of Key Management, IEEE Journal on Selected Areas in Communications, VDI, 11, No. 5, Jun. 1999, pp. 785-793.
Eskicioglu et al. "A Key Transport Protocol Based on Secret Sharing Applications to Information Security", IEEE Transactions on Consumer Electronics, vol. 46, No. 4, Nov. 2002, pp. 816-824.
Australian Examiner's Report issued on Oct. 12, 2006 for Australian patent application No. 2005204223.
Berson T et al: "Cryptography as a network service" 8th Annual Symposium on Network and Distributed System Security. (NDSS' 01) Internet Soc Reston, VA, USA, Feb. 7-Feb. 9, 2001 pp. 1-12, XP002551706 *the whole document*.
Butrico M et al: "Enterprise data access from mobile computers: an end-to-end story" Research Issues in Data Engineering, 2000. Ride 2000. Proceedings. Tenth International Workshop on San Diego, CA, USA Feb. 28-29, 2000, Los Alamitos, CA, USA, IEEE Comput. Soc, US, Feb. 28, 2000, pp. 9-16, XP010377083.
Chadwick, D.W. et al. "Modifying LDAP to Support X.509-based PKIs", In Seventeenth Annual IFIP WG 11.3 Working Conference on Database and Applications Security at Estes Park, Colorado, Aug. 2003.
Chinese First Office Action (English translation). Application No. 200510095984.7. Dated: Nov. 21, 2008.
Deroest J.: "Ubiquitous Mobile Computing" Sunexpert Magazine, 'Online! Jul. 1998, pp. 54-56, SP002213003 Retreived from the Internet: <URL:http://swexpert.com/C8/SE.C8.JUL.98.pdf>'retreived on Sep. 10, 2002!
EPO Communication Pursuant to Article 96(2) EPC, issued by the European Patent Office on Dec. 6, 2006 in connection with application No. 04104240.9.
Hämetvaara, Vesa. "Modifying LDAP to Support X.509-based PKIs", in Seventeenth Annual IFIP WG 11.3 Working Conference on Database and Applications Security at Estes Park, Colorado, Aug. 2003.
Housley, R et al. "Internet X.509 Public Key Infrastructure Certificate and CRL Profile (RFC 2459)", Jan. 1999.
Indian Examination Letter. Application No. 2290/DEL/2005. Dated: Apr. 13, 2007.
Inquiry issued by the Japanese Patent Office on Mar. 13, 2009 for Japanese Patent Application No. 2003-504272.
International Search Report of Application No. PCT/CA02/00889, date of mailing Dec. 13, 2002, 10 pages.
ITU-T, "Information technology—Open systems interconnection—The Directory: Public-key and attribute certificate frameworks", Mar. 2000.
Jin Jing et al: "Client-server computing in mobile environments" ACM Computing Surveys, Jun. 1999, ACM, USA, vol. 31, No. 2, pp. 117-157, XP002212945.
Korean Decision for Final Rejection (English translation). Application No. 10-2005-0081103. Dated: Apr. 12, 2007.
Myers, M. et al. "Certificate Management Messages over CMS (RFC 2797)", Apr. 2000.
Myers, M. et al., X.509 Internet Public Key Infrastructure Online Certificate Status Protocol—OCSP, RFC2560 (Jun. 1999).
Nakajima T et al: "Adaptive continuous media applications in mobile computing environments" Multimedia Computing Systems '97. Proceedings., IEEE International Conference on Ottawa, Ont., Canada Jun. 3-6, 1997, Los Alamitos, CA, USA, IEEE Comput. Soc. US, Jun. 3, 1997, pp. 152-160, XP010239184.

Notice of Reason for Rejection issued by the Japanese Patent Office on Feb. 16, 2009 for Japanese Patent Application No. 2005-253511.
Notice of Reason for Rejection issued by the Japanese Patent Office on Jan. 5, 2010 for Japanese Patent Application No. 2005-253511.
Notice of Reason for Rejection issued by the Japanese Patent Office on May 12, 2006 for Japanese Patent Application No. 2003-504272.
Office Action issued by the USPTO on Apr. 15, 2009 for U.S. Appl. No. 11/259,372.
Office Action issued by the USPTO on Apr. 27, 2009 for U.S. Appl. No. 11/291,178.
Office Action issued by the USPTO on Jan. 13, 2009 for U.S. Appl. No. 10/914,634.
Office Action issued by the USPTO on Jul. 15, 2008 for U.S. Appl. No. 10/931,983.
Office Action issued by the USPTO on Nov. 13, 2007 for U.S. Appl. No. 10/931,983.
Office Action issued by the Canadian Intellectual Property Office on Jul. 13, 2009 for Canadian Patent Appl. No. 2,517,211.
Office Action issued by the USPTO on Oct. 29, 2009 for U.S. Appl. No. 11/259,372.
Ramsdell, D. et al. "Secure/Multipurpose Internet Mail Extensions (S/MIME) Version 3.1 Certificate Handling (RFC 3850)", Jul. 2004.
Research in Motion Limited, BlackBerry Security with the S/MIME Support Package, version 1.5, Dec. 17, 2003.
Russell S: "Fast checking of individual certificate revocation on small systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US, Dec. 6, 1999, pp. 249-255, XP010368617.
Singapore Examination Report. Application No. 200505340-0. Dated: Sep. 19, 2006.
Wasley D.L. et al: "Improving Digital Credential Management in Browsers" Internet Article. HEPKI-Tag Recommendation, 'Online! Jul. 21, 2000, XP002213004 Retrieved from the Internet: <URL:http://middleware.internet2.edu/hepk i -tag/HEPKI-TAG-Certs-Browser-03.pdf> 'retrieved on Sep. 10, 2002.
Written Opinion issued on Dec. 23, 2005 by the Australian Patent Office for Singapore patent application No. 200505624-7.
Zollner J: "Gateway to overcome incompatibilities of security mechanisms" Reliable Distributed Systems, 1999. Proceedings of the 19th IEEE Sympo Sium on Lausanne, Switzerland Oct. 19-22, 1999, Los Alamitos, Cal, USA, IEEE Comput. Soc, US Oct. 19, 1999, pp. 372-377, XP010357040 ISBN: 978-0-7695-0290-8 *the whole document*.
Office Action issued by the USPTO on Jun. 23, 2010 for U.S. Appl. No. 10/486,406.
Office Action issued by the USPTO on Aug. 11, 2010 for U.S. Appl. No. 12/480,841.
Office Action for Japanese Application No. 2003-504619, dated Feb. 22, 2007 (mailed Feb. 26, 2007).
Office Action for Japanese Application No. 2003-504619, dated Mar. 18, 2008 (mailed Mar. 22, 2008).
Office Action for Japanese Application No. 2003-504619, dated Dec. 1, 2008 (mailed Dec. 3, 2008).
Certificate of Patent, Japanese Application No. 2003-504619, issued Feb. 19, 2010.
Office Action from USPTO dated Oct. 4, 2006 for U.S. Appl. No. 10/480,613.
Response to Office Action from USPTO dated Jan. 3, 2007 for U.S. Appl. No. 10/480,613.
Notice of Allowance from USPTO dated Mar. 30, 2007 for U.S. Appl. No. 10/480,613.
Office Action from USPTO dated Aug. 7, 2008 for U.S. Appl. No. 11/776,099.
Response to Office Action from USPTO dated Jan. 7, 2009 for U.S. Appl. No. 11/776,099.
Notice of Allowance from USPTO dated May 15, 2009 for U.S. Appl. No. 11/776,099.
Request for Continued Examination (RCE) dated Aug. 17, 2009 for U.S. Appl. No. 11/776,099.
Notice of Allowance from USPTO dated Sep. 10, 2009 for U.S. Appl. No. 11/776,099.
First Office Action, Chinese Application No. 02815759.1, dated Dec. 26, 2008.
Second Office Action, Chinese Application No. 02815759.1, dated Aug. 6, 2010.
Third Office Action, Chinese Application No. 02815759.1, dated May 18, 2011.
Office Action from CIPO, Canadian Application No. 2,450,601 dated Jan. 6, 2009.
Office Action from CIPO, Canadian Application No. 2,450,601 dated Jul. 27, 2011.
EPO Communication Pursuant to Article 96(2) EPC, in connection with Application No. 02734959.6-2201, dated Apr. 28, 2004.
EPO Communication Pursuant to Article 96(2) EPC, in connection with Application No. 02734959.6-2201, dated Jul. 26, 2005.
Summons to Attend Oral Proceedings Pursuant to Rule 115(1) EPC, in connection with Application No. 02734959.6-2201, dated May 8, 2009.
Provision of the minutes in accordance with Rule 124(4) EPC, in connection with Application No. 02734959.6-2201, dated Aug. 20, 2009.
Decision to refuse a European Patent application, in connection with Application No. 02734959.6-2201, dated Aug. 20, 2009.
Extended European Search Report Pursuant to Rule 62 EPC, in connection with Application No. 09166522.4-2201, dated Feb. 8, 2010.
EPO Communication Pursuant to Rule 70(2) EPC and reference to Rule 39(1) EPC), in connection with Application No. 09166522.4-2201, dated Mar. 15, 2010.
Office Action for Japanese Application No. 2003-504294, dated May 17, 2006 (mailed May 19, 2006).
Office Action for Japanese Application No. 2003-504294, dated Sep. 25, 2006 (mailed Sept. 27, 2006).
Notice of Allowance, Japanese Application No. 2003-504294, issued Feb. 2, 2007.
Office Action, Korean Application No. 2003-7016486, dated May 26, 2005.
Notice of Allowance (Decision for Patent), Korean Application No. 2003-7016486, dated Dec. 28, 2005.
Intimation of Grant, Indian Application No. 2174/DELNP/2003 dated Mar. 6, 2006.
Written Opinion issued on Jan. 21, 2003 by European Patent Office for PCT/CA02/00889.
Written Opinion issued on May 26, 2003 by European Patent Office for PCT/CA02/00889.
International Preliminary Examination Report for PCT/CA02/00889 dated Sep. 11, 2003.
Written Opinion issued on Jan. 21, 2003 by European Patent Office for PCT/CA02/00890.
Written Opinion issued on May 27, 2003 by European Patent Office for PCT/CA02/00890.
International Preliminary Examination Report for PCT/CA02/00890 dated Sep. 17, 2003.
Co-pending U.S. Appl. No. 10/480,613 entitled "System and Method for Compressing Secure E-Mail for Exchange With a Mobile Data Communication Device", filed Dec. 11, 2003.
Co-pending U.S. Appl. No. 11/776,099 entitled "System and Method for Compressing Secure E-Mail for Exchange With a Mobile Data Communication Device", filed Jul. 11, 2007.
Co-pending U.S. Appl. No. 12/693,021 entitled "System and Method for Processing Encoded Messages for Exchange with a Mobile Data Communications Device", filed Jan. 25, 2010.
Co-pending U.S. Appl. No. 10/480,514 entitled "System and Method for Processing Encoded Messages for Exchange With a Mobile Data Communication Device", filed Dec. 11, 2003.
Co-pending U.S. Appl. No. 11/089,869 entitled "System and Method for Processing Encoded Messages for Exchange With a Mobile Data Communication Device", filed Mar. 25, 2005.
Co-pending U.S. Appl. No. 12/686,046 entitled "System and Method for Processing Encoded Messages for Exchange With a Mobile Data Communication Device", filed Nov. 12, 2010.
Co-pending U.S. Appl. No. 12/916,929 entitled "System and Method for Processing Encoded Messages for Exchange With a Mobile Data Communication Device", filed Jan. 11, 2010.

Notification of Grant, Chinese Application No. 02815759.1, dated Oct. 27, 2011.
Office Action from USPTO dated Dec. 1, 2011 for U.S. Appl. No. 12/916,929.
EP Summons to Oral Proceedings in connection with Application No. 02744963.6-2201, dated Dec. 15, 2011.
Certificate of Invention, Chinese Application No. 02815759.1, dated Jan. 25, 2012.
EPO Communication Pursuant to Article 94(3) EPC, in connection with Application No. 09166522.4-2201, dated Feb. 8, 2012.
Office Action Response dated Dec. 22, 2011, for U.S. Appl. No. 12/686,046.
USPTO Office Action Response dated Feb. 24, 2012 for U.S. Appl. No. 12/916,929.
Dusse et al., "S/MIME Version 2 Message Specification," Mar. 1998, pp. 1-37.
Dusse et al.: "S/MIME Version 2 Certificate Handling," Database IETF RFC Online IETF: RFC 2312, Mar. 1998, pp. 1-20 (Chapter 2.1, Chapter 4.1), XP002220385.
Encrypt Pre-shared Keys in Cisco IOS Router Configuration Example, Document 1D 46420 Cisco Systems, Internet Address: htto://www.cisco.com/en/US/tech/tk5S3/tk3721technologies_configuration_example09186a00801f2336.shtml.
Kiely, Don, Sal Server 2005 Secures Your Data Like Never Before, Sep. 29, 2005. Internet Address: http://www.devx.com/codemaglArticle/29351?trk=DXESS_DB.
Kotzanikoloau et al. "Hybrid Key Establishment for Multiphase Self-Organized Sensor Networks", 6" IEEE International Symposium on a World of Wireless Mobile and Multimedia Networks, Jun. 13-16, 2005, pp. 581-587.
Stale Schumacher: "AutoPGP FAQ, Version 1," Internet Newsgroup, 'Online (Apr. 19, 1994), XP002230742.
Office Action from USPTO dated May 15, 2007 for U.S. Appl. No. 10/480,514 (Requirement for Restriction/ Election).
Response to Office Action from USPTO dated Nov. 14, 2007 for U.S. Appl. No. 10/480,514.
Office Action from USPTO dated Jan. 10, 2008 for U.S. Appl. No. 10/480,514 (Requirement for Restriction/ Election).
Response to Office Action from USPTO dated May 12, 2008 for U.S. Appl. No. 10/480,514.
Office Action from USPTO dated Jul. 24, 2008 for U.S. Appl. No. 10/480,514.
Response and RCE to Office Action from USPTO dated Jan. 26, 2009 for U.S. Appl. No. 10/480,514.
Research in Motion Limited, Blackberry Security White Paper Release 4.0 2005 Internet Address: http://blackberry.comlknowledgecenterpubliclivelink.exe?func=II&objId=S2S044&objAction=browse&sort=name.
Office Action from USPTO dated Mar. 4, 2009 for U.S. Appl. No. 10/480,514.
Response to Office Action from USPTO dated Jun. 24, 2009 for U.S. Appl. No. 10/480,514.
Notice of Allowance from USPTO dated Sep. 10, 2009 for U.S. Appl. No. 10/480,514.
Office Action from USPTO dated Feb. 3, 2009 for U.S. Appl. No. 11/089,869.
Response to Office Action from USPTO dated Jun. 4, 2009 for U.S. Appl. No. 11/089,869.
Office Action from USPTO dated Sep. 18, 2009 for U.S. Appl. No. 11/089,869.
Response to Office Action from USPTO dated Dec. 18, 2009 for U.S. Appl. No. 11/089,869.
Notice of Allowance from USPTO dated Mar. 17, 2010 for U.S. Appl. No. 11/089,869.
Request for Continued Examination (RCE) dated May 21, 2010 for U.S. Appl. No. 11/089,869.
Notice of Allowance from USPTO dated Jun. 28, 2010 for U.S. Appl. No. 11/089,869.
Office Action from CIPO, Canadian Application No. 2,450,631, dated Feb. 24, 2009.
Office Action from USPTO dated Sep. 29, 2011 for U.S. Appl. No. 12/686,046.
Notice of Allowance, Canadian Application No. 2,450,631, dated Apr. 5, 2011.
EPO Communication Pursuant to Article 96(2) EPC, in connection with Application No. 02744963.6-2201 dated Mar. 8, 2005.
Policht, Martin, Sal Server 2005 Security—Part 3 Encryption, Database Journal Internet Address: http//www.databasejournal.com/features/mssql/article.php/34S3931.
First Examination Report, Indian Application No. 2174/DELNP/2003, dated Jun. 3, 2005.
EPO Communication Pursuant to Article 94(3) EPC, in connection with Application No. 02744963.6-2201, dated Feb. 24, 2010.
Hoffman: "Enhanced Services for S/MIME," Database IETF RFC Online IETF;RFC 2634, Jun. 1999, pp. 1-58 (Chapter 3, pp. 24-32), XP002220386.
First Office Action, Chinese Application No. 02815485.1, dated Jun. 19, 2009.
Intimation of Grant, Indian Application No. 2176/DELNP/2003, dated May 19, 2005.
Notice of Allowance (Notification for the Grant of Invention), Chinese Application No. 02815485.1, dated Sep. 14, 2010.
Office Action, Korean Application No. 2003-7016343, dated Aug. 23, 2005.
Notice of Allowance, Israeli Application No. 159342, dated Feb. 13, 2008.
Notice of Allowance (Decision for Patent), Final Office Action, Korean Application No. 2003-7016343, dated Feb. 23, 2006.
Certificate of Grant of Patent, Singapore Patent Application No. 200307398-8, dated Dec. 30, 2005.
Notification Prior to Examination, Israeli Application No. 159340, dated Jun. 24, 2007.
Office Action, Israeli Application No. 159340, dated Mar. 4, 2008.
Office Action, Israeli Application No. 159340, dated Jul. 19, 2010.
Office Action, Israeli Application No. 159340, dated Sep. 1, 2009.
Notification Prior to Examination, Israeli Application No. 159342, dated Jun. 24, 2007.
Certificate of Patent, Japanese Application No. 2003-504294, issued Mar. 7, 2007.
Certificate of Grant of Patent, Singapore Patent Application No. 200307400-2, dated Dec. 30, 2005.
Notice of Allowance, Israeli Application. 159340, dated Oct. 27, 2010.
First Examination Report, Indian Application No. 2176/DELPN/2003, dated May 6, 2004.
Applicant Interview Summary dated Mar. 15, 2012 for U.S. Appl. No. 12/686,046.
Notice of Allowance dated Mar. 20, 2012 for U.S. Appl. No. 12/686,046.
Written Submissions in Preparation for Oral Proceedings, European Application No. 02744963.6, dated Mar. 6, 2012.
Interview Summary, European Application No. 02744963.6, dated Apr. 18, 2012.
Minutes and Minutes of the Oral Proceedings, European Application No. 02744963.6, dated May 23, 2012.
Decision to Refuse the Application, European Application No. 02744963.6, dated May 23, 2012.
Response, in connection with European Application No. 09166522.4-2201, dated Jun. 6, 2012.
USPTO Notice of Non-Responsive Amendment dated May 16, 2012 for U.S. Appl. No. 12/916,929.
Response to Notice of Non-Responsive Amendment dated May 25, 2012 for U.S. Appl. No. 12/916,929.
Office Action from USPTO dated Jun. 18, 2012 for U.S. Appl. No. 12/693,021.
Amendment After Allowance dated Apr. 20, 2012 for U.S. Appl. No. 12/686,046.
Response to Amendment dated May 4, 2012 for U.S. Appl. No. 12/686,046.
Notice of Allowance dated Jul. 9, 2012, Canadian Application No. 2,450,601.
Final Office Action dated Aug. 23, 2012, U.S. Appl. No. 12/916,929.

* cited by examiner

SYSTEM AND METHOD FOR COMPRESSING SECURE E-MAIL FOR EXCHANGE WITH A MOBILE DATA COMMUNICATION DEVICE

CROSS-REFERENCE TO RELATED APPLICATIONS

This application is a continuation of U.S. application Ser. No. 11/776,099 (entitled "System and Method for Compressing Secure E-Mail for Exchange with a Mobile Data Communication Device" filed Jul. 11, 2007), now issued as U.S. Pat. No. 7,657,736, which is a continuation of U.S. application Ser. No. 10/480,613 (entitled "System and Method for Compressing Secure E-mail for Exchange with a Mobile Data Communication Device" filed Dec. 11, 2003), now issued as U.S. Pat. No. 7,254,712, which is a national stage entry of PCT International Application No. PCT/CA02/00889 (entitled "System and Method for Compressing Secure E-Mail for Exchange with a Mobile Data Communication Device" filed Jun. 12, 2002), which claims the benefit of U.S. provisional application Ser. No. 60/297,681 (entitled "An Advanced System and Method for Compressing Secure E-Mail for Exchange with a Mobile Data Communication Device" filed Jun. 12, 2001) and U.S. provisional application Ser. No. 60/365,535 (entitled "System and Method for Compressing Secure E-Mail for Exchange with a Mobile Data Communication Device" filed Mar. 20, 2002). By this reference, the full disclosures, including the drawings, of all of these applications are incorporated herein.

BACKGROUND OF THE INVENTION

1. Field of the Invention

The present invention relates generally to secure electronic messaging and in particular to an advanced system and method of exchanging secure e-mail messages between a host system and a mobile communications device ("mobile device") via a wireless communications network operable with the mobile device.

2. Description of the Related Art

There are many known solutions for exchanging information between host systems and mobile devices. However, these systems tend to follow simple encoding methods for delivering a shortened version of the original message to the mobile device, especially when dealing with authentication and/or encryption. This limits the use of mobile devices in dealing with such messages.

SUMMARY

In accordance with the teachings provided herein, a system and method are provided for pre-processing encrypted and/or signed messages at a host system before the message is transmitted to a wireless mobile communication device. The message is received at the host system from a message sender. There is a determination as to whether any of the message receivers has a corresponding wireless mobile communication device. For each message receiver that has a corresponding wireless mobile communication device: the message is processed so as to modify the message with respect to encryption and/or authentication aspect. The processed message is transmitted to a wireless mobile communication device that corresponds to the first message receiver.

The system and method may include post-processing messages sent from a wireless mobile communications device to a remote system. Authentication and/or encryption message processing is performed upon the message. The processed message may then be sent through the remote system to one or more receivers.

DETAILED DESCRIPTION

Figure 1:
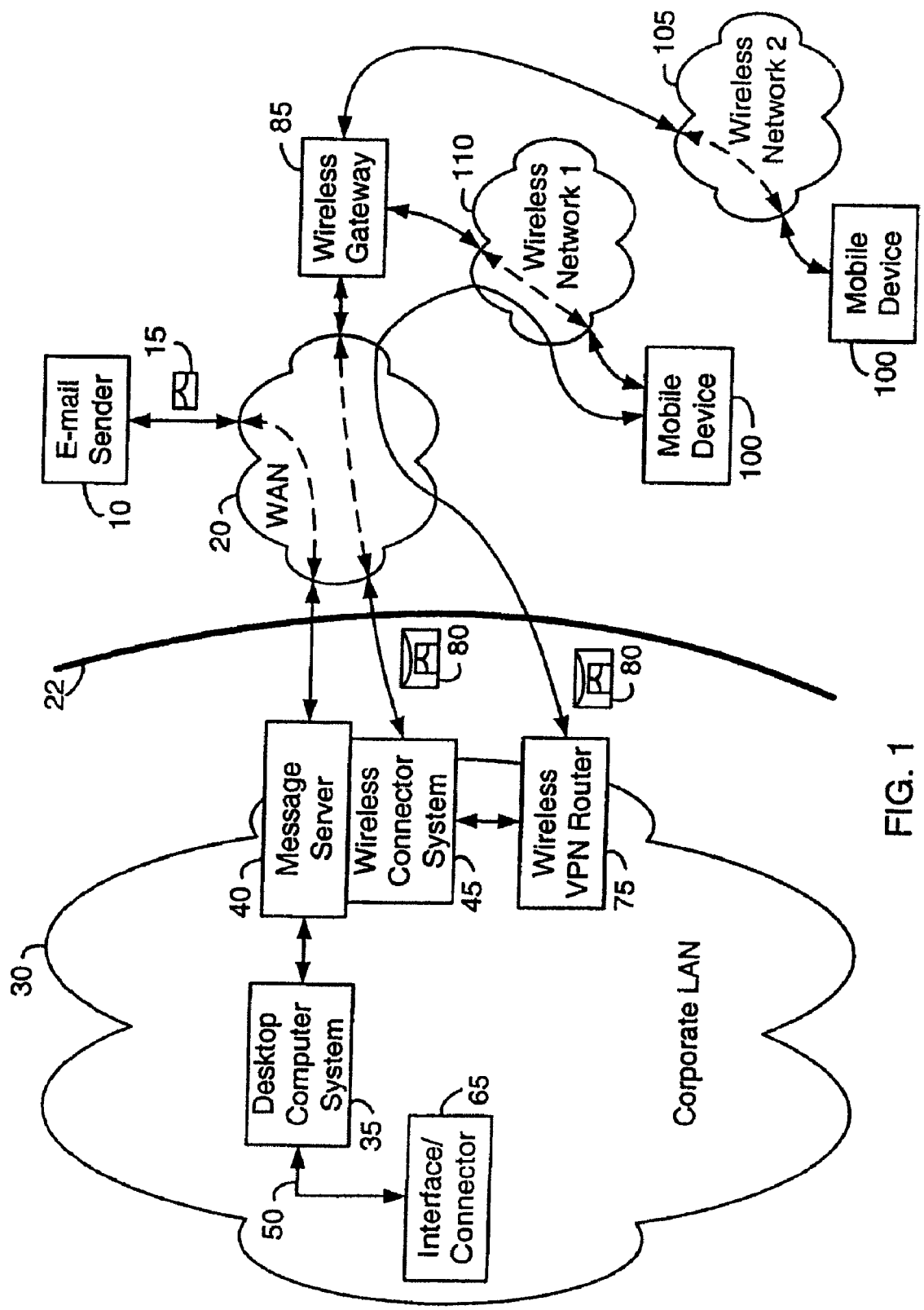
FIG. 1 is a block diagram showing an overview of an environment in which a mobile device may be used.

Supporting S/MIME, PGP and other e-mail security methods in a wireless environment is desired for to a richer and secure e-mail experience for the corporate user of a mobile device accessing data stored at or associated with his corporate enterprise's computer system. The present invention allows these secure e-mail security methodologies to be used, for example, between at least two corporate users and a mobile device. This 'extending' of corporate e-mail mailboxes to mobile devices has been made possible by the related U.S. Pat. No. 6,219,694, titled "System and Method for Pushing Information from a Host System to a Mobile Data Communication Device Having a Shared Electronic Address," issued on Apr. 4, 2001 (hereinafter referred to as the "'694 patent"), which is incorporated in its entirety herein by reference. By using such a system as described in the '694 patent, 'Internet' communicable or formatted e-mail may be sent or pushed to mobile devices to thereby provide richer and farther reaching security that extends what is available in the mobile communications industry today. In previous wireless e-mail solutions, the ability to adequately support security between different corporations was not possible. With the rise of secure e-mail between both corporate and private users, like the S/MIME and PGP standards, mobile device support for such secure e-mail methods is desired.

As used in this application, the term "host system" refers to one or more computers at, with or in association with which a wireless communications connector system (hereinafter referred to as the "wireless connector") is operating. In an embodiment, the host system is a server computer running within a corporate network environment operating behind and protected by at least one security firewall. The host system implements a wireless connector system as an associated wireless communications enabling component, which will normally be a software program/application/component built to work with at least one or more messaging servers, such as Microsoft™ Exchange or Lotus Domino™. The wireless connector system or software program is used to send and receive user-selected information to a mobile device, via a wireless network. Alternatively, the host system could be a user's desktop or laptop PC, also running within a corporate environment connected to local-area network ("LAN"), or could be any other system that is in communication with a user's PC. Thus, a wireless connector system or software program may be server-based or PC-based, such that the host system may be a server computer, a desktop computer or a laptop computer.

A wireless connector system operating at a host system enables the user of a mobile device to send or mirror, via a wireless network, certain user-selected data items or parts of data items from the host system to the user's mobile device upon detecting that one or more triggering events has occurred. In the process of sending data items to the user's mobile device, there is special processing performed that enables the support of S/MIME or PGP encrypted messages. For one skilled in the art of S/MIME, it is well known that the size of an original e-mail message can be dramatically increased when S/MIME algorithms are applied to the message. By applying advanced filtering, re-organization and pre-processing on the message, the user can still receive such data items on a mobile device. In some situations, the user can still have full control over S/MIME processing stages and can direct the host system as to which procedures it should perform on the message.

When wireless access to corporate data for a mobile device has been activated at the host system, for example when the host system detects the occurrence of a triggering event, the host system repackages received messages in a manner that is transparent to the mobile device, so that information sent to and received by the mobile device appears similar to the information as stored on and accessible at the host system. A triggering event includes, but is not limited to one or more of the following: a command sent from the mobile device to the host system to start sending one or more messages stored at the host system, etc. In addition to repackaging the information itself, the repackaging may also provide information about the message, for example whether or not the message was signed and whether or not the signature was verified. One preferred repackaging method includes wrapping received messages to be sent via the wireless network in an electronic envelope that corresponds to the wireless network address of the mobile device. Alternatively, other repackaging methods could be used with the system, such as special-purpose Transmission Control Protocol over Internet Protocol (TCP/IP) wrapping techniques. Such repackaging preferably also results in e-mail messages sent from the mobile device appearing to come from the host system even though they are initiated (i.e., composed and sent from) at the mobile device, thus enabling the mobile device user to appear to the intended recipient(s) of his messages to use and have a single e-mail address.

In an alternative system and method, a wireless connector system operates in conjunction with a network server, and the server is programmed to detect numerous event triggers over the network from multiple user computers (such as desktop and notebook computers) coupled to the server via a Local Area Network (LAN). The server can receive internal event triggers from each of the user desktop computers via the network, and can also receive external event triggers, such as messages or commands from the users' mobile devices. In response to receiving one of these triggers, the server sends received messages to the proper mobile device. The messages and addressing information for a particular mobile device can be stored at a storage device at, coupled to or associated with the server or at a storage device at, coupled to or associated with the user's desktop or notebook computer connected to the LAN. Using this alternative configuration, one wireless connector system can serve a plurality of users. This alternative configuration could also include an Internet- or intranet-based system that could be accessible through a secure webpage or other user interface. The wireless connector system could be located on an Internet Service Provider (ISP) system and accessible only or also through an Internet interface.

In another configuration, a wireless connector system operates at both a host system and at a user's mobile device. The user's mobile device then operates similarly to the host system, and is configured in a similar fashion to send certain user-selected data items from the mobile device to the host system (or possibly to some other destination) upon detecting a triggering event at the mobile device. This configuration provides two-way sending of information between the host system and the mobile device.

FIG. 1 is a block diagram showing an overview of an environment in which a mobile device may be used. One skilled in the art can appreciate that there could be many different topologies, but the one shown in FIG. 1 helps demonstrate how systems and methods may be implemented.

In FIG. 1, there is shown a corporate LAN 30 behind a security firewall 22 as an illustrative example of a central, server-based host system, typically referred to herein as a corporate LAN or host location. However, this does not restrict the host location from being a branch office, a home office or some other location where e-mail messages are being exchanged. As described above, the host system may instead be a desktop or laptop computer. Also shown is an e-mail sender 10, which could for example be an individual using an ISP account, a person within another company, a person in the same company within another branch office, or a user of a large ASP (application service provider) such as America Online (AOL).

Within the corporate LAN 30 is a message server 40, running on a computer behind the firewall of the corporation, that acts as the main interface for the corporation to exchange electronic mail, calendaring data, voice mail, electronic documents, and other personal information management (PIM) data with a WAN 20, which would typically be the Internet. Two of the most common message servers 40 are Microsoft Exchange and Lotus Domino server products. These servers are often used in conjunction with Internet mail routers that typically use UNIX-based Sendmail protocols to route and deliver electronic mail. These intermediate steps and computers will be dependent upon the specific type of message delivery mechanisms and networks via which e-mail messages are exchanged, but have not been shown in FIG. 1 since they do not directly play a role in the operation of the systems and methods described herein. A message server 40 may extend beyond just e-mail sending and receiving, providing such functionality as dynamic database storage engines that have predefined database formats for data like calendars, todo lists, task lists, e-mail and documentation.

Within this typical corporate environment, a wireless connector system 45 as described briefly above may be operable in conjunction with the message server 40. The wireless connector system 45 may reside on the same computer as the message server 40, but this is not a requirement. The wireless connector system 45 and the message server 40 are designed to co-operate and interact to allow the pushing of information to mobile devices 100. In such an installation, the wireless connector system 45 is preferably configured to send confidential and non-confidential corporate information for each user that has a mobile device 100 through the corporate firewall 22, via a wireless network, to the user's mobile device 100. The wireless connector system 45 preferably employs a 'push-based' technique, a 'pull-based' technique or some combination thereof so that any e-mail system including a message server 40 could be extended. The user's mobile device 100 thereby has access to stored messages of the message server. Although the system is not directed solely to a 'push-based' technique, a more detailed description of such a redirection system may be found in the above referenced '694 Patent and in the following co-pending, and commonly-owned, United States patent applications, all of which are related to the '694 Patent: U.S. patent applications Ser. No. 09/401,868 (now issued as U.S. Pat. No. 6,701,378), Ser. No. 09/545,963 (now issued as U.S. Pat. No. 6,779,019), Ser. No. 09/528,495 (now issued as U.S. Pat. No. 6,463,464), Ser. No. 09/545,962 (now issued as U.S. Pat. No. 7,209,955), and Ser. No. 09/649,755 (now issued as U.S. Pat. No. 6,463,463). The complete disclosure of each of these applications, including drawings and claims, is hereby incorporated into this application by reference. This push technique uses a wireless friendly encoding, compression and encryption technique to deliver all information to a mobile device, thus effectively extending the company firewall 22 to include the mobile devices 100.

As shown in FIG. 1, there are many alternative paths for getting information to a mobile device 100 from the corporate network 30. One possible transfer path for getting information to a mobile device 100, discussed later in this section, is through a physical connection 50 such as a serial port, using an interface or connector 65. This path may be useful for example for bulk information updates often performed at initialization of the system or periodically when a user of a mobile device 100 is working at a desktop computer system with the LAN 30, such as the host computer system 35. Although only one desktop computer system 35 is shown in FIG. 1, those skilled in the art will appreciate that a LAN network will typically contain many desktop, notebook and laptop computer systems.

Another method for data exchange with a mobile device 100 is over-the-air using wireless networks. As shown in FIG. 1, this could involve a Wireless Virtual Private Network (VPN) router 75, if available in the network 30, or through a traditional Wide Area Network (WAN) connection to a wireless gateway 85 that provides an interface to one or more wireless networks such as 105 and 110. The concept of a Wireless VPN router 75 is new in the wireless industry and implies that a VPN connection could be established directly through a specific wireless network 110 to a wireless device 100. The possibility of using a Wireless VPN 75 router has only recently been available and could be used in conjunction with a static addressing scheme. For example, a wireless network such as 110 could be an IP-based wireless network in which the new IP Version 6 (IPV6) would provide enough IP addresses to dedicate an IP address to every mobile device 100 and thus make it possible to push information to a mobile device 100 at any time. A primary advantage of using a wireless VPN router 75 is that it could be an off-the-shelf VPN component, which would not require a separate wireless gateway 85. A VPN connection would most likely use a TCP/IP or User Datagram Protocol (UDP)/IP connection to deliver messages directly to a mobile device 100.

If a wireless VPN 75 is not available, then a link to a WAN 20, normally the Internet, is a commonly used connection mechanism. For one skilled in the art of wireless networks, the path for delivering wireless datagrams to mobile devices 100 is well known. To handle the addressing of the mobile device 100 and any other required interface functions, a wireless gateway 85 is preferably used. The wireless gateway 85 may also determine a most likely network for locating a given user and track users as they roam between countries or networks. In wireless networks such as 110 and 105, messages are normally delivered to and from mobile devices 100 via RF transmissions between base stations (not shown) and mobile devices 100.

Also shown in FIG. 1 is a composed e-mail message 15 leaving the e-mail sender 10, located somewhere on the WAN 20. This message 15 is fully in the clear and may use traditional Simple Mail Transfer Protocol (SMTP), RFC822 headers and MIME body parts to define the format of the mail message. These techniques are all well known to one in the art. In this environment, the message 15 arrives to the message server 40 and is forwarded by the wireless connector system 45 to a mobile device 100. As this takes place, the message is re-enveloped as indicated at 80 and a compression and encryption algorithm can be applied to the original message 15. In this way, messages being read on the mobile device 100 are no less secure then reading them on the desktop computer system 35. Preferably, all messages exchanged between the system 45 and the mobile device 100 preferably use this message repackaging technique. Another goal of this outer envelope (although not required) is to maintain at least some of the addressing information of the original message 15. This allows reply messages to reach the appropriate destination, and it allows the "from" field to reflect the e-mail address of the mobile device user's electronic mailbox account at his desktop computer system 35. Using the user's desktop computer system e-mail address from the mobile device 100 allows the received message to appear as though the message originated from the user's electronic mailbox account at his desktop computer system 35 rather than the mobile device 100.

Turning back to the physical connection 50 to the mobile device 100, this connection path offers many advantages for enabling one-time data exchange of large items. For those skilled in the art of Personal Digital Assistants (PDAs) and data synchronization, Personal Information Management (PIM) data is commonly exchanged over such a connection, for example a serial port connected to an appropriate interface or connector 65 such as a cradle in or upon which the mobile device may be placed. When exchanged for the first time, the amount of PIM data tends to be relatively large and requires a large bandwidth for transfer to the mobile device 100. This physical connection 50 can also be for other purposes, including transferring private security keys (hereinafter referred to as "private keys") such as a mobile device user's private key (used in processing S/MIME messages, a user's digital Certificate (Cert) and any chained Certs, and CRL(s) from the user's desktop computer system 35 to the user's mobile device 100. For example, a private key may be generated by collecting cursor position information while a user moves a mouse or other input device coupled to the computer system 35. The private key may then be loaded onto the mobile device 100 through the physical connection 50 and the interface or connector 65.

The private key exchange allows a user's desktop computer system 35 and mobile device 100 to share at least one personality and a method for accessing all encrypted mail. The user's desktop computer system 35 and mobile device 100 can also thereby share private keys and thus either the host system 35 or mobile device 100 can process secure messages addressed to the user's electronic mailbox account or desktop computer system 35. The transfer of Certs and CRLs over such a physical connection 50 may be desirable in that they represent a large amount of the data that is required by a mobile device 100 for S/MIME, PGP and other public key security methods. A Cert is often part of a Cert chain, which includes a user's Cert as well as possibly other Certs to verify that the user's Cert is authentic. While verifying the signature on a signed message, the receiver of the message will also typically obtain a Cert chain for the signing Cert of the message and verify that each Cert in the chain was signed by the next Cert in the chain, until a Cert is found that was signed by a root Cert from a trusted source, perhaps from a large Public Key Server (PKS) associated with a Certificate Authority (CA) such as Verisign™ or Entrust™ for example, both prominent companies in the area of public key cryptography. Once such a root Cert is found, a signature can be trusted, since both the sender and receiver trust the source of the root Cert.

It should be appreciated that the user's own Cert or Cert chain, as well as those for other users, may be loaded onto a mobile device 100 from a the user's desktop computer system. If the user's Cert or Cert chain is on a mobile device 100, then it can be sent to recipients along with any secure messages composed on the mobile device 100 so that each recipient can verify a trust status of the Cert. A goal of loading other user's Certs and onto a mobile device 100 is to allow a mobile device user to select other entities or users with whom they might be exchanging secure messages, and to pre-load the bulky information onto the mobile device 100 through a physical connection instead of over the air, thus saving time and wireless bandwidth when a secure message is received from or to be sent to such other users. Bulky information is generally any electronic data that has large byte sizes. Loading of CRLs on a mobile device may also allow a mobile device to determine the status of a received Cert.

Referring again to FIG. 1, there is normally a series of connections to wireless networks 110 and 105. As one skilled in the art will readily appreciate, these connections could include for example Integrated Services Digital Network (ISDN), Frame Relay or T1 connections using the TCP/IP protocol used throughout the Internet. These networks could represent distinct, unique and unrelated networks, or they could represent the same network in different countries. The term "wireless network" is meant to include different types of networks, including but not limited to (1) data-centric wireless networks, (2) voice-centric wireless networks and (3) dual-mode networks that can support both voice and data communications over the same or similar physical base stations. The newest of these combined networks include, but are not limited to (1) the Code Division Multiple Access (CDMA) network, (2) the Groupe Special Mobile or the Global System for Mobile Communications (GSM) and the General Packet Radio Service (GPRS), both developed by the standards committee of CEPT, and (3) third-generation (3G) networks like Enhanced Data rates for Global Evolution (EDGE) and Universal Mobile Telecommunications Systems (UMTS). GPRS is a data overlay on top of the very popular GSM wireless network, operating in virtually every country in Europe. Some older examples of data-centric network include, but are not limited to: (1) the Mobitex™ Radio Network ("Mobitex") and (2) the DataTAC™ Radio Network ("DataTAC"). Examples of older voice-centric data networks include Personal Communication Systems (PCS) networks like CDMA, GSM, Time Division Multiple Access (TDMA) systems.

Figure 2:
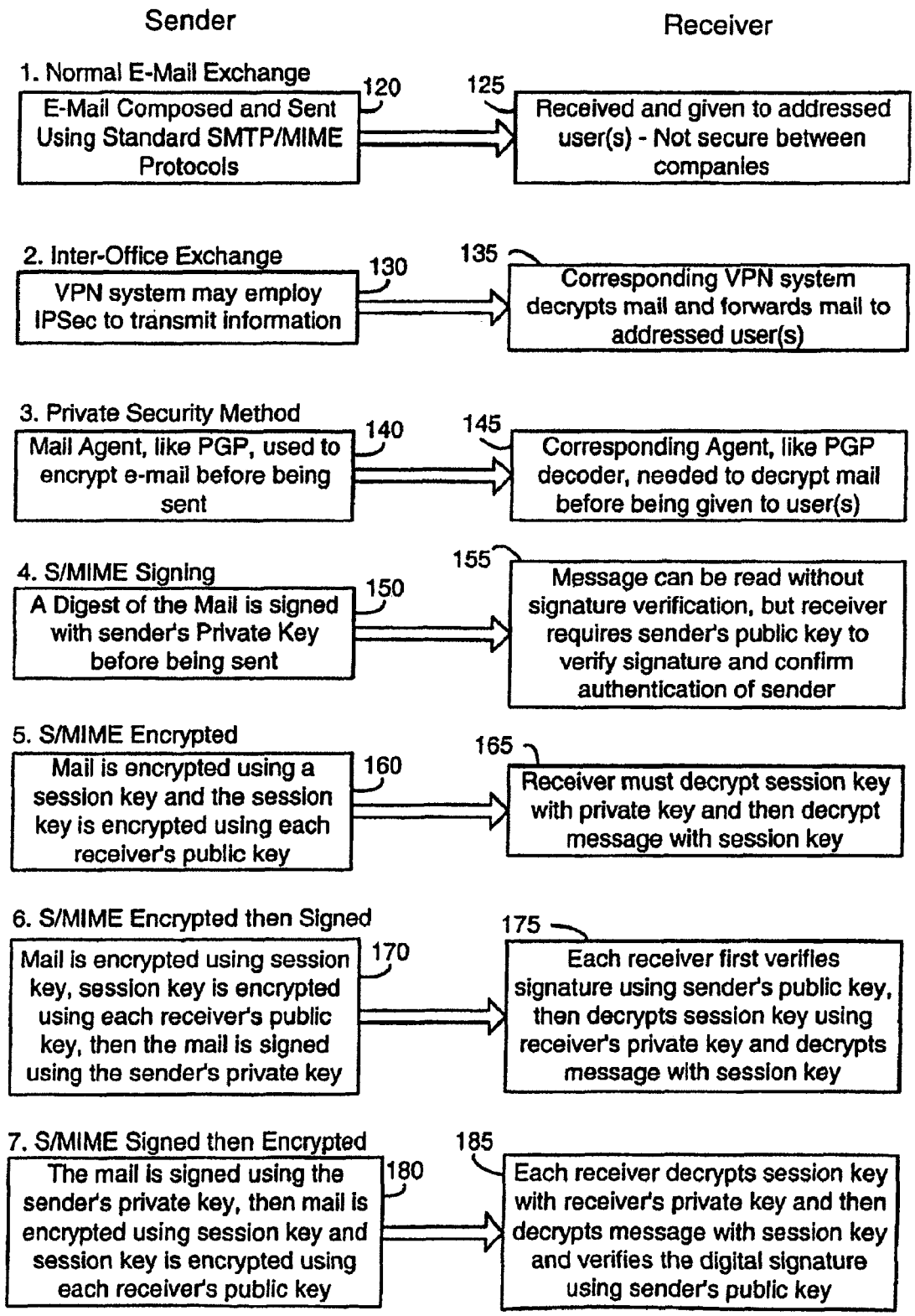
FIG. 2 is an illustration of the main types of e-mail exchanges that are commonly used today in the Internet.

Turning now to FIG. 2, which is an illustration of the main types of e-mail exchanges that are commonly used today in the Internet, we first have a normal exchange of e-mail messages (method 1). In this scenario, an e-mail is constructed using RFC822, RFC821 and MIME techniques and delivered using standard SMTP mail exchange protocols, as shown at 120. The e-mail is then received and given to the addressed users, as indicated at 125. Such normal e-mail exchange is typically secure within a company or LAN such as 30 (FIG. 1) located behind a security firewall 22, but not between stand-alone users and/or users on different networks.

Also commonly used are VPN links for inter-office message exchange (method 2) for example between branch offices of the same company, and sometimes between different companies that are working very closely together. Using this method, a lower-level security called IP Security (IPSec) may be used to encrypt all data being exchanged between the two VPN locations, as shown at 130. When an encrypted e-mail is received at a corresponding VPN system, it is decrypted into plain text and routed to addressed users, at 135. This technique is commonly used between branch offices of the same company.

E-mail exchange between different companies or users that have adopted a private security scheme is illustrated in FIG. 2 as method 3. In this scenario, a protocol such as PGP, Open-PGP or some other less widely used protocol is used to encrypt an e-mail before it is sent, at 140. Once received, a corresponding mail agent decrypts the e-mail and presents the plain text of the e-mail to the recipient, at 145.

Methods 4, 5, 6 and 7 shown in FIG. 2 relate to S/MIME. The methods are all different variations of S/MIME. In method 4, a sender takes a digest of an e-mail message and signs the digest using the sender's private key, as shown at 150. A digest may for example be generated by performing a check-sum, Cyclic Redundancy Check (CRC) or some other preferably non-reversible operation such as a hash on the message, and is then signed by the sender using the sender's private key. The signed digest is appended to the outgoing message, possibly along with the Cert of the sender, and possibly any chained Certs and CRLs. The receiver of such a signed message also takes a digest of the message, compares this digest with the digest appended to the messages, retrieves the sender's public key, usually by extracting the public key from the sender's Cert, and verifies the signature on the appended digest. These operations are part of the signature verification indicated at 155 in FIG. 2. If the message content has been changed since it was signed by the sender, then the digests will be different or the signature on the digest will not verify properly. This does not prevent anyone from seeing the contents of the message, but does ensure the message has not been tampered with since it was signed by the sender, and that the message was signed by the person as indicated on the 'From' field of the message. The Cert, Cert chain and CRLs are used by a receiver to ensure that the sender's Cert is valid, i.e. that the Cert has not been revoked or expired, and trusted. The combination of a digest generated at a sender with the signature on the digest is typically referred to as a digital signature. Hereinafter, references to digital signatures should therefore be interpreted as including a digest and a signature of the digest.

Method 5 represents exchange of S/MIME encrypted messages. In this method, a one-time session key is generated, used to encrypt the body of a message, typically with a symmetric cipher like Triple Data Encryption Standard (3DES). The session key is then encrypted using the public key of each intended receiver of the message, at 160. Session key encryption is often accomplished using a public key encryption algorithm such as Rivest Shamir Adelman (RSA). The S/MIME message, including the encrypted message and all encrypted versions of the session key, is sent to each receiver. Each receiver must then locate its corresponding encrypted session key, normally based on a RecipientInfo summary of the receivers that is attached to the message, and decrypt that particular encoded session key using its private key, as indicated at 165. Once the session key is decrypted, it is used to decrypt the message body. An S/MIME message may also specify an encryption algorithm that must be used to decrypt the message. This information is normally placed in a header of an S/MIME message.

Exchange of messages that have been encrypted and then signed is shown in FIG. 2 as method 6. According to this scheme, the sender first generates a one-time session key, encrypts the message body and then encrypts the session key with the public key of each receiver, as described above. The sender then takes a digest of the message, including the encrypted session keys, and signs the digest using its private key to generate a digital signature, at 170. Each receiver takes a digest of the message, compares this digest with the digest in the digital signature appended to the message, retrieves the sender's public key, and verifies the signature on the digest, as described above. The correct session key is then located and decrypted with the receiver's private key, which then allows the message body to be decrypted. Signature verification and message decryption according to this method are shown in FIG. 2 at 175.

Method 7 in FIG. 2 illustrates exchanging messages that have been signed and then encrypted. A digital signature is generated by a sender substantially as described above, at 180. This digital signature, as well as possibly the sender's Cert, Cert chain and CRLs are all appended to the outgoing message. A session key is then generated and is used to encrypt the message body, digital signature, and any Certs and CRLs. The session key is encrypted with the public key of each receiver. The resultant S/MIME message, including the encrypted versions of the session key, is transmitted to the receiver. When a receiver receives such a message, as shown at 185, it must first decrypt its corresponding encrypted session key with its private key. The decrypted session key is then used to decrypt the message body, digital signature, and any Certs and CRLs of the message sender. The digital signature can then be verified as described above.

Figure 3:
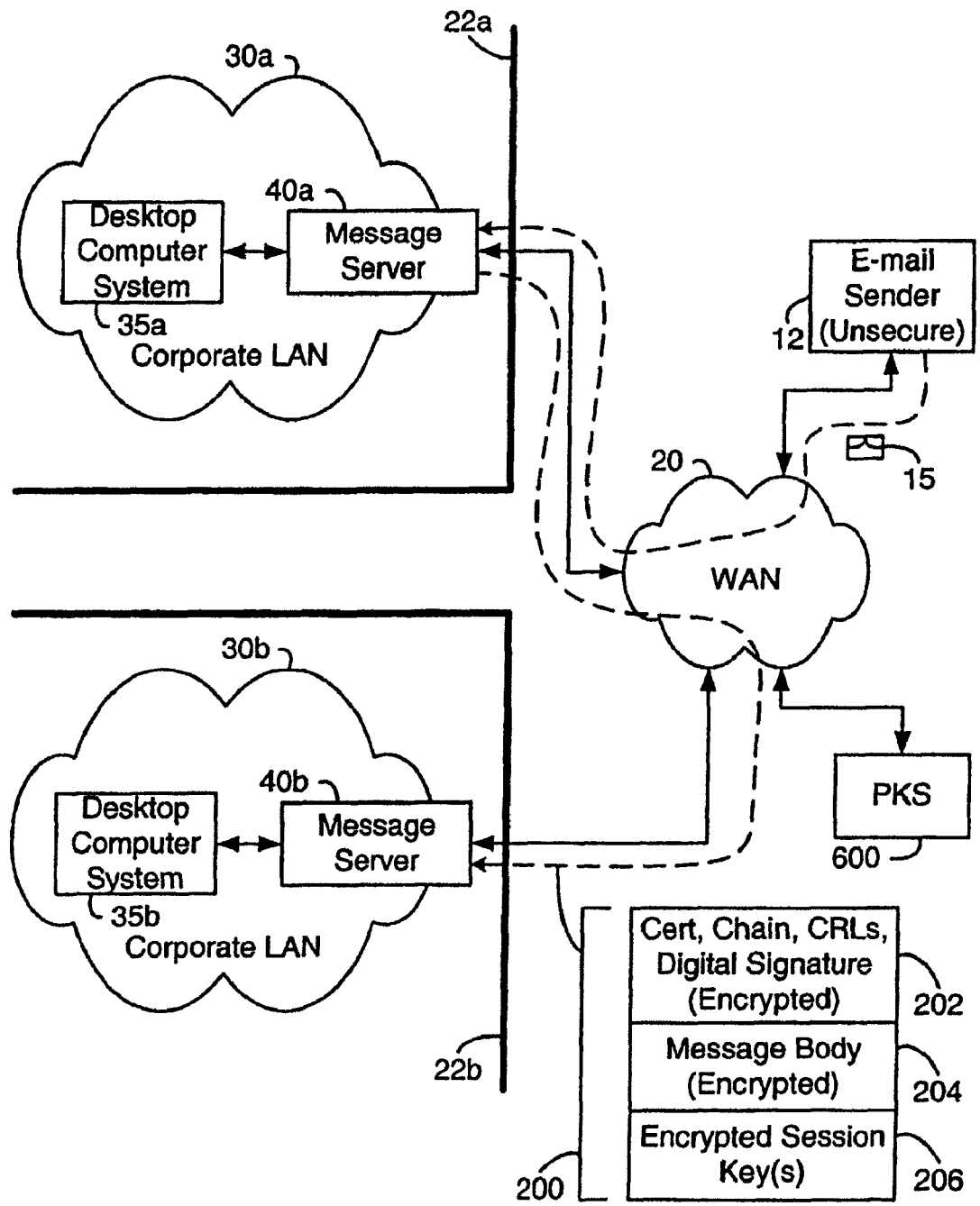
FIG. 3 is block diagram illustrating of the main components of a system supporting both secure and unsecure e-mail exchanges.

FIG. 3 is block diagram illustrating components of a system supporting both secure and unsecure e-mail exchanges, and is useful in demonstrating some of the general characteristics and functions of secure messaging in contrast with standard typically unsecure messaging such as Internet-based e-mail. In FIG. 3, the example corporate networks 30*a* and 30*b* are secure networks located behind respective security firewalls 22*a* and 22*b*. Although users on networks 30*a* and 30*b*, shown as desktop computer systems 35*a*, 35*b*, are preferably enabled for secure messaging with other user systems on either of the networks as described in further detail below, such user systems will normally also be able to communicate with unsecure systems, such as an e-mail sender system 12.

When the e-mail sender 12 sends an e-mail message 15 to a user on the LAN 30*a*, the message 15 traverses the WAN 20, which is perhaps most often the Internet, and is received by the message server 40*a* in the LAN 30*a*. Since the e-mail message sender 12 is unsecure, the e-mail message 15 would normally be transferred to the message server 40 on LAN 30*a* in the clear.

Messaging between users on LANs 30*a* and 30*b* proceeds somewhat differently, since both networks are enabled for secure e-mail communications. Users sending e-mail from LAN 30*a* to one or more users on LAN 30*b* would presumably know that they can use S/MIME to secure the e-mail. The sender of an e-mail message, using desktop computer system 35*a* for example, preferably selects an encoding method from a plurality of encoding methods, which for illustrative purposes is assumed to be signed and then encrypted S/MIME. The desktop computer system 35*a* or possibly the message server 40*a*, or more likely software executing on either the desktop system or server, will generate a digital signature for the e-mail message, and include the digital signature and possibly the Cert(s) and CRLs for the sender in the outgoing message. The desktop computer system 35*a* or server 40*a* will then generate a session key, encrypt the entire message, fetch (or retrieve) a copy of the public key for each receiver from a PKS 600 for example, and encrypt the session key for each receiver. A PKS 600 is preferably a server that is normally associated with a CA from which a Cert for an entity, including the entity's public key, is available. It will be obvious to one skilled in the art that the PKS could reside within a corporate firewall 22*a*, 22*b*, or anywhere on the WAN 20, Internet or other network through which message senders and receivers may establish communications with the PKS. It should also be obvious that a message sender need not necessarily always fetch or retrieve an intended receiver's public key, for example where the receiver's Cert or public key are already stored on a storage device at the sender system.

The resulting message that is transferred to the message server 40*b* via the WAN 20, shown as 200 in FIG. 3, has an encrypted signature-related information component 202, which may include the sender's Cert, Cert chain, CRLs and digital signature, an encrypted message body portion 204 corresponding to the original e-mail message composed at the desktop system 35*a*, and one or more encrypted session keys 206. The components 202 and 204 are encrypted using the session key, whereas each receiver's public key is used to encrypt the session key, as described above. Depending upon the particular secure messaging scheme in place between LANs 30*a* and 30*b*, a secure message may contain different or additional components than those shown in FIG. 3, or the same or similar components in a different order. Of course, a secure message 200 would also include at least one destination address and possibly other header information that must be left in the clear to provide for routing of a message to recipients. Since such additional and/or different message fields will be apparent to those skilled in the art, they have not been explicitly shown in the drawings.

Figure 4:
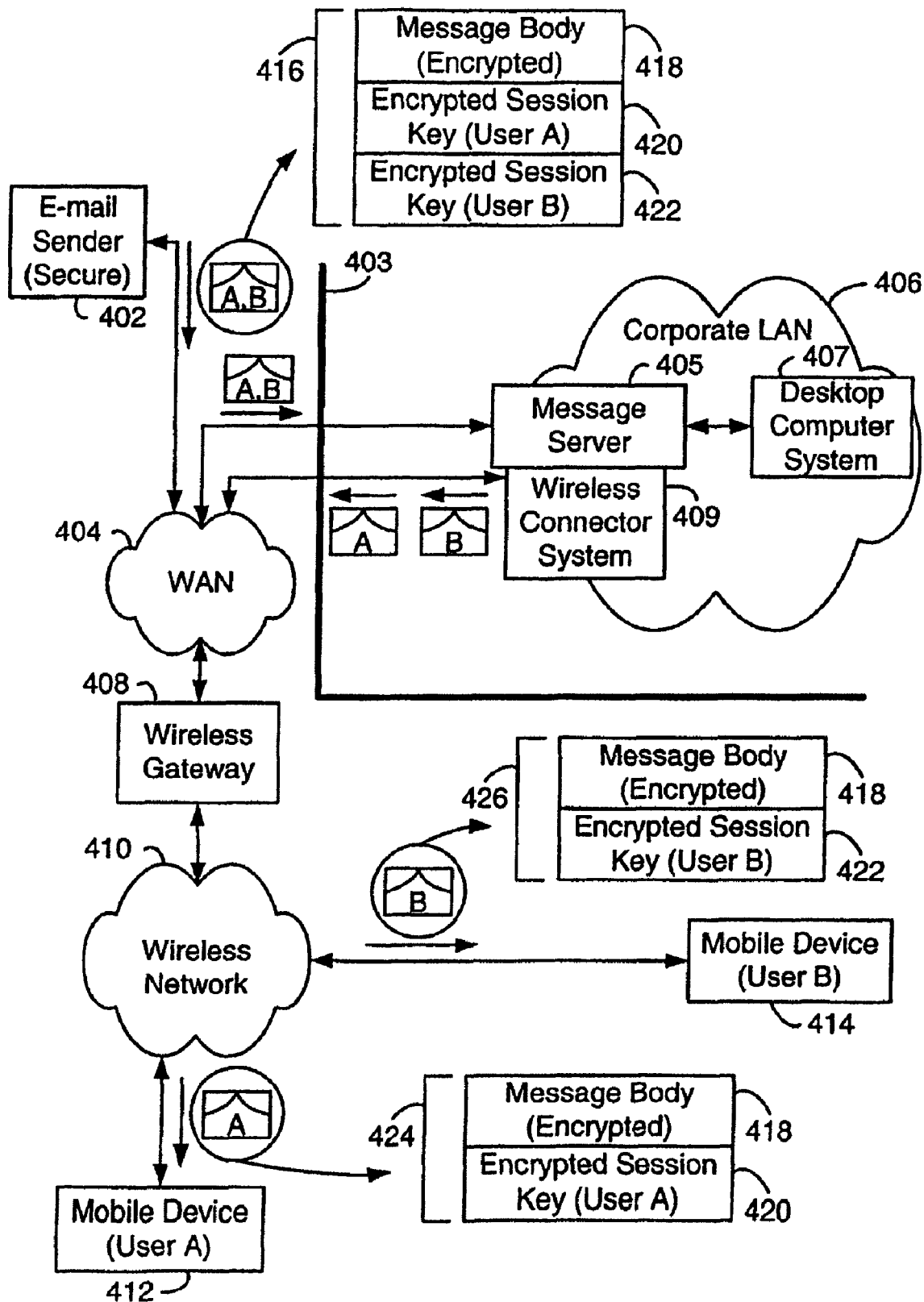
FIG. 4 is a block diagram which illustrates received encrypted message size reduction.

FIG. 4 is a block diagram which illustrates received encrypted message size reduction. Reducing message size improves the processing and transmission of public-key encrypted messages, via a wireless network, to mobile devices. The system shown in FIG. 4 includes an e-mail message sender 402 enabled for secure e-mail messaging, a WAN 404, which would in most cases be the Internet, a corporate LAN 406 as an example host location, a wireless gateway 408, a wireless network 410, and mobile devices 412 and 414. The example host location in FIG. 4 is a corporate LAN 406 located behind a security firewall 403 and includes a message server 405, a desktop computer system 407 and a wireless connector system 409 running on, in conjunction with, or as an integrated module of the message server 405. The operation of the system shown in FIG. 4 will be described in detail below by way of an illustrative example in which an e-mail message is composed at the secure e-mail sender 402 and sent to users A and B, each of whom are users of a mobile device 412 or 414 as well as a desktop computer system at the host location, i.e. LAN 406, only one of which is shown at 407.

As shown in FIG. 4, the e-mail sender 402 composes an e-mail message at least comprising a destination address and electronic text destined for users A and B. In this example, the e-mail message is encrypted using a one-time session key chosen by the e-mail sender 402, substantially as described above. The e-mail sender 402 then encrypts the session key using the public key for each of the recipients of the e-mail, namely users A and B. As was also described above, the public keys may have been retrieved from a local storage area, a PKS resident within a network (not shown) in which the e-mail sender system 402 is configured to operate, or a PKS resident on the WAN 404 or other network with which the e-mail sender 402 may communicate. In this example, the location of the PKS and the location of the public keys are not important. The system is in no way dependent upon any particular key management scheme at an e-mail message sender such as 402.

A secure message 416, including the encrypted message 418, and encrypted versions of the session key 420, 422 for all recipients are sent through the WAN 404 to the recipients' addresses on the message server 405. It should be appreciated that the message components shown at 416 represent those components that are directly involved in the system. A message sent by an e-mail message sender such as 402 may include additional components or the components shown at 416 may be included in a different order than shown, without affecting operations associated with this aspect of the system.

When the message is received at the message server 405, possibly through one or more further computer systems (not shown) at the host location and connected to the WAN 404, the wireless connector system 409 detects the secure and encrypted message. The system 409 also determines that users A and B have associated mobile devices 412, 414 to which the received secure message should be sent via the wireless network.

According to this aspect, the system 409 reduces the size of the message by removing any encrypted session keys that are not needed by each individual user's mobile device 100. An S/MIME message for example includes a RecipientInfo list which provides a map as to which encrypted session key corresponds to each recipient in the To, Cc or Bcc fields in the message. Therefore, the system 409 may consult the RecipientInfo list to determine which encrypted session key should be sent to each recipient.

As shown in FIG. 4, the system 409 detects the received message 416 addressed to both users A and B, and sends a modified copy of the message 416 to each user's mobile device. The message sent to user A's mobile device 412 is shown in more detail at 424 and includes the encrypted message body 418 and only one encrypted session key 420 that was encrypted using user A's public key. The encrypted session key 422 for user B, which cannot be used by user A, is removed from the message sent to mobile device 412 by the system 409. Similarly, the system 409 removes the encrypted session key 420 intended for user A from the received encrypted message and sends a resultant message including the encrypted message body 418 and the encrypted session key 422 for user B, as shown at 426.

Since each user receives its corresponding encrypted session key as part of the secure message, the secure message can be processed at each device 412, 414 even though other information in the original secure message 416 sent by the e-mail sender 402 has been removed by the system 409. The encrypted session key can be decrypted on each mobile device 412, 414 using each user's respective private key resident on the mobile device and then used to decrypt the message body. As described above, a user's private key may for example be transferred from the user's desktop computer system such as 405 to the user's mobile device via a physical connection (not shown in FIG. 4). After decryption of the message body, a user interface on the mobile device can then present the unencrypted message on a display of the device.

By re-organizing the original message as described above, all unnecessary encrypted versions of the session key are removed from the original message, thereby reducing the size of a message sent via a wireless network to a mobile device. For an S/MIME message, since a mobile device receives only its corresponding encrypted version of the session key, the RecipientInfo list is not needed and may also be removed, further reducing message size. Since the number of encrypted versions of a session key and the size of a RecipientInfo list if present increases with the number of recipients in an original message, message size reduction can be particularly effective for original messages with large numbers of recipients.

Although the example system shown in FIG. 4 includes a message server 405 and system 409 in a corporate LAN behind a security firewall 403, the system is also applicable to other types of systems, for example where mobile device user has a computer system connected to the Internet directly or through an ISP for example. In this case, the desktop computer system implements the wireless connector system, preferably as a desktop version of wireless connector system operating with an electronic message program operating at the desktop computer system. Examples of electronic message programs include, but are not limited to, MS Outlook, Lotus Notes, and Eurdora. The programs may access mail stored at a first data store device (not located at the desktop computer) through one or more means including POP. The desktop-based wireless connector in conjunction with the electronic message program would send received messages to the user's mobile device, via the wireless network 410, and performs the message size reduction operations described above.

Figure 5:
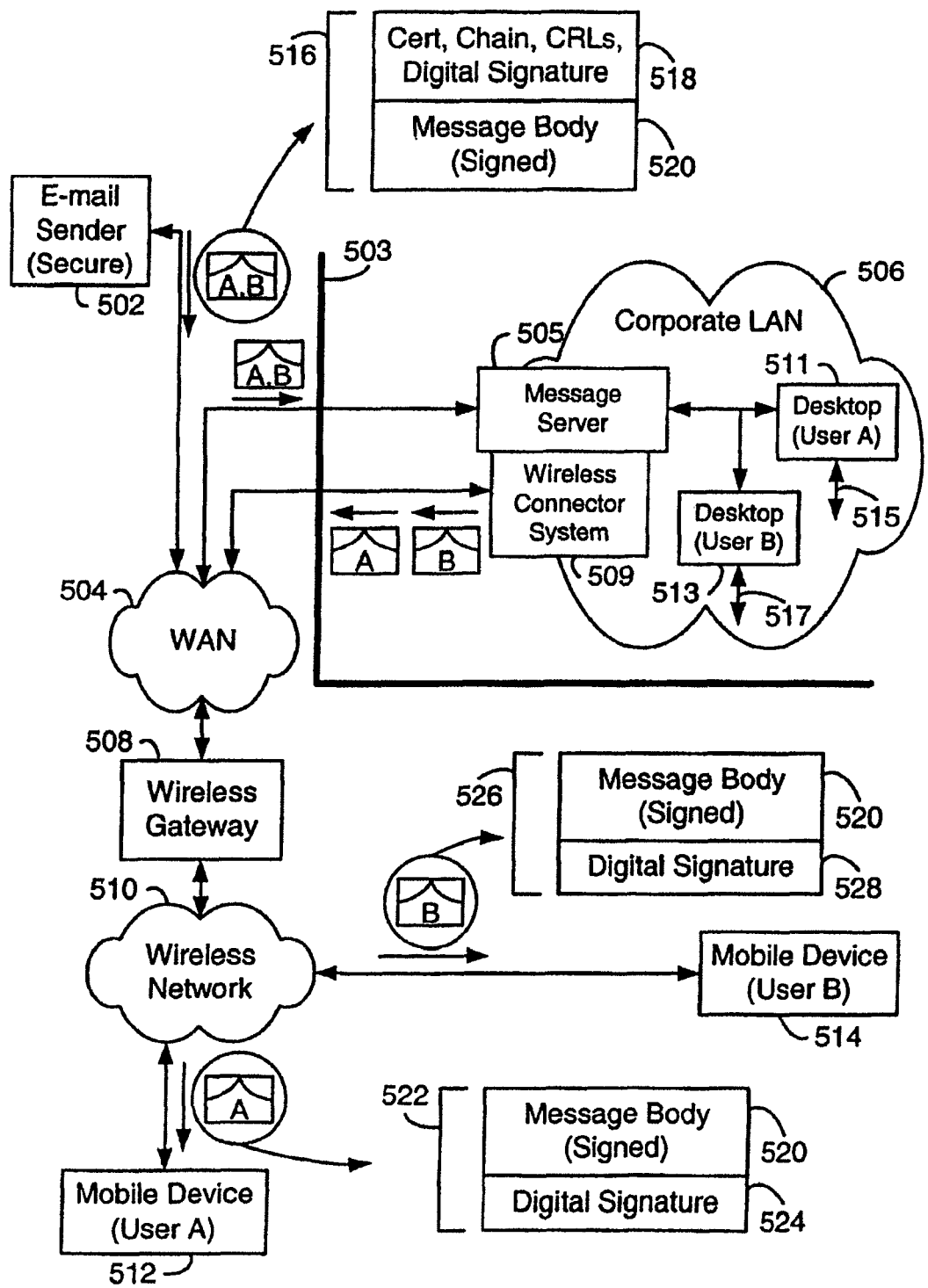
FIG. 5 is a block diagram illustrating received signed message size reduction.

FIG. 5 is a block diagram illustrating received signed message size reduction. The overall system shown in FIG. 5 is similar to system of FIG. 4, with system components in FIG.

5 being substantially the same as similarly labelled components in FIG. 4, although its operation is somewhat different as will be described below.

For illustrative purposes, it is assumed that a user sending an e-mail message from the system 502 to both users A and B decides to sign the message to so that users A and B may confirm the sender is the true sender of the message and that what is received is what was sent by the sender. In order to allow a message receiver to confirm that the sender's signature is authentic, the e-mail sender 502 normally attaches their Cert, any other Certs in a Cert chain, and possibly a current CRL. The secure message that is sent from the e-mail sender 502 may thus have a form as shown at 516, including the sender's Cert, Cert chain, CRL and digital signature 518 and the message body 520. In S/MIME, Certs, chains, CRLs and signatures are normally placed at the beginning of a message body as shown in FIG. 5. Messages according to other secure messaging schemes may place message components in a different order than shown or include additional and/or different components.

A secure message such as 516 would normally be sent through a WAN 504 such as the Internet to addressed recipients. In FIG. 5, the message is addressed to only two recipients, both recipients each having an electronic mailbox account associated with the same message server 505, although the system is in no way limited thereto. The example system in FIG. 5 is merely a system example and is intended only for illustrative purposes.

Once received by the message server 505, the secure message is routed to each recipient's e-mail account on the server 505. The wireless connector system 509 detects the new message and also determines whether or not the message should be sent via the wireless network to a mobile device for any recipient. If so, then the system 509 re-organizes the message to place the message body first, followed by the digital signature and then the Cert, Cert chain and CRLs. The Cert, Cert chain and CRLs are then preferably stored by the system 509 at the host system. A message including at least the message body and digital signature is then sent, via the wireless network, to the mobile devices 512 and 514 of the recipients, users A and B, as shown at 522 and 526. The digital signature 524, 528 is effectively a truncated form of the original signature, Cert, Cert chain and CRL component 518. Although labelled differently in messages 522 and 526, the signatures 524 and 528 are actually the same signature generated by the e-mail sender 502. The Cert, Cert chain and CRLs are not initially sent to the mobile devices 512, 514 with the message body and signature, based on an assumption that the Certs and CRLs may already have been pre-loaded onto a storage device in the devices, for example using a physical connection 515, 517 to the user's desktop computer system 511, 513. It is also possible that the sender's Cert and Cert chain may have been attached to a previous secure message sent, via the wireless network, to the mobile devices 512, 514 and subsequently stored on the mobile devices. An up-to-date CRL might similarly already be available on the mobile devices 512, 514. In these circumstances, a Cert, Cert chain and CRL would not be used at the mobile devices 512, 514 even if they were sent. If any of this information is required but not available on the mobile devices 512, 514, it may then be requested from the wireless connector system 509.

As described above, a user may view the content of a signed message without first verifying a signature. The Cert, Cert chain and CRLs are only required when a mobile device user, user A for example, wishes to verify the signature 524 on the message from the e-mail sender 502. If these components are available on the mobile device 512, then signature verification operations may be completed without further communications between the mobile device 512 and the LAN 506. However, if this Cert and CRL information is not available for a message sender from which a signed message is received, then according to another aspect of the system, the user can submit a request to the system 509 to send the rest of the message original message, particularly any Certs and CRLs that were removed before the message was sent, via the wireless network, to the mobile device and stored at the host location (LAN 506) by the system 509. The Certs and CRLs, once received at the mobile device 512, allow the signature to be fully checked and verified.

Removal of relatively bulky (i.e., large byte-sized electronic data) Certs and CRLs from received signed messages before they are transmitted to mobile devices can significantly reduce the size of signed messages that are transferred through the wireless network 510, thereby conserving wireless network resources, and reducing the bandwidth and time required to transmit signed messages to mobile devices.

Figure 6:
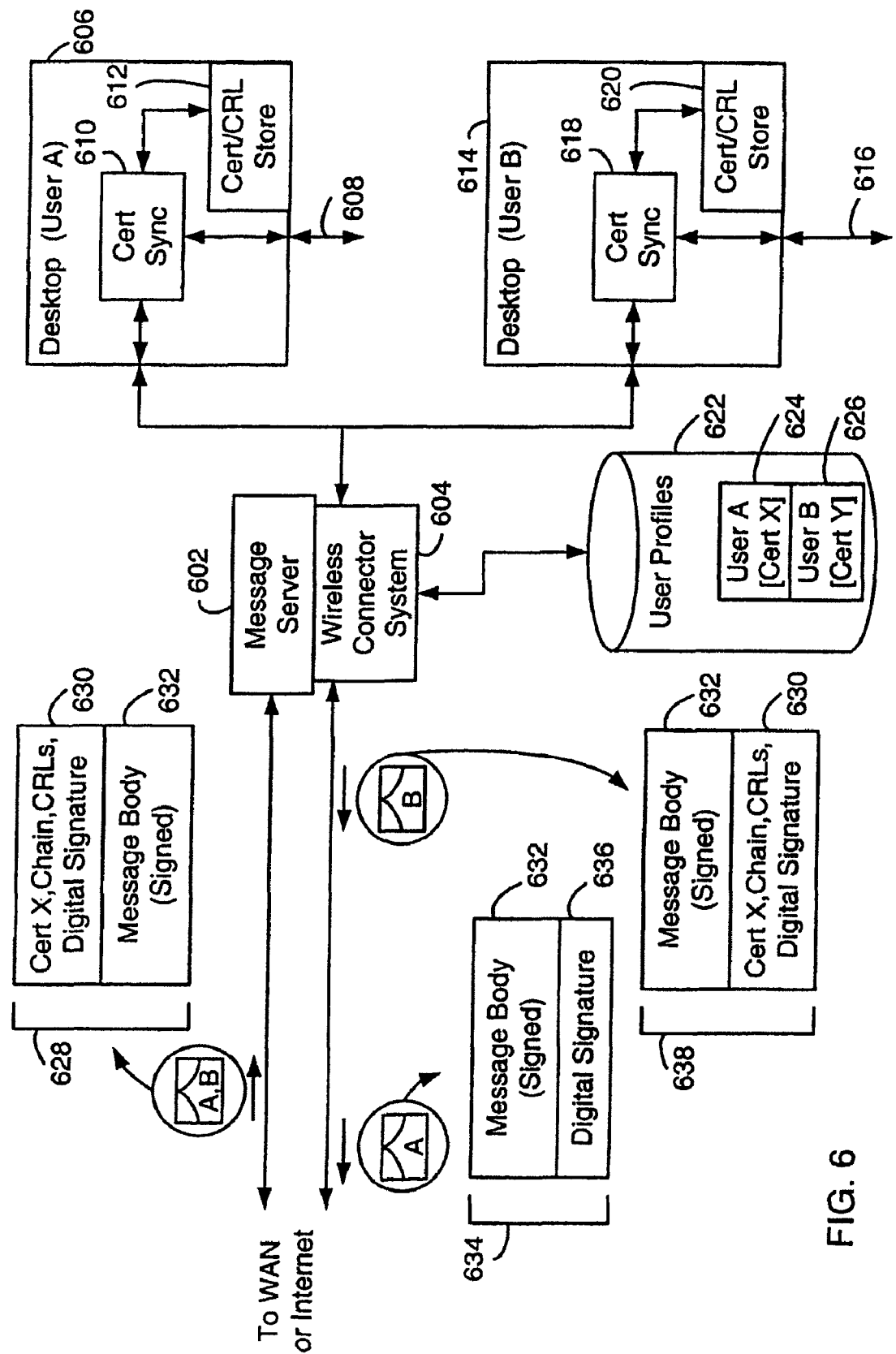
FIG. 6 is a block diagram of a system in which the size of a signed message is reduced based on information stored at a mobile device.

In a further embodiment of this aspect of the system, a user's host system 511, 513 includes a Cert synchronization system, shown in further detail in FIG. 6, which is a block diagram of a system in which the size of a signed message is reduced based on information stored at a mobile device. In FIG. 6, system components outside the host system location at which the wireless connector system is operating have not been shown in order to avoid congestion in the drawing. Connections between the message server and host computer systems have also been omitted for clarity. It should be apparent, however, that the system shown in FIG. 6 may include such other components and connections as are common in messaging systems.

The example system in FIG. 6 includes a message server 602, wireless connector system 604 and two desktop computer systems 606, 614. Each desktop computer system includes a physical connection 608, 616 through which Certs, CRLs, and possibly other relatively bulky information may be transferred to a user's mobile device (not shown). According to this embodiment of the system, each desktop computer system 606, 618 includes a Cert synchronization (sync) system 610, 618, which in most implementations will be a software application. The Cert sync systems 610, 618 interface with the physical connections 608, 616 and data stores 612, 620 on the host computer systems 606, 614. The data stores 612, 620, as those skilled in the art will appreciate, could possibly be any computer storage medium, including for example a local hard disk drive or other memory unit. It is also contemplated that Certs and CRLs, which are public information, could be shared between computer systems within a network for example, such that the stores 612, 620 are actually the same data store, for example on a network file server.

Using the Cert sync system 610, user A can preferably select and transfer Certs and possibly CRLs if desired, to his or her mobile device (not shown) when the mobile device is connected to the desktop computer system via the connection 608. However, since CRLs tend to be large and thus require significant memory resources for storage, users will likely most often transfer only Certs to mobile devices. The Cert sync system may then be configured to consult a corresponding CRL to ensure that a Cert has not been revoked before the Cert is transferred to a mobile device, or alternatively to remove any revoked Certs from a list of Certs available for download. On a device, Certs could be stored in a data store such as a Random Access Memory (RAM), flash memory or other such memory component to which data may be written on a mobile device. Certs may instead possibly be written to a removable memory card, smart card or similar component with which a mobile device is designed to operate.

As shown in FIG. 6, each Cert sync system 610, 618 is also enabled for communication with the wireless connector system 604. This allows a Cert sync system to inform the wireless connector system of which Certs have been loaded onto a user's mobile device. This may be accomplished for example by transmitting either a complete up-to-date list of all Certs on a device or a list of Cert additions and deletions each time a Cert sync system is used to perform any device-related operations. Cert updates could also be sent to the wireless connector system 604 whenever new Certs are detected on a mobile device by a Cert sync system when the mobile device is connected to its desktop computer system. Although the Cert sync system is useful for loading particular Certs for entities from which a mobile device user expects to receive signed messages, there may be situations in which a mobile device user obtains a Cert from other sources such as a CA. In this case, a Cert sync system could be configured to determine, possibly automatically, whether or not any Certs have been loaded onto a mobile device since the last Cert transfer using the Cert sync system, and if so, to transmit a device Cert update to the wireless connector system 604.

When such a device Cert update is received from a desktop computer system 606, 614, a user profile maintained for the particular user by the wireless connector system 604 in a data store 622 is updated. Although the user profiles 624, 626 may include such information as user name, configuration settings to control which messages are sent over the wireless network, mobile device identification information and possibly further user-, configuration- or mobile device-related information (not shown), the wireless connector system 604 preferably also stores a list of Certs that are stored on a user's mobile device. In the example shown in FIG. 6, user A's mobile device stores a Cert for an entity X, as indicated by [Cert X], whereas user B has stored a Cert for entity Y, [Cert Y], on their mobile device. A single Cert is shown in the user profiles 624, 626 for illustrative purposes only; a mobile device preferably has sufficient memory resources to store multiple Certs.

When a signed message 628, including a Cert, Cert chain CRLs and digital signature component 630 and message body 632, arrives at the message server 602, it is detected by the wireless connector system 604 as described above. The original message is then rearranged such that the message body is placed first, followed by the digital signature and Cert information. In accordance with this embodiment of the system, the wireless connector system 604 then determines if any of the Cert information is required by each mobile device to which the message is to be sent, by consulting the user profile for each addressed mobile device user. Since the sender's Cert, Cert X, has been stored to user A's mobile device, a rearranged message 634, including only the message body 632 and digital signature 636, is sent to user A's mobile device. Although a Cert for an entity Y has been stored on user B's mobile device, the Cert X for the sender of the original message 628 is not available on user B's mobile device, such that the rearranged message to user B's mobile device includes both the message body 632 and Cert information and digital signature component 630. As above, the wireless connector system 604 may instead store the Cert information for later transmission to user B's mobile device and initially send only the message body and digital signature.

The use of a Cert sync system 610, 618 and device Cert information accessible to the wireless connector system 604 allows the wireless connector system to determine the information that a particular mobile device requires and to remove any unnecessary information from a message sent to that mobile device. Instead of assuming that a mobile device may have stored a Cert as in the preceding embodiment, the wireless connector system 604 can determine whether or not the device has stored the Cert. The user profiles may also possibly be used to specify other configuration settings, to indicate for example that CRLs should never be sent to a user's mobile device or that Cert information should only be sent to a user's mobile device only if requested.

In reference now to FIGS. 7 and 8, the impact of performing either message signing or encryption first, to generate a message that is both signed and encrypted, will be discussed. When a message is encrypted first and then signed, one set of re-organizing and/or message reduction schemes can be applied. When a message is signed first and then encrypted, other re-organizing and size reduction techniques are applicable. As will be apparent, only a host location portion (message server and wireless connector system) of a messaging system is shown in each of FIGS. 7 and 8 to avoid congestion.

Figure 7:
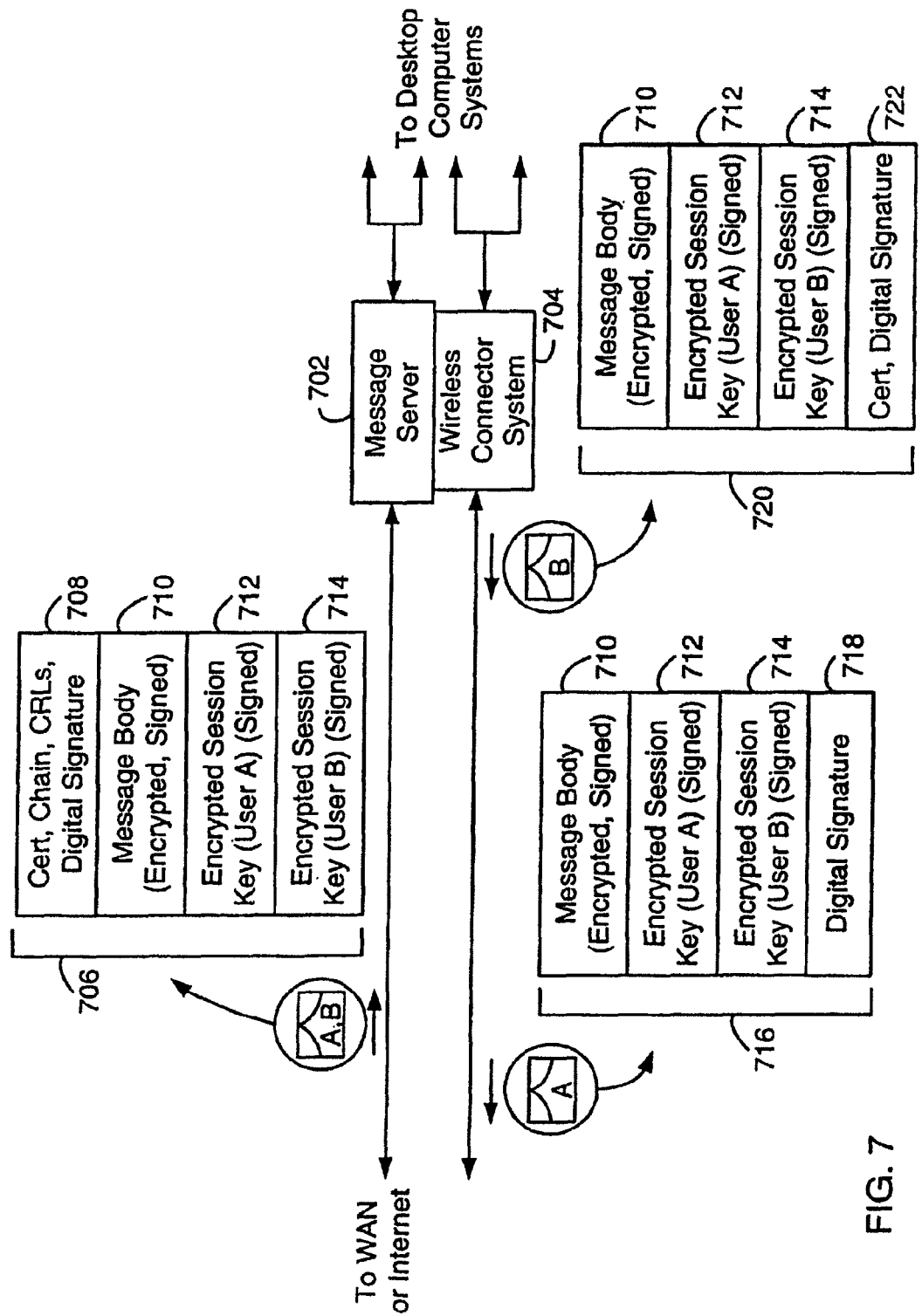
FIG. 7 is a block diagram illustrating secure message size reduction for a received message that has been encrypted and then signed.

FIG. 7 is a block diagram illustrating secure message size reduction for a received message that has been encrypted and then signed. Such a message 706 would typically include a message body 710 that is encrypted using a one-time session key established by the sender. The session key is then encrypted using a public key of each intended message recipient, in this example users A and B, to generate an encrypted session key 712, 714 for each user. The encrypted message body 710 and encrypted session keys 712, 714 are then signed, substantially as described above. Although signing is performed after encryption, the message component 708, with a Cert, possibly a Cert chain and one or more CRLs in addition to the digital signature, may be at the beginning of the secure message as in S/MIME for example.

This encrypted and signed message 706, with the session keys 712, 714 and digital signature and Cert information 708, is received by the message server 702, which processes the message and places it into the appropriate mailboxes for users A and B. The wireless connector system 704 detects the new message and begins the process to send the message to each recipient that has a mobile device (not shown). Before the message is sent to a mobile device, the digital signature and Cert section 708 of the message is preferably at least rearranged such that the digital signature and Cert information is moved to the end of the message. Since the encrypted message body 710 and session keys 712, 714 are all signed, only the signature and Cert information can be rearranged or removed from the message. If the wireless connector system 704 were to process the message 706 rearrange or remove any of the signed components before sending the message to a mobile device, the signature verification will fail at the mobile device.

As described above, the wireless connector system 704 may remove the Cert, as well as any Cert chain and CRLs if included in the message 706, and store these components for later transmission to mobile devices. Where the wireless connector system 704 can determine which Certs are available on an addressed recipient's mobile device, the Cert could be sent only if it is not available on the mobile device. In the example shown in FIG. 7, only the digital signature 718 and signed components 710, 712, 714 of the original message 706 are sent in a message 716 to user A. This would occur when all Cert information is removed before a received message is sent or when the wireless connector system 708 detects that the sender's Cert in the original message 706 has been loaded onto user A's mobile device. In the case of user B, both the Cert and the digital signature 722 are sent along with the signed components 710, 712, 714 in a message 720 to user B's mobile device, if the wireless connector system 704 determines that the Cert in the original message 706 has not been loaded on user B's mobile device for example.

Therefore, when a secure message is encrypted and then signed, a digital signature and any Cert information may be rearranged to the end of the message and some or all of the Cert information may be removed from the message.

Figure 8:
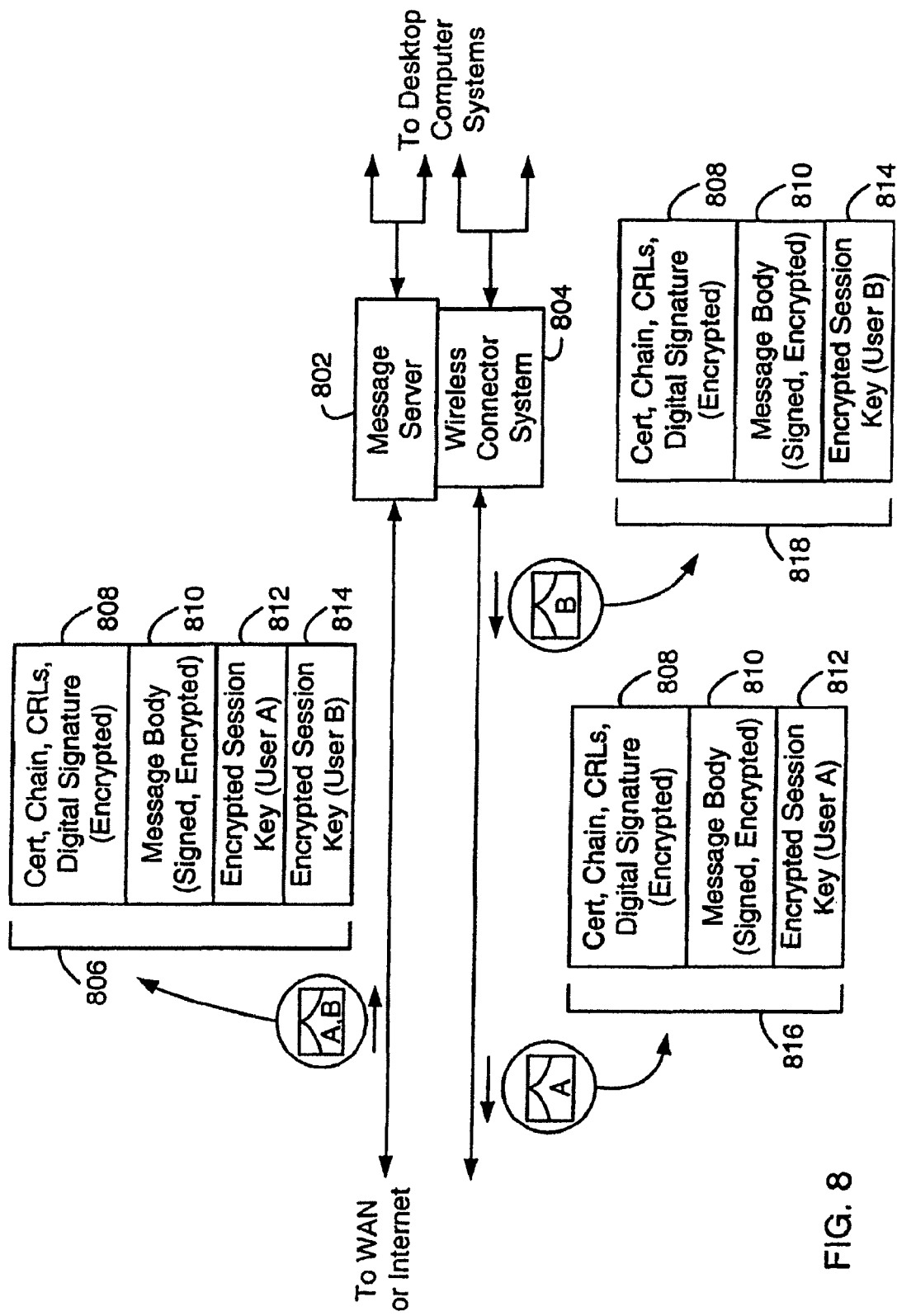
FIG. 8 is a block diagram illustrating secure message size reduction for a received message that has been signed and then encrypted.

FIG. 8 is a block diagram illustrating secure message size reduction for a received message that has been signed and then encrypted. In this case, a sender generates a digital signature for a composed message and attaches the digital signature, Cert, and possibly a Cert chain and CRL to the message. For an S/MIME message, the digital signature, Cert and any chained Certs and CRLs are attached at the beginning of the message. The entire signed message is then encrypted using a one-time session key, and the session key is encrypted for each receiver addressed in the message, using the public key of each receiver, as described above. The resultant message is shown at 806, including a digital signature and Cert information 808 and a message body 810, both encrypted using the session key, followed by encrypted versions of the session key 812, 814 for each receiver.

When the signed and encrypted message 806 is received and placed into the appropriate mailboxes for users A and B by the message server 802, the wireless connector system 804 detects the new message and determines if any of the addressed message receivers has a mobile device (not shown) and whether or not the message is to be sent to a mobile device. If so, then a message is prepared for sending to each mobile device including the encrypted portions of the original received message and only the particular session key corresponding to the mobile device. In FIG. 8, the digital signature and Cert information 808 is encrypted and thus cannot be identified and rearranged by the wireless connector system 804. Therefore, the messages 816, 818 sent by the wireless connector system 804 to the mobile devices of users A and B each include the encrypted digital signature and Cert information 808 and the signed and encrypted message body 810 of the original message and only the respective encrypted session key 812, 814 for the mobile device. At each mobile device, the session key can be decrypted and used to decrypt the encrypted portions 808, 810 of the message to expose the original message body, the digital signature and the Cert information components. The message may then be viewed and digital signature verification can proceed on each mobile device.

As described above, when the wireless connector system 804 sends only the required encrypted session key to each mobile device, the RecipientInfo field (not shown) may also be removed from an encrypted message to further reduce the size of a message transmitted over a wireless network.

The embodiments of the system described above focus on rearranging and reducing the size of a secure message before sending it to a mobile device. Several further embodiments which provide different ways to pre-process a message to reduce data that must be transmitted over the air to a mobile device will now be described. One advantage of message pre-processing is that alternative techniques can be applied to messages that are both signed and encrypted, which are the most difficult messages to rearrange to reduce size, as will be apparent from the foregoing description.

Figure 9:
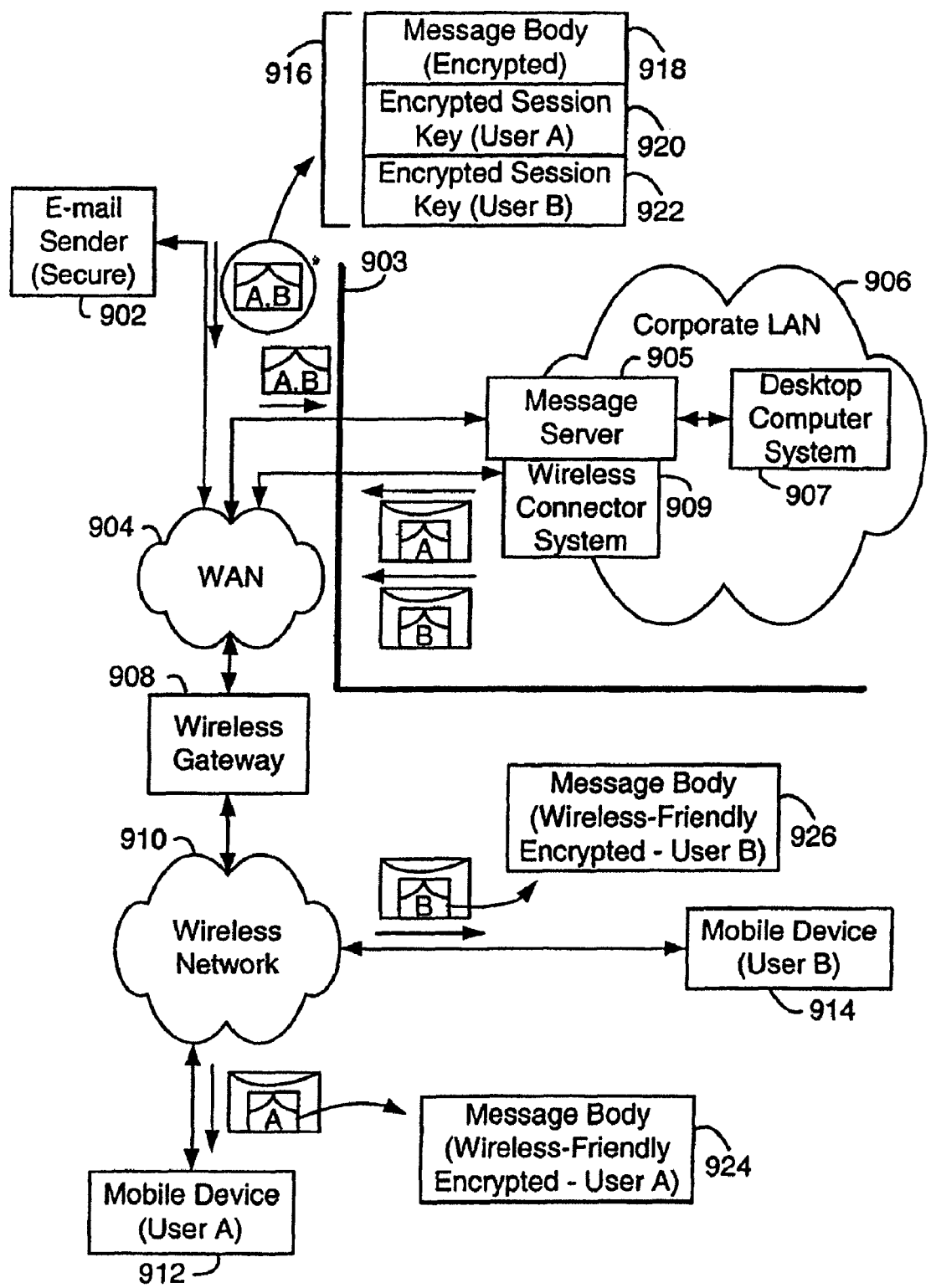
FIG. 9 is a block diagram showing an encrypted message pre-processing system.

FIG. 9 is a block diagram showing an encrypted message pre-processing system. The overall system is similar to the systems described above, in that the components shown in FIG. 9 are substantially the same as similarly labelled components in preceding Figures. As shown at 916, an encrypted e-mail message from an e-mail sender 902 addressed to users A and B includes an encrypted message body 918, and two encrypted session keys 920 and 922. As will be apparent to those skilled in the art, the portions of the encrypted message 918 need not necessarily be in the order shown in FIG. 9. In this example, it is assumed that a user's host computer system, one of which is shown at 907, and the user's mobile device 912 or 914, effectively share a common address, a feature supported by the wireless connector system 909. However, in some systems, a message might be addressed to both the user's mail account on a message server 905 and the user's wireless mail account. When wireless connector system 909 is implemented, it is more likely that the message will be addressed to a user's account on the message server 905.

In a preferred embodiment of the system, it is possible to share a single private key between a user's desktop computer system 907 and mobile device 912, 914 by loading the private key into the mobile device using for example the physical connection 50 and interface 65 as shown in FIG. 1 or some other trusted wired or wireless transfer mechanism. Where a user's desktop computer system 907 is configured for operation with a smart card or similar removable security-enabling component, this private key loading could be performed by a user by inserting their smart-card into a card reader and running a component of the wireless connector system 909, and/or possibly a software component on the desktop computer system 907, to load the private key from the card reader directly into a non-volatile memory of a mobile device. Alternatively, a card reader could be integrated into the mobile device to allow a user to access a private key using either a desktop computer system or a mobile device. Such private key sharing provides for mirrored e-mail stores at the two locations, i.e. a user's desktop computer system 907 and mobile device 912 or 914.

When the message 916 is sent by the sender 902, it is eventually routed through the WAN 904 to the message server 905 for processing and forwarding to the e-mail accounts of the addressed receivers, users A and B. The wireless connector system 909 detects the new message and determines whether or not it should be sent to a mobile device of any of the receivers. In accordance with an aspect of the system, for each receiver for which the message is to be sent to a mobile device, the wireless connector system 909 decrypts the message using the session key, re-encrypts the message using a different key and possibly a different encryption algorithm corresponding to a wireless-friendly security scheme implemented between the wireless connector system 909 and its associated mobile devices 912, 914, and sends the re-encrypted message to the receiver's mobile device. Such re-encrypted messages are shown at 924 and 926.

Since each version of the session key is encoded with a specific public key of a particular mobile device 912, 914, the wireless connector system 909 must somehow decrypt the session key before the message body can be decrypted and re-encrypted. In one embodiment of this aspect of the system, the wireless connector system 909 extracts the correct session key 920, 922 for each mobile device 912, 914 to which the received message is to be sent and sends it to each mobile device. For example, after extracting the correct encrypted session key for a mobile device user such as user A, the wireless connector system 909 may build an otherwise empty message that contains only the encrypted session key 920. The mobile device 912 receives this empty message and extracts the session key 920 from the message. The session key is then decrypted, preferably re-encrypted according to the above wireless-friendly security scheme, and sent back to the wireless connector system 909. The wireless connector system 909 then decrypts the re-encrypted session key and uses the decrypted session key to decrypt the encrypted message body on behalf of user A. The decrypted message body can then be re-encrypted according to the wireless-friendly security scheme and sent to mobile device 912. The re-encrypted message may then be decrypted on the mobile device 912 and displayed to user A. A similar process would be performed between the wireless connector system 909 and each mobile device to which a received encrypted message is to be sent.

This decryption of a message by the wireless connector system 909 reduces the amount of complex public key decryption operations that must be performed on a mobile device. Additionally, this allows the wireless connector system 909 to send only portions of the message to each mobile device, in the case of a very large e-mail message. Although the session key and message exchange described above could be repeated for each user, once the session key is decrypted and returned to the wireless connector system 909 by one mobile device and the encrypted message body is decrypted, the decrypted message body could then be re-encrypted for each mobile device to which the message is to be sent. This could simplify operations at the wireless connector system 909 in that the encrypted message body is decrypted only once, even when the message is to be sent to multiple mobile devices, and may also result in faster message transmission to some mobile devices, since a response with a re-encrypted session key need only be received by the wireless connector system 909 from one mobile device, not from each device to which a message is to be sent.

In some systems in which a desktop computer system such as 907 and a mobile device share a common private key, the private key might be accessible to the message server 905 and wireless connector system 909. Although this may be an unlikely scenario depending upon how private key technology evolves, this method does have the advantage of reducing the number of steps in an encrypted message decryption and transmission process, and also removes the need to send the decrypted session key over the air. As in the preceding embodiment, decryption of a message by the wireless connector system 909 reduces the number of public key operations that a mobile device must perform.

According to this embodiment of the system, the wireless connector system 909 has access to the private keys for any addressed receivers for which it provides wireless communication service. Instead of sending an encrypted session key directly to a mobile device as in the preceding embodiment, the wireless connector system uses the private key shared with the device to decrypt the session key. The session key is then used to decrypt the encrypted message body. For user A for example, the wireless connector system 909 would extract the encrypted session key 920 from the message 916, decrypt the session key using user A's private key, and use the session key to decrypt the encrypted message body 918. Once the message body is decrypted, it is re-encrypted using a wireless-friendly encryption method and transmitted to the appropriate mobile device, substantially as described above. The mobile device then decrypts the message and presents it to the user in its original form. This procedure provides the fastest message delivery time with the least amount of public key operations, which tend to be very processor- and power-intensive, on a mobile device.

It will be apparent that decryption and re-encryption of encrypted messages by the wireless connector system 909 would normally represent a security concern. However, in the system shown in FIG. 9, the decryption and re-encryption are performed behind the security firewall 903 and decrypted information therefore remains as secure as any other information in the corporate LAN 906. When a strong encryption scheme such as 3DES is used between the wireless connector system 909 and mobile devices 912, 914, any previously decrypted information, including decrypted messages or session keys, remain secure while being transferred between the wireless connector system 909 and mobile devices 912, 914.

Figure 10:
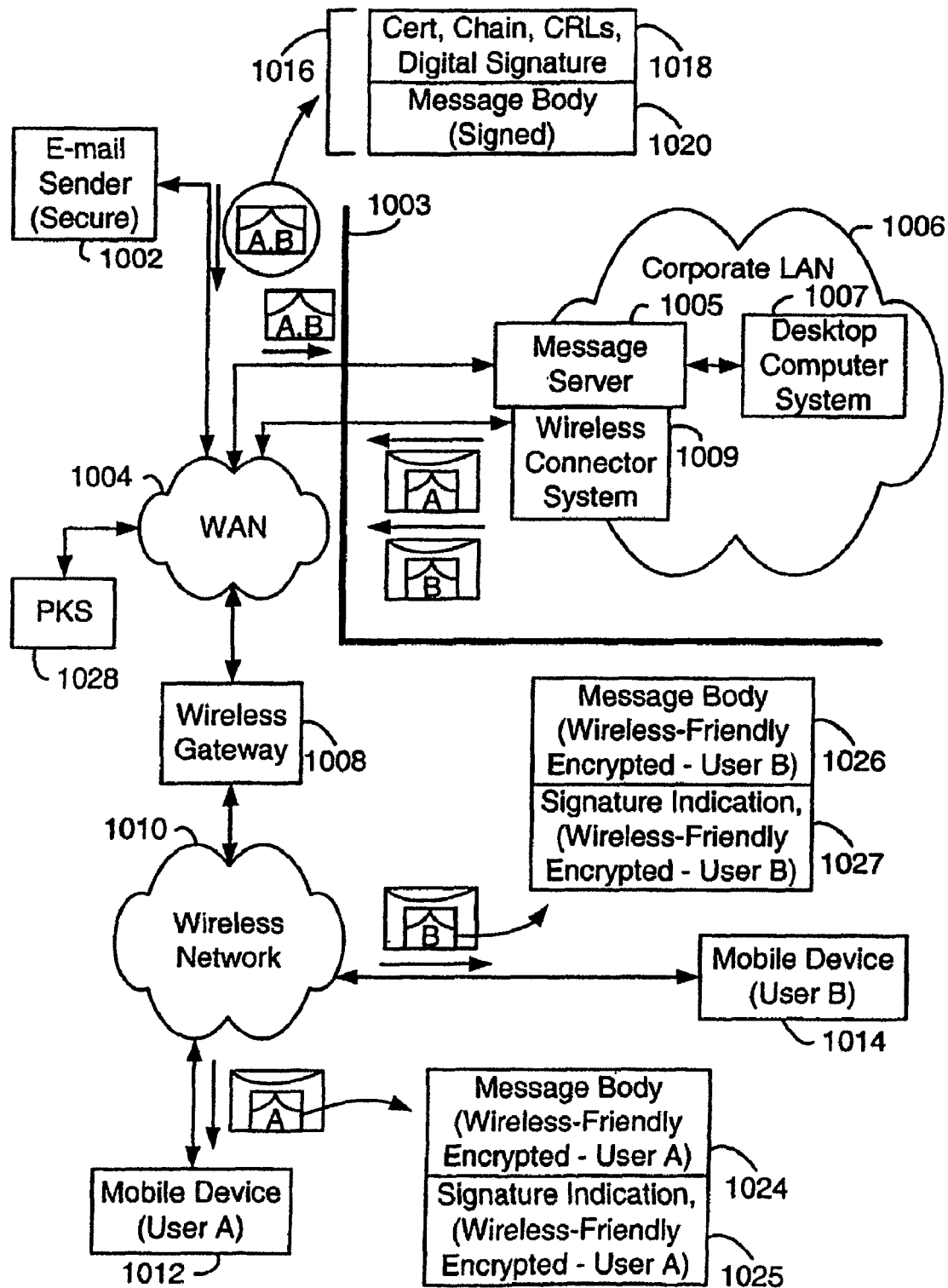
FIG. 10 is a block diagram of a signed message pre-processing system.

FIG. 10 is a block diagram of a signed message pre-processing system. The system in FIG. 10 is similar to the system in FIG. 9, with similarly labelled components in FIGS. 9 and 10 being substantially similar, although the system of FIG. 10 pre-processes signed messages. In FIG. 10, digital signature verification is performed on behalf of a mobile device user at the user's host system location (LAN 1006), thus saving the transmission of the digital signature and typically bulky Cert-related data.

A message 1016 signed by an e-mail message sender 1002 would include a digital signature component 1018 and a message body component 1020, as described above. When the signed message 1016 is received and forwarded to appropriate mailboxes by the message server 1005, the wireless connector system 1009 detects the new message and determines whether or not it should be sent to one or more mobile devices. In the example in FIG. 10, the message should be sent to both mobile devices 1012 and 1014.

The wireless connector system 1009 then detects that the message has been signed and attempts to find the public key of the sender. This public key could be retrieved from a local storage area or possibly from a PKS 1028 somewhere on the WAN 1004. Once the public key of the sender is retrieved, the digital signature can be verified by the wireless connector system 1009 on behalf of each mobile device user. A message is then prepared and forwarded to each mobile device 1012, 1014, preferably including an indication as to whether or not the digital signature was verified. As shown at 1024, 1025 and 1026, 1027, the original message body 1020 and signature indication are re-enveloped and possibly encrypted for security before being sent to the mobile devices 1012, 1014. Although the signature indication is not necessarily confidential, encryption thereof prevents an unauthorized party from inserting an incorrect signature indication or changing a signature indication. At each device, the outer envelope is removed and the message and signature indication are decrypted if necessary before being presented to the user.

Figure 11:
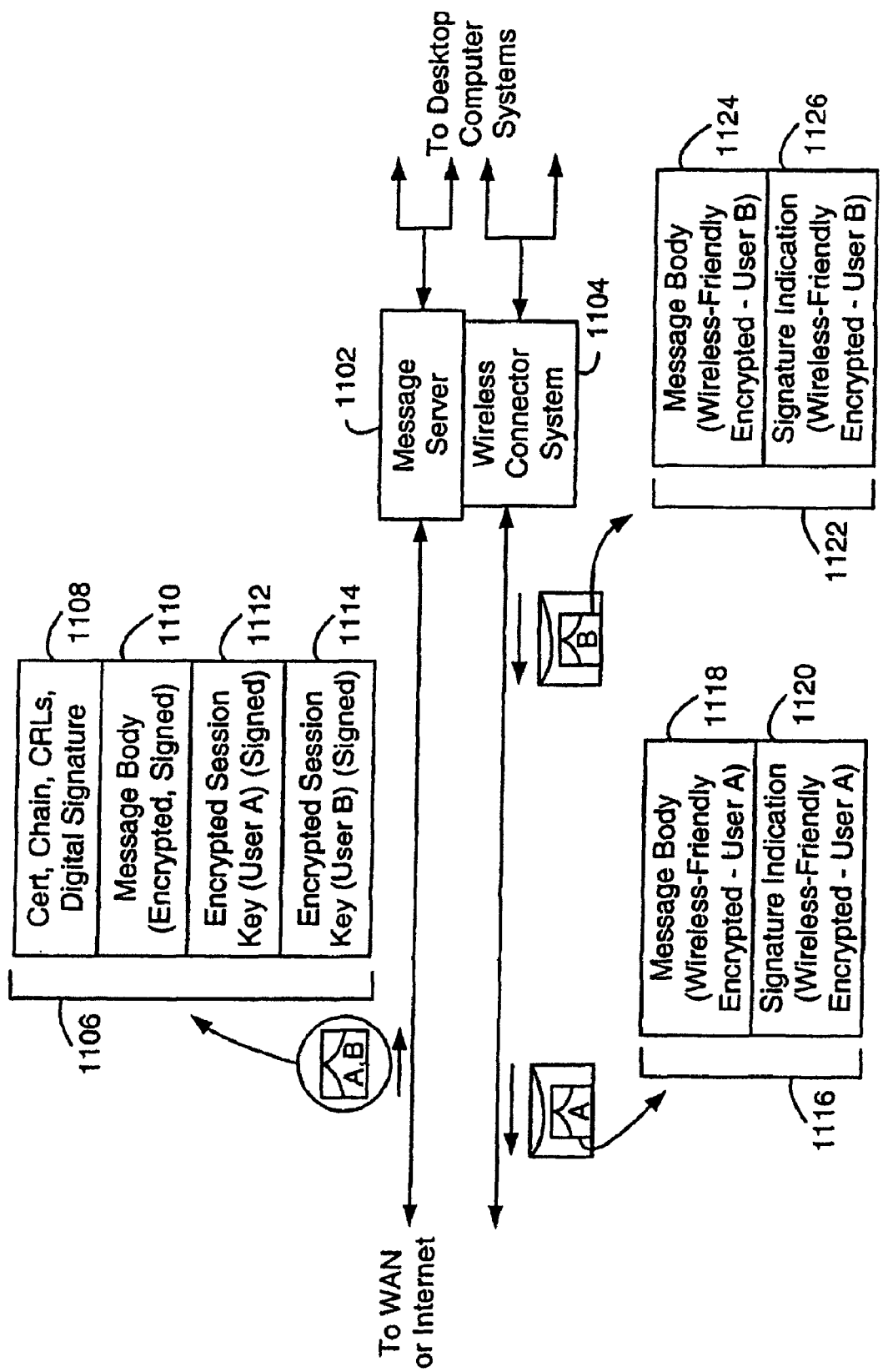
FIG. 11 is a block diagram illustrating secure message pre-processing for a received message that has been encrypted and then signed.

FIG. 11 is a block diagram illustrating secure message pre-processing for a received message that has been encrypted and then signed. In order to avoid congestion in the drawing, only the message server 1102 and wireless connector system 1104 are shown. It should be apparent to those skilled in the art that these components could be implemented in a system such as shown in the preceding drawings.

A secure message 1106 that has been encrypted and then signed may include such components as a digital signature and Cert-related information component 1108, an encrypted and signed message body 1110 and encrypted and signed session keys 1112 and 1114. Generation of such messages has been described in detail above. When such a message is received at the message server 1102 and distributed to appropriate user mailboxes for users A and B, the wireless connector system 1104 detects the new message and determines, in this example, that the message is to be sent to the mobile device (not shown) of each of users A and B. Since the message has been both signed and encrypted, pre-processing of the message includes several steps from each of the pre-processing schemes described above in conjunction with FIGS. 9 and 10.

The message 1106 has been encrypted first and signed second, such that the wireless connector system 1104 preferably first verifies the digital signature using the sender's public key. This key may be retrieved from a local memory or through a PKS for example. Whether or not the sender's digital signature is verified, pre-processing may proceed to obtain the session key used to encrypt the message. As described above, this may be accomplished by the wireless connector system 1104 by sending to a mobile device a corresponding encrypted version of the session key or, if the device's private key is accessible to the wireless connector system 1104, by accessing the private key and decrypting the session key. Once the session key has been decrypted by or returned to the wireless connector system 1104, the message can be decrypted. The decrypted message, and preferably a signature indication that the message was signed and whether or not the digital signature was verified, are then re-encrypted using a wireless friendly encryption algorithm and sent to each mobile device to which the message is to be sent. As shown at 1116 and 1122, the messages sent to the mobile devices of users A and B include the message body 1118, 1124 and a signature indication 1120, 1126, both of which are preferably encrypted. Each mobile device can then decrypt the message 1116, 1122 and present the message and signature indication to the mobile device user.

Figure 12:
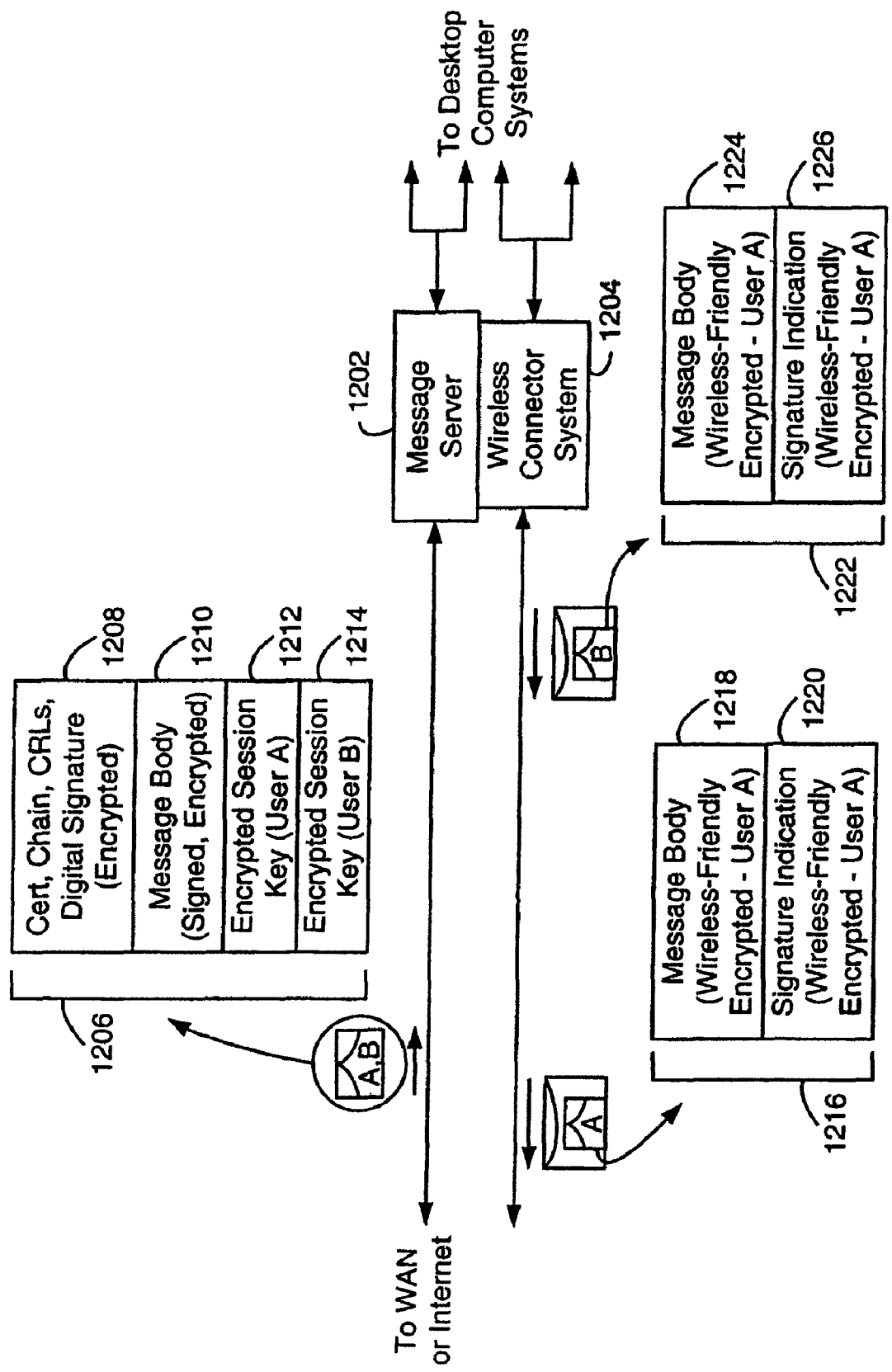
FIG. 12 is a block diagram illustrating secure message pre-processing for a received message that has been signed and then encrypted.

FIG. 12 is a block diagram similar to FIG. 11 but illustrating secure message pre-processing for a received message that has been signed and then encrypted. As in FIG. 11, only a message server 1202 and wireless connector system 1204 are shown in FIG. 12 to avoid congestion. However, it should be appreciated that the arrangement in FIG. 12 would normally be implemented as part of a larger system such as shown in FIG. 1 for example, which enables electronic message exchange.

A signed and then encrypted message, as described above and shown at 1206, typically comprises a digital signature and Cert-related information component 1208 and a message body component 1210, both of which were encrypted by a sender using a one-time session key, as well as encrypted versions of the session key 1212, 1214 for each addressed recipient of the message 1206, in this example users A and B. When the message 1206 is received by the message server 1202 and distributed to appropriate user mailboxes, the wireless connector system 1206 detects the new message and determines to which, if any, mobile devices (not shown) the message is to be sent.

Since the message 1206 has been signed first and then encrypted, the wireless connector system 1204 must first decrypt the message before any further pre-processing can be performed. To this end, the wireless connector system 1204 obtains the session key, which as described above may be accomplished by sending the corresponding respective encrypted session key to a mobile device for decryption or by accessing a user's private key and decrypting the session key. Once the session key has been returned to or decrypted by the wireless connector system 1204, the message 1206 can be decrypted and the digital signature and Cert information extracted. As described above, the digital signature can then be checked by retrieving the public key of the sender, from a local memory or through a PKS for example. A signature indication is then generated and attached to the message body. The message and indication are then preferably encrypted using a wireless-friendly encryption method and transmitted to each mobile device to which the message is to be sent. As shown at 1216 and 1222, a message to a mobile device includes the body of the message 1218, 1224 and an indication 1220, 1226 that the message had been signed and whether or not the digital signature was verified. At a mobile device, the transmitted message is decrypted to retrieve the original message and the signature indication.

Figure 13:
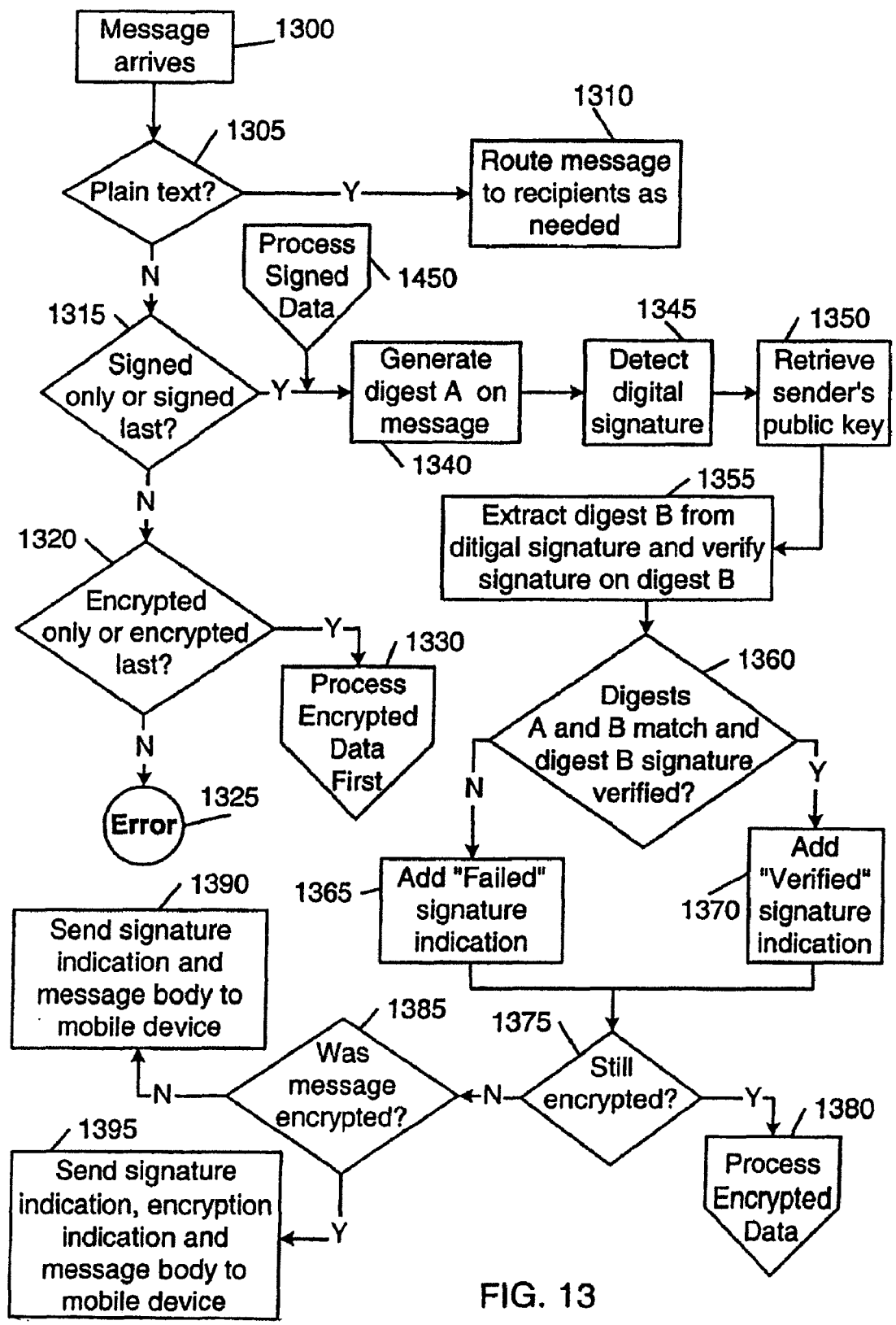
FIGS. 13 and 14 show a flow chart illustrating a method for pre-processing signed, encrypted or signed and encrypted messages before sending them to a mobile device.
Figure 14:
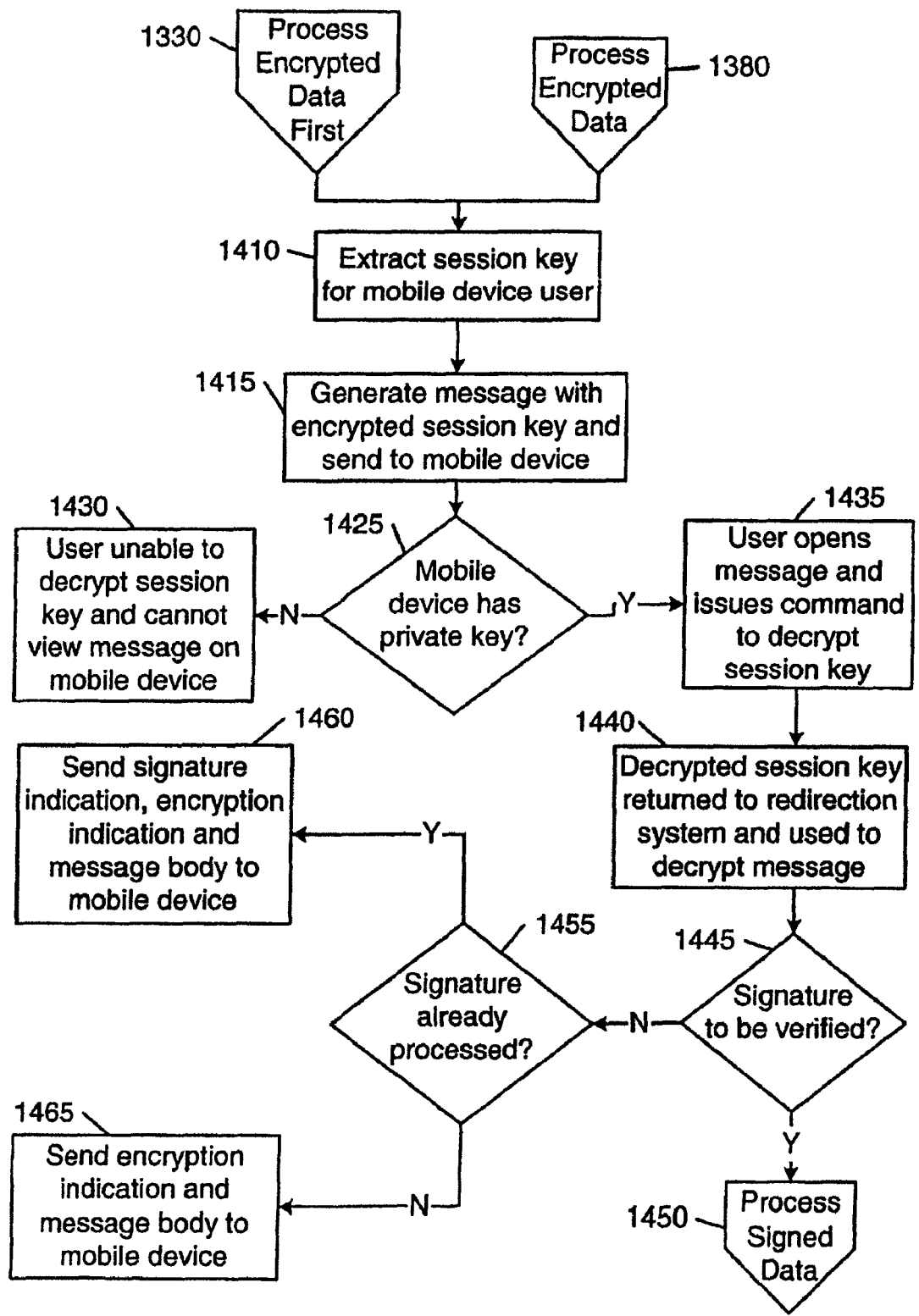

FIGS. 13 and 14 show a flow chart illustrating a method for pre-processing signed, encrypted or signed and encrypted messages before sending them to a mobile device. In these drawings, it is assumed that a message has been received and placed into a message storage location and that a wireless connector system has detected the new message. It should be apparent that the method shown in FIGS. 13 and 14 applies only to those messages that the wireless connector system determines should be sent to one or more mobile devices.

Turning now to FIG. 13, the method begins at step 1300 when a message that is to be sent to a mobile device arrives from a message sender. The wireless connector system then checks to see if the message is in plain text, at step 1305. This check can be performed for example by checking the MIME type of the message, and/or looking for attachments with a certain format and MIME type. If the message is plain text, then it is routed to each of the mobile devices. If the information is not plain text, then a check is made to determine if the message was signed but not encrypted (i.e. signed only) or signed last, at step 1315. If the message was not signed only or signed last, this would mean the message may have been encrypted but not signed (i.e. encrypted only) or signed first and encrypted last, and the encryption would have to be processed first. A determination as to whether or not the message was encrypted only or encrypted last is made at step 1320. If it is determined that the message was not encrypted only or encrypted last, then the message may be a plain text message or a signed only or signed last message that was not detected steps 1305 or 1315, or the message has a format that the wireless connector system cannot handle. In either of these cases, an error may be declared, as indicated at 1325. As those skilled in the art will appreciate, error handling will be dependent upon the system in which the system is implemented. If the message was encrypted only or encrypted last, the method proceeds to process the encryption, at step 1330, which is shown in detail in FIG. 14 and described below.

If the message has been signed only or signed last, as determined at step 1315, then a digest of the message is generated at step 1340, as described above. The digital signature attached to the message is then detected at 1345. In order to continue with digital signature verification, the public key of the sender is retrieved at step 1350 from local memory, from a PKS or similar system or possibly from a Cert attached to the original message, included in a SignerInfo component of the message for example. The digest in the detected digital signature is the extracted and the signature on the digest is verified, at step 1355, using the public key of the sender.

The digests A and B are then compared at step 1360 to determine if they match. It is also determined whether or not the signature of the digest was verified. If either of these conditions is not satisfied, then the signature was not verified, and a "failed" or like signature indication would be attached to the message at step 1365. If both conditions are met, then the signature was properly verified and a "verified" or similar signature indication is added to the message at step 1370.

At step 1375, it is determined whether or not the message is still encrypted. If so, for a message that was encrypted and then signed, the method continues at step 1380 to process encrypted data, as shown in FIG. 14 and described in further detail below. If the message is not still encrypted, then a check may be made at step 1385 to determine whether or not it had been encrypted. For a signed first and encrypted last message, message decryption would have been completed before signature verification. If it had been encrypted, then a message including the appropriate signature indication, an encryption indication or flag which indicates that the message had originally been encrypted and the message body is constructed and sent to the mobile device at step 1395. Otherwise, the message sent to the mobile device at step 1390 includes the signature indication and the message body. Alternatively, if a mobile device user does not need to know whether or not a message was originally encrypted, which could be a configurable setting stored in a user profile accessible by the wireless connector system, step 1375 could proceed directly to step 1390 and no encryption indication is sent.

Although not shown in FIG. 13, the encoding, compression and encryption schemes described above may be employed by the wireless connector system as part of steps 1390 and 1395 before pre-processed secure messages are sent to a mobile device.

Turning now to FIG. 14, method steps associated with processing of encrypted parts of a message are shown. Encryption processing may begin either when a message has been encrypted last or encrypted only (step 1330) or when signature verification operations have been completed for an encrypted and then signed message (step 1380).

The first step in processing the encrypted data is to locate the encrypted session key for the particular mobile device user, at step 1410, by using a RecipientInfo field of the received message for example. At the next step 1415, the wireless connector system generates and sends to the mobile device a message that contains the encrypted session key, as described above. This message may have text for the user to provide such information about the message as the size, date and originator of the message, with an indication that it is encrypted. When this message is received at the mobile device, it is determined, by a secure messaging software application on the mobile device for example, whether or not the private key that can be used to decrypt the session key is available on the device, at step 1425. If the device does not have the correct private key or the user does not want to decrypt the message, then the message cannot be viewed by the user on the mobile device. Otherwise, as an optional step 1435, the user may be given the choice to decrypt the session key (step 1435), for example via a menu in a message list of the mobile device. The decrypted session key is then passed back to the wireless connector system and the original message is decrypted, at step 1440.

Once the decryption is complete, a test is performed at step 1445 to determine if a digital signature is to be verified. If so, then the method proceeds at step 1450 to process the digital signature as described above with reference to FIG. 13. If there is no digital signature to be verified, then a further test is performed at step 1455 to determine if a digital signature was already processed. If the digital signature was already processed, i.e. when encryption processing begins at step 1380, the decrypted message with the signature indication and possibly an encryption indication described above are sent to the mobile device at step 1460. Otherwise, if the message was not signed, then the decrypted message and possibly an encryption indication are sent to the mobile device, as shown at step 1465.

The flow chart shown in FIGS. 13 and 14 is intended for illustrative purposes only and not to limit the scope of the system. The steps outlined in the flow chart may be performed in a different order, some of the steps may be combined with other steps or omitted, and further steps and operations may be performed, all without departing from the system. For example, the order in which operations are performed for digital signature verification may be different than shown in FIG. 13. In some systems, the digital signature might be detected before the digest A is generated, or digest B might be recovered before digest A is generated. Also, message pre-processing could be halted at step 1360 if the digital signature is not verified. Other variations of the method in FIGS. 13 and 14 will be apparent to those skilled in the art and as such are considered to be within the scope of the system.

Figure 15:
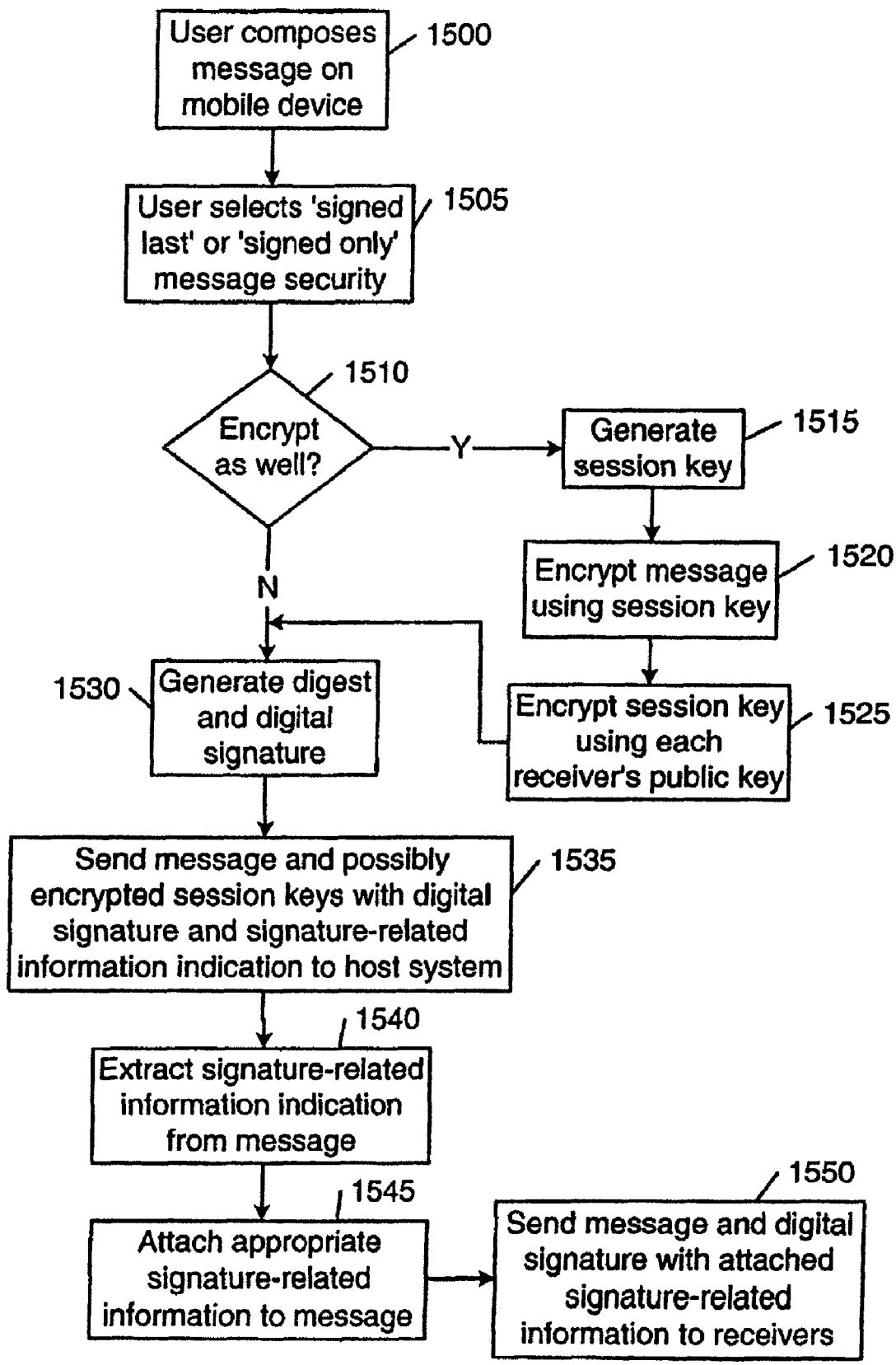
FIG. 15 is a flow chart of a method for post-processing signed or encrypted and then signed messages sent from a mobile device.

FIG. 15 is a flow chart of a method for post-processing signed or encrypted and then signed messages sent from a mobile device. Similar to the message pre-processing embodiments described above, a mobile device and host system operating with a wireless connector system can be configured such that the host system post-processes messages sent from the mobile device.

In FIG. 15, the method begins at step 1500 when a user composes a message on a mobile device. When the mobile device is enabled for secure communications, the user may select at step 1505 additional message security features, including in the example of FIG. 15 "signed last", i.e. encrypted and then signed, or "signed only" message security. This type of message security could be provided for example by using S/MIME or some other possibly proprietary secure messaging scheme.

A test is then performed at step 1510 to determine if the user has selected to encrypt the message before signing. When the message is to be encrypted before signing, a session key is generated at step 1515, the message is encrypted using the session key at step 1520, and the session key is then encrypted at step 1525 using the public key of each intended message receiver. These public keys are preferably stored in a memory on the mobile device, but may instead be requested from an external source such as a PKS or like system if required.

When the message has been encrypted, or the message is not to be encrypted, the method continues at step 1530, and the message, as well as the encrypted versions of the session key if the message was encrypted, is passed to a digest function and the user's private key is used to generate a digital signature, at step 1530. Instead of attaching signature-related information such as the sender's Cert, Cert chain and any CRLs to the message at the mobile device for transfer to the wireless connector system at the host system over the air, the mobile device preferably includes in the message sent to the host system a Cert information indication which is processed by the wireless connector system to determine what if any Cert information should be attached to the message. This allows a mobile device to send signed messages through a host system while avoiding the transfer of bulky Cert-related information via wireless communication links. Therefore, at step 1535, the mobile device sends to the host system the original message (now possibly encrypted), the digital signature, and the Cert information indication, as well as one or more encrypted session keys if the message was encrypted. All of this information may be encoded, compressed and encrypted using a wireless-friendly method before it is sent to the host system.

Post-processing of such a message at a host system begins at step 1540. The wireless connector system operating at the host system extracts the Cert information indication from the message and determines what Cert information should be included with the message. The appropriate Cert information identified in the extracted Cert information indication, including for example the sender's Cert, as well as possibly chained Certs and CRLs, is attached to the message at step 1545. The message, digital signature and attached Cert information are then sent from the host system to all receivers, at step 1550.

When a mobile device user composes a message and selects only message encryption or signing and then encryption, post processing of the resultant encrypted message may be performed at the host system if the wireless connector system operating at the host system has access to the session key used to encrypt the message. Otherwise, the host system in unable to decrypt such a message and therefore cannot perform post-processing operations on the message. In this case, a message composed on a mobile device, along with an attached digital signature and any required Certs and CRLs, will be encrypted on the mobile device using a session key, and the encrypted message and encrypted versions of the session key will be sent from the mobile device to the host system for delivery to addressed receivers. Any required Certs and CRLs must be attached to the message on the mobile device, and encryption of the entire message and the session key must be handled on the device.

Figure 16:
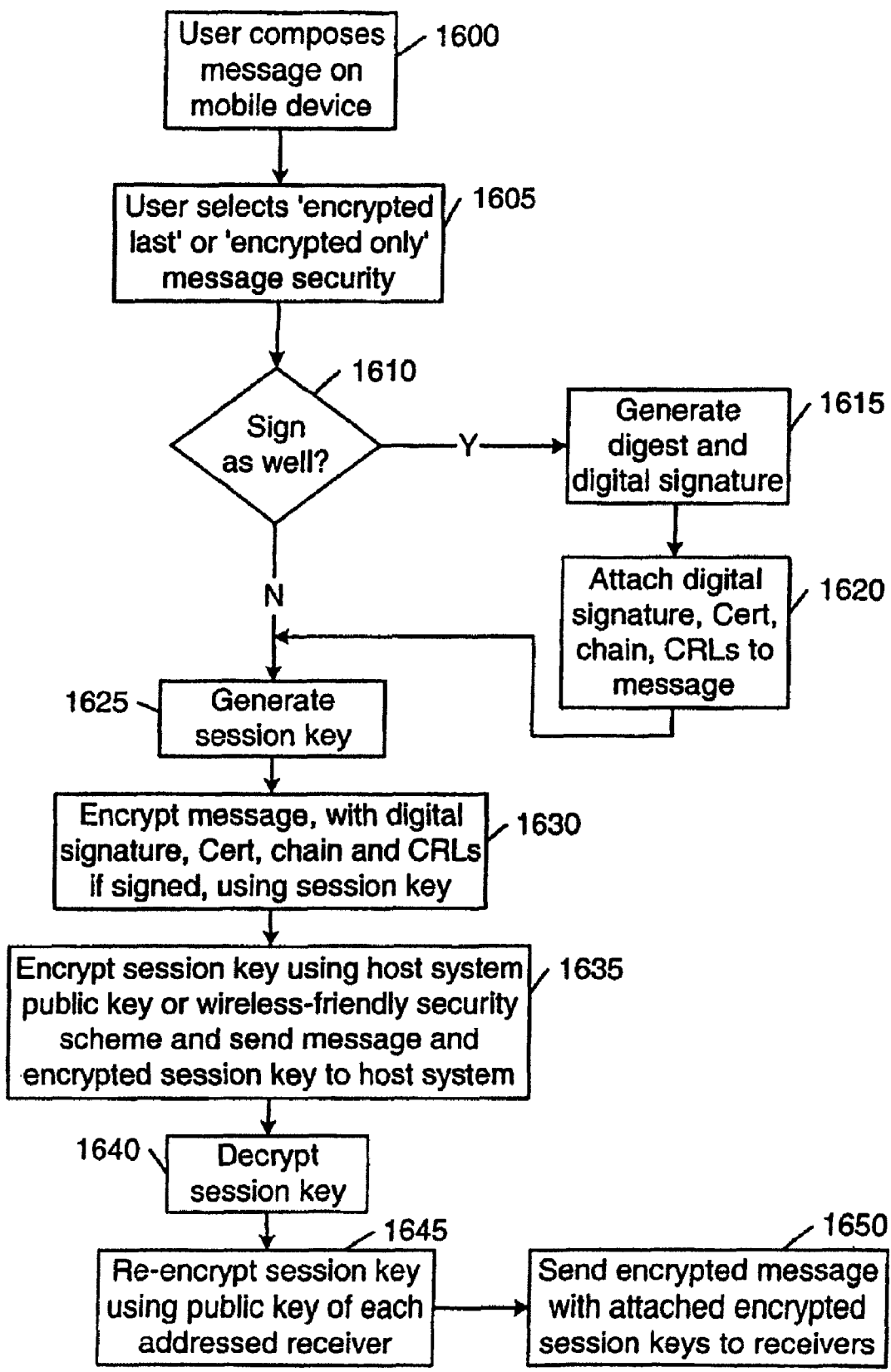
FIG. 16 is a flow chart of a method for post-processing encrypted or signed and then encrypted messages sent from a mobile device.

However, if the session key could be transferred to the host system, then some of the encryption and possibly other secure message processing operations could be performed by the host system, as shown in FIG. 16, which is a flow chart of a method for post-processing encrypted or signed and then encrypted messages sent from a mobile device. For example, instead of encrypting the session key using the public key of each addressed receiver, the session key could be encrypted with the public key associated with the host system or the mobile device user's desktop computer system at the host system location. Provided that the wireless connector system has access to the corresponding private key of the host system or user, the session key can then be decrypted at the host system. Similarly, if a wireless-friendly security scheme is implemented for communications between the mobile device and the wireless connector system operating at the host system, then the session key could be encrypted by the mobile device according to this scheme and then decrypted by the host system. This potentially allows the host system instead of the mobile device to perform several operations that must otherwise be performed by the mobile device.

Referring now in detail to FIG. 16, a user composes a message on a mobile device at step 1600 and selects either encryption only or encryption after signing (encrypted last) message security at step 1605. At step 1610, it is determined whether or not the user selected to have the message signed and then encrypted. If so, then a digest and digital signature are generated at step 1615, and the user's Cert, Cert chain and any required CRLs are attached to the message at step 1620. When signing is complete, or if the message is to be encrypted without first being signed, the method proceeds at step 1625, where the device generates a session key to be used in encrypting the message. The message, along with the attached digital signature and Cert information if the message was signed, is then encrypted using the session key at step 1630. Then, at step 1635, the session key is encrypted using either a public key associated with a private key available to the wireless connector system operating at the host system, a wireless-friendly security method, or possibly both, and the encrypted message and encrypted session key are sent to the host system. Where a wireless friendly security scheme exists, it should be apparent that the encrypted message might be double-encrypted for transfer to the host system. Encoding, compression and message enveloping techniques may also be applied to the message and session key for transfer to the host system.

When the message and encrypted session key are received at the host system, any encoding, compression, encryption and enveloping that may be applied for data transfer between the mobile device and the host system are reversed by the wireless connector system. Where the session key was further encrypted by the device, using a public key for example, it is then decrypted by the wireless connector system at step 1640 using the corresponding private key. The wireless connector system, using the decrypted session key, can then re-encrypt the session key using the public key of each addressed receiver, at step 1645, and attach the encrypted session keys to the message before forwarding the message for delivery to the addressed receivers, as indicated at step 1650. Encryption of the session key for each receiver is thereby offloaded from the mobile device to the host system.

Although not shown in FIG. 16, this method can be extended to provide for more post-processing of an encrypted message at the host system. Since the wireless connector system at the host system has the session key, the message itself may be decrypted. Therefore, the device need not necessarily attach Cert information (its Cert, a Cert chain or any CRLs) to the message before encryption. Instead, as described above in conjunction with FIG. 15, a Cert information indication could be attached to the message. The wireless connector system, using the session key, can decrypt the message, process the signature information indication and then attach any required signature information. Once this information is attached, the wireless connector system can then re-encrypt the message using the session key and encrypt the session key for each addressed receiver. According to this method, typically bulky signature information is added to the message by the host system, such that encryption of this information by the device, as well as transfer of the information over the air, is avoided.

If a strong wireless friendly security scheme is in place between the mobile device and the host system, then the message and session key, as well as the digital signature and any Cert information indication could be encrypted according to this security scheme and sent to the host system. The host system could then attach required Cert information identified in the Cert information indication to the message, encrypt the message, digital signature and Cert information using the session key and then encrypt the session key for the addressed receivers. In this case, the session key could possibly be generated by the host system instead of the mobile device, further reducing the amount of data sent from the mobile device. The mobile device then need only use the wireless friendly security scheme to enable secure messaging via such techniques as S/MIME and PGP. Message post-processing moves the bulk of data processing operations from the mobile device to the more powerful host system.

Where the host system also has access to the mobile device user's signature key, the post-processing concept can be even further expanded to encompass signing of a secure message. A mobile device could then transfer to the host system a message, an indication that the message should be signed, a Cert information indication if applicable, an indication that the message should be encrypted, and either a session key or an indication that the host system should choose the session key. The host system can then handle all encryption and signature operations on behalf of the mobile device.

Although these techniques reduce both the amount of data that must be transferred from the mobile device and the complexity of device-based processing operations required for secure messaging, encryption at the host system using the session key, as well as signature generation at the host system, assume either a secure transport between the mobile device and host system or that the host system has access to a users' private keys.

Figure 17:
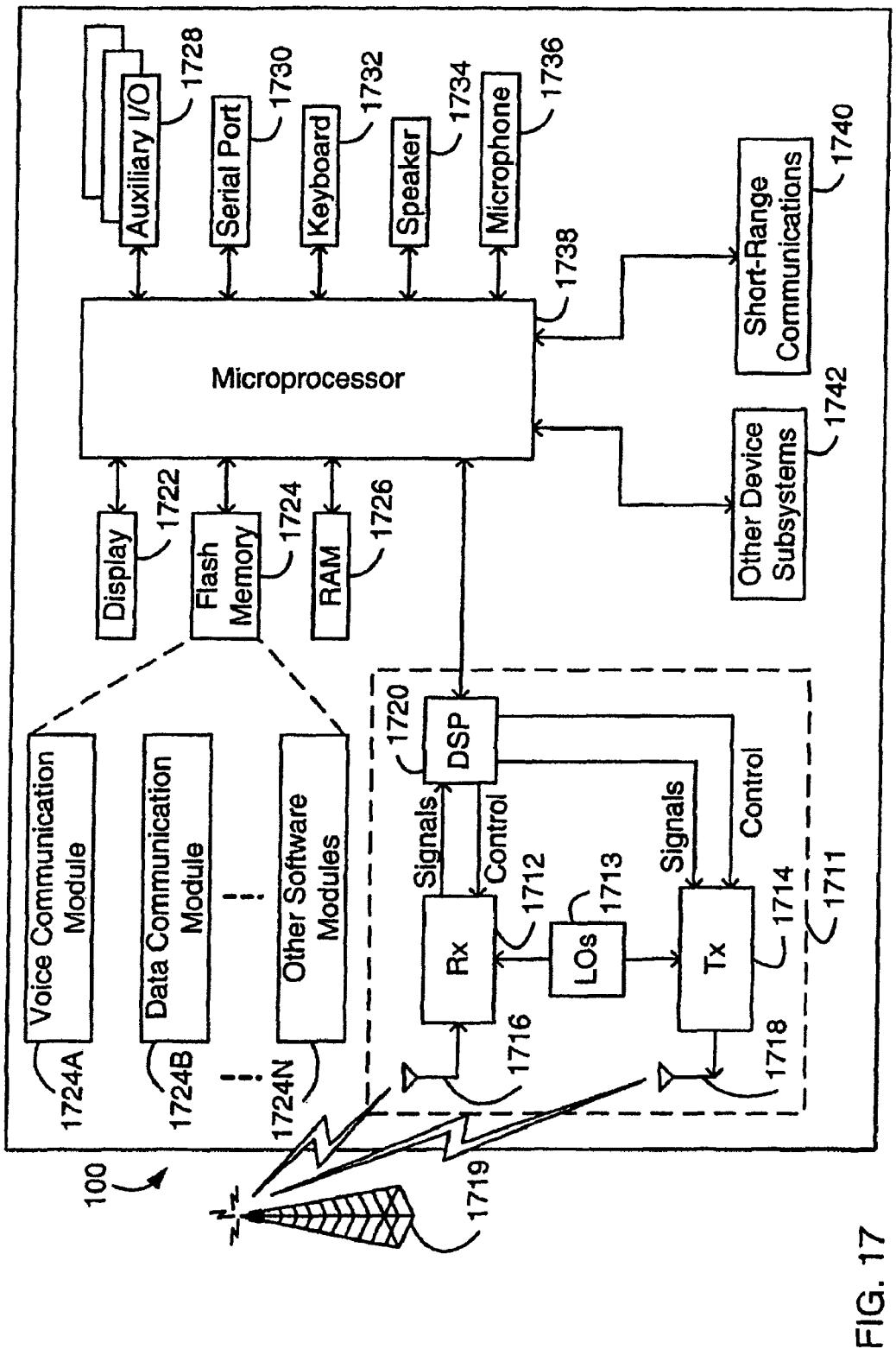
FIG. 17 is a block diagram of an exemplary wireless communication device that could be used with the systems and methods described herein.

Turning now to FIG. 17, a block diagram of an exemplary wireless communication device that could be used with the systems and methods described herein is shown. The mobile communication device 100 is preferably a two-way communication device having voice and/or data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities). As mentioned above, such devices are referred to generally herein simply as mobile devices.

The dual-mode device 100 includes a transceiver 1711, a microprocessor 1738, a display 1722, Flash memory 1724, RAM 1726, auxiliary input/output (I/O) devices 1728, a serial port 1730, a keyboard 1732, a speaker 1734, a microphone 1736, a short-range wireless communications sub-system 1740, and may also include other device sub-systems 1742. The transceiver 1711 preferably includes transmit and receive antennas 1716, 1718, a receiver (Rx) 1712, a transmitter (Tx) 1714, one or more local oscillators (LOs) 1713, and a digital signal processor (DSP) 1720. Within the Flash memory 1724, the device 100 preferably includes a plurality of software modules 1724A-1724N that can be executed by the microprocessor 1738 (and/or the DSP 1720), including a voice communication module 1724A, a data communication module 1724B, and a plurality of other operational modules 1724N for carrying out a plurality of other functions.

The mobile communication device 100 is preferably a two-way communication device having voice and data communication capabilities. Thus, for example, the device may communicate over a voice network, such as any of the analog or digital cellular networks, and may also communicate over a data network. The voice and data networks are depicted in FIG. 17 by the communication tower 1719. These voice and data networks may be separate communication networks using separate infrastructure, such as base stations, network controllers, etc., or they may be integrated into a single wireless network. References to the network 1719 should therefore be interpreted as encompassing both a single voice and data network or separate networks.

The communication subsystem 1711 is used to communicate with the network 1719. The DSP 1720 is used to send and receive communication signals to and from the transmitter 1714 and receiver 1712, and may also exchange control information with the transmitter 1714 and receiver 1712. If the voice and data communications occur at a single frequency, or closely-spaced set of frequencies, then a single LO 1713 may be used in conjunction with the transmitter 1714 and receiver 1712. Alternatively, if different frequencies are utilized for voice communications versus data communications, then a plurality of LOs 1713 can be used to generate a plurality of frequencies corresponding to the network 1719. Although two antennas 1716, 1718 are depicted in FIG. 17, the mobile device 100 could be used with a single antenna structure. Information, which includes both voice and data information, is communicated to and from the communication module 1711 via a link between the DSP 1720 and the microprocessor 1738.

The detailed design of the communication subsystem 1711, such as frequency band, component selection, power level, etc., will be dependent upon the communication network 1719 in which the device 100 is intended to operate. For example, a device 100 intended to operate in a North American market may include a communication subsystem 1711 designed to operate with the Mobitex or DataTAC mobile data communication networks and also designed to operated with any of a variety of voice communication networks, such as AMPS, TDMA, CDMA, PCS, etc., whereas a device 100 intended for use in Europe may be configured to operate with the GPRS data communication network and the GSM voice communication network. Other types of data and voice networks, both separate and integrated, may also be utilized with the mobile device 100.

Depending upon the type of network 1719, the access requirements for the dual-mode mobile device 100 may also vary. For example, in the Mobitex and DataTAC data networks, mobile devices are registered on the network using a unique identification number associated with each device. In GPRS data networks, however, network access is associated with a subscriber or user of a device 100. A GPRS device typically requires a subscriber identity module ("SIM"), which is required in order to operate the device 100 on a GPRS network. Local or non-network communication functions (if any) may be operable, without the SIM, but the device 100 will be unable to carry out any functions involving communications over the network 1719, other than any legally required operations, such as '911' emergency calling.

After any required network registration or activation procedures have been completed, the dual-mode device 100 may send and receive communication signals, preferably including both voice and data signals, over the network 1719. Signals received by the antenna 1716 from the communication network 1719 are routed to the receiver 1712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1720. In a similar manner, signals to be transmitted to the network 1719 are processed, including modulation and encoding, for example, by the DSP 1720 and are then provided to the transmitter 1714 for digital to analog conversion, frequency up conversion, filtering, amplification and transmission to the communication network 1719 via the antenna 1718. Although a single transceiver 1711 is shown in FIG. 17 for both voice and data communications, it is possible that the device 100 may include two distinct transceivers, a first transceiver for transmitting and receiving voice signals, and a second transceiver for transmitting and receiving data signals.

In addition to processing the communication signals, the DSP 1720 may also provide for receiver and transmitter control. For example, the gain levels applied to communication signals in the receiver 1712 and transmitter 1714 may be adaptively controlled through automatic gain control algorithms implemented in the DSP 1720. Other transceiver control algorithms could also be implemented in the DSP 1720 in order to provide more sophisticated control of the transceiver 1711.

The microprocessor 1738 preferably manages and controls the overall operation of the dual-mode mobile device 100. Many types of microprocessors or microcontrollers could be used here, or, alternatively, a single DSP 1720 could be used to carry out the functions of the microprocessor 1738. Low-level communication functions, including at least data and voice communications, are performed through the DSP 1720 in the transceiver 1711. Other, high-level communication applications, such as a voice communication application 1724A, and a data communication application 1724B may be stored in the Flash memory 1724 for execution by the microprocessor 1738. For example, the voice communication module 1724A may provide a high-level user interface operable to transmit and receive voice calls between the dual-mode mobile device 100 and a plurality of other voice devices via the network 1719. Similarly, the data communication module 1724B may provide a high-level user interface operable for sending and receiving data, such as e-mail messages, files, organizer information, short text messages, etc., between the dual-mode mobile device 100 and a plurality of other data devices via the network 1719. On the device 100, a secure messaging software application may operate in conjunction with the data communication module 1724B in order to implement the secure messaging techniques described above.

The microprocessor 1738 also interacts with other device subsystems, such as the display 1722, Flash memory 1724, random access memory (RAM) 1726, auxiliary input/output (I/O) subsystems 1728, serial port 1730, keyboard 1732, speaker 1734, microphone 1736, a short-range communications subsystem 1740 and any other device subsystems generally designated as 1742. For example, the modules 1724A-N are executed by the microprocessor 1738 and may provide a high-level interface between a user of the mobile device and the mobile device. This interface typically includes a graphical component provided through the display 1722, and an input/output component provided through the auxiliary I/O 1728, keyboard 1732, speaker 1734, or microphone 1736.

Some of the subsystems shown in FIG. 17 perform communication-related functions, whereas other subsystems may provide "resident" or on-device functions. Notably, some subsystems, such as keyboard 1732 and display 1722 may be used for both communication-related functions, such as entering a text message for transmission over a data communication network, and device-resident functions such as a calculator or task list or other PDA type functions.

Operating system software used by the microprocessor 1738 is preferably stored in a persistent store such as Flash memory 1724. In addition to the operating system and communication modules 1724A-N, the Flash memory 1724 may also include a file system for storing data. A storage area is also preferably provided in the Flash memory 1724 to store public keys, a private key, and other information required for secure messaging. The operating system, specific device applications or modules, or parts thereof, may be temporarily loaded into a volatile store, such as RAM 1726 for faster operation. Moreover, received communication signals may also be temporarily stored to RAM 1726, before permanently writing them to a file system located in the persistent store 1724.

An exemplary application module 1724N that may be loaded onto the dual-mode device 100 is a personal information manager (PIM) application providing PDA functionality, such as calendar events, appointments, and task items. This module 1724N may also interact with the voice communication module 1724A for managing phone calls, voice mails, etc., and may also interact with the data communication module 1724B for managing e-mail communications and other data transmissions. Alternatively, all of the functionality of the voice communication module 1724A and the data communication module 1724B may be integrated into the PIM module.

The Flash memory 1724 preferably provides a file system to facilitate storage of PIM data items on the device. The PIM application preferably includes the ability to send and receive data items, either by itself, or in conjunction with the voice and data communication modules 1724A, 1724B, via the wireless network 1719. The PIM data items are preferably seamlessly integrated, synchronized and updated, via the wireless network 1719, with a corresponding set of data items stored or associated with a host computer system, thereby creating a mirrored system for data items associated with a particular user.

The mobile device 100 may also be manually synchronized with a host system by placing the device 100 in an interface cradle, which couples the serial port 1730 of the mobile device 100 to the serial port of the host system. The serial port 1730 may also be used to enable a user to set preferences through an external device or software application, to download other application modules 1724N for installation, and to load Certs, keys and other information onto a device as described above. This wired download path may be used to load an encryption key onto the device, which is a more secure method than exchanging encryption information via the wireless network 1719.

Additional application modules 1724N may be loaded onto the dual-mode device 100 through the network 1719, through an auxiliary I/O subsystem 1728, through the serial port 1730, through the short-range communications subsystem 1740, or through any other suitable subsystem 1742, and installed by a user in the Flash memory 1724 or RAM 1726. Such flexibility in application installation increases the functionality of the device 100 and may provide enhanced on-device functions, communication-related functions, or both. For example, secure communication applications may enable electronic commerce functions and other such financial transactions to be performed using the device 100.

When the dual-mode device 100 is operating in a data communication mode, a received signal, such as a text message or a web page download, will be processed by the transceiver 1711 and provided to the microprocessor 1738, which will preferably further process the received signal for output to the display 1722, or, alternatively, to an auxiliary I/O device 1728. A user of dual-mode device 100 may also compose data items, such as email messages, using the keyboard 1732, which is preferably a complete alphanumeric keyboard laid out in the QWERTY style, although other styles of complete alphanumeric keyboards such as the known DVORAK style may also be used. User input to the device 100 is further enhanced with a plurality of auxiliary I/O devices 1728, which may include a thumbwheel input device, a touchpad, a variety of switches, a rocker input switch, etc. The composed data items input by the user may then be transmitted over the communication network 1719 via the transceiver 1711. Secure messages received by and to be transmitted from the mobile device 100 are processed by the data communication module 1724B or an associated secure messaging software application according to the techniques described above.

When the dual-mode device 100 is operating in a voice communication mode, the overall operation of the device 100 is substantially similar to the data mode, except that received signals are preferably output to the speaker 1734 and voice signals for transmission are generated by a microphone 1736. In addition, the secure messaging techniques described above might not necessarily be applied to voice communications. Alternative voice or audio I/O subsystems, such as a voice message recording subsystem, may also be implemented on the device 100. Although voice or audio signal output is preferably accomplished primarily through the speaker 1734, the display 1722 may also be used to provide an indication of the identity of a calling party, the duration of a voice call, or other voice call related information. For example, the microprocessor 1738, in conjunction with the voice communication module 1724A and the operating system software, may detect the caller identification information of an incoming voice call and display it on the display 1722.

A short-range communications subsystem 1740 may also be included in the dual-mode device 100. For example, the subsystem 1740 may include an infrared device and associated circuits and components, or a Bluetooth™ short-range wireless communication module to provide for communication with similarly-enabled systems and devices.

Having described in detail the preferred embodiments of the system, including the preferred methods of operation, it is to be understood that this operation could be carried out with different elements and steps. This preferred embodiment is presented only by way of example and is not meant to limit the scope of the present invention. For example, FIGS. 18 and 19 illustrate pre-processing and post-processing messages involving wireless mobile communications devices.

Figure 18:
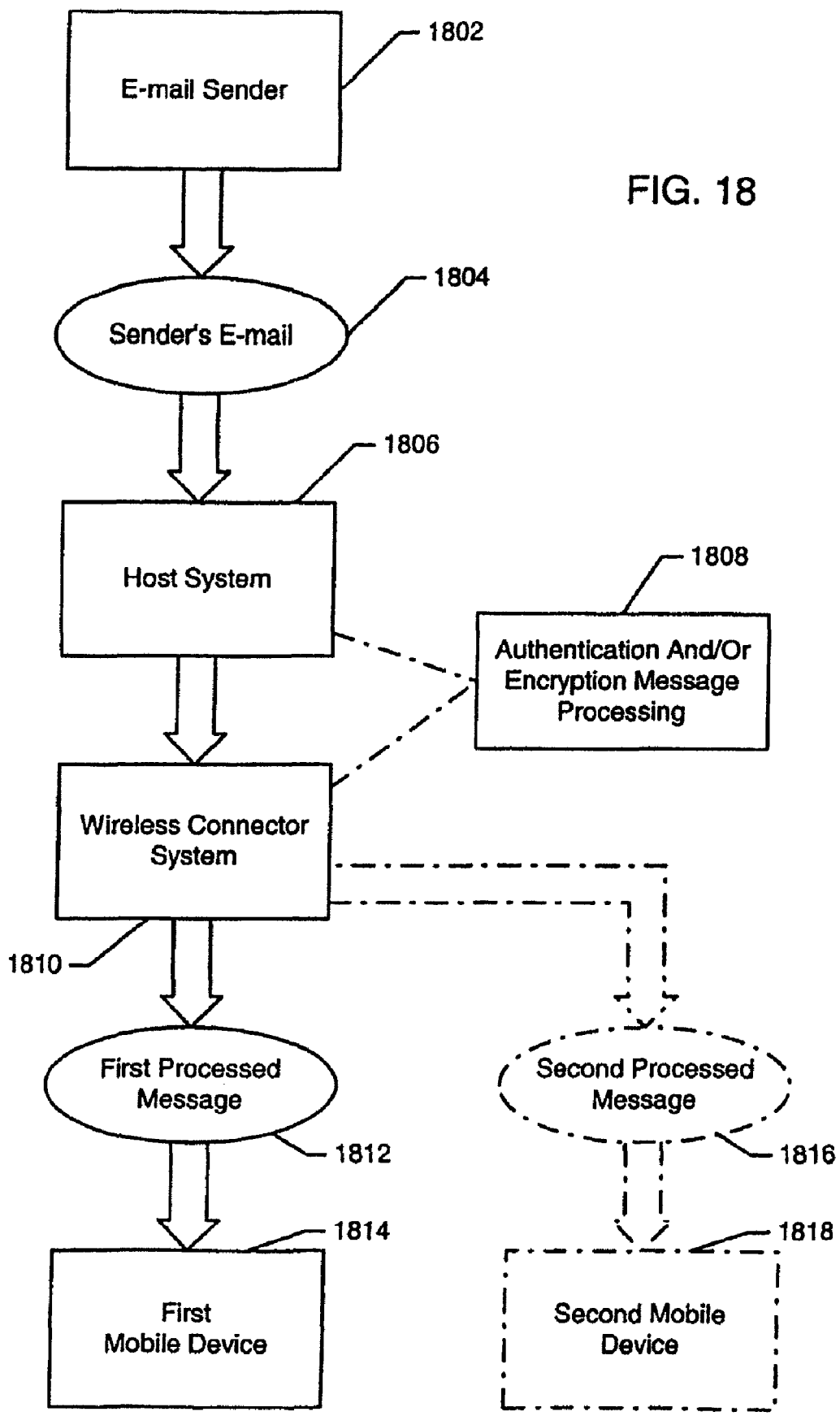
FIGS. 18 and 19 are block diagrams depicting processing of messages involving a mobile device.
Figure 19:
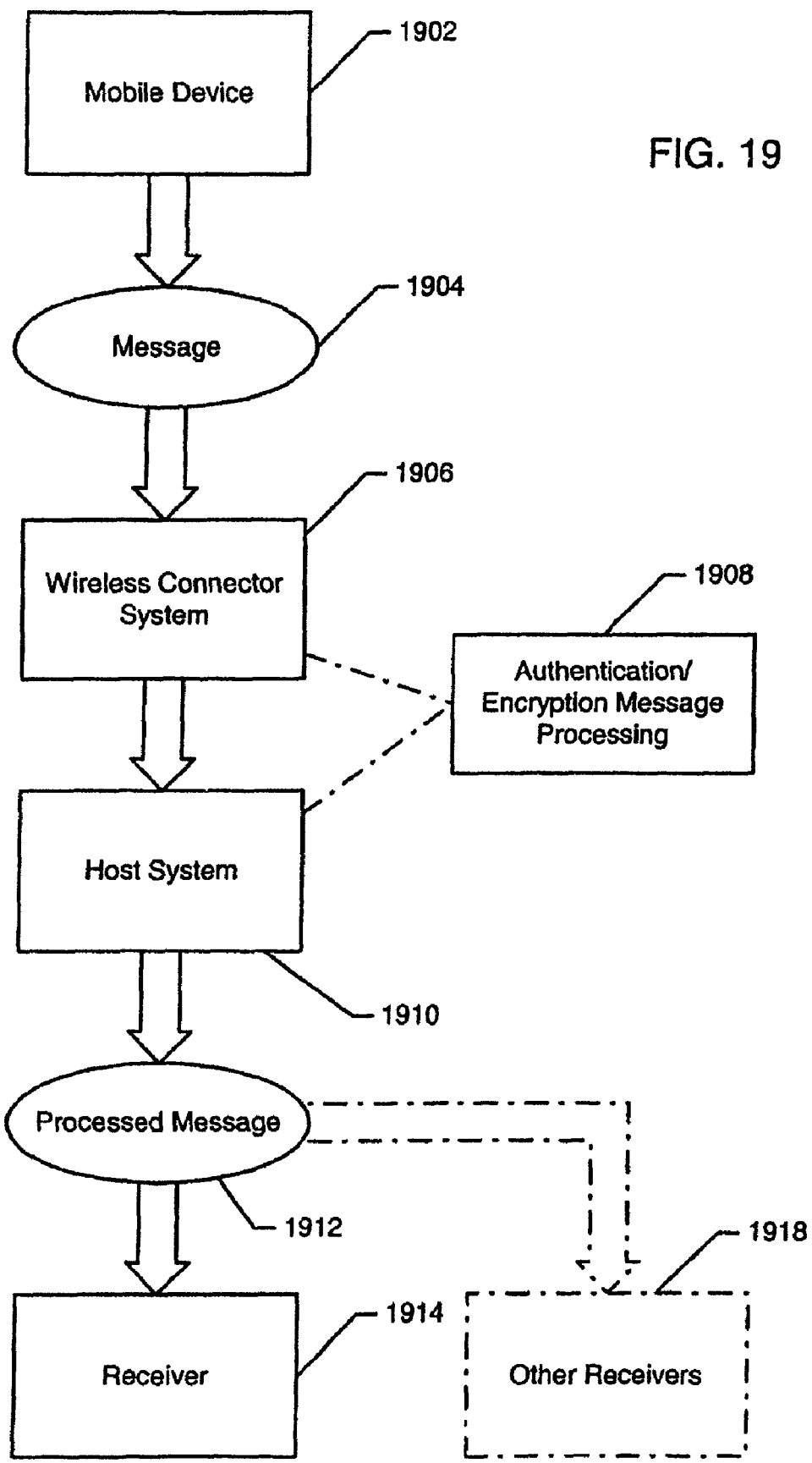

FIG. 18 depicts a pre-processing example wherein a host system 1806 receives a message 1804 from a message sender 1802 addressed to one or more message receivers. A wireless connector system 1810 generates a message 1812 for a mobile device 1814 that corresponds to a message receiver. The wireless connector system 1810 performs authentication and/or encryption message processing 1806 upon the sender's message 1804. Many types of processing may be performed, such as reducing the size of a sender's encrypted message by excluding some or all session keys not needed by a message receiver corresponding mobile device. Through processing 1808, the message 1812 transmitted to the mobile device 1814 is a modification of the sender's message 1804 with respect to authentication and/or encryption aspect(s). The mobile device 1814 contains memory for storing such pre-processed messages, such as volatile or non-volatile RAM (random access memory).

The sender's message 1804 is similarly processed if other mobile devices are identified by the wireless connector system 1810 to correspond to the recipients that should receive the sender's message 1804. In this way, messages (e.g., 1816) modified with respect to authentication and/or encryption aspect(s) (e.g., encoding aspects) are sent to other mobile devices (e.g., 1818).

It should be understood that such a system may be varied in many ways, such as allowing the processing 1808 to be performed by the host system 1806, or having the wireless connector system 1810 operate within the host system 1806 or operate on a different platform from the host system 1806. As a further example of the wide scope of the system's variations, the wireless connector system 1810 may use techniques other than redirection operations to transmit messages to mobile devices (e.g., 1814 and 1818).

FIG. 19 depicts a post-processing example wherein a wireless connector system 1906 receives a message 1904 addressed to one or more message receivers (e.g., 1914 and 1918) from a wireless mobile communication device 1902. Authentication and/or encryption message processing 1908 is performed upon the message 1904. Many types of processing may be performed, such as: removing signature-related information indication from a device's signed message and attaching signature-related information identified in the signature-related information indication to the signed message. The processed message 1912 may then be sent through the host system 1910 to one or more receivers (e.g., 1914 and 1918).

Such pre-processing and post-processing systems as described herein address many issues, such as the difficulty that current systems do not attempt to deliver entire S/MIME messages to a mobile device, due primarily to bandwidth and battery limitations associated with mobile devices. One difficulty is that S/MIME messages are usually too large to send effectively to a mobile device over a wireless communication network. If an entire S/MIME message is sent, either to or from a mobile device, it could use excessive amounts of memory and battery power just for a single message. Considering the time necessary for reception or transmission by a mobile device, the memory required for storage and the battery power required to handle the message exchange, a product that tried to support straight S/MIME would have undesirable qualities to the average business user. Another exemplary issue is that there are no currently available public key servers accessible to wireless networks and mobile devices. As a result, the use of public key cryptographic operations is very difficult and requires heavy caching operations at the mobile device to eliminate Public Key Infrastructure (PKI) requirements. In the area of exchanging secure e-mail messages, there are additional problems that include (1) the inability for mobile devices to retrieve public encryption keys from PKIs to encrypt messages being sent from the mobile device, (2) the inability to retrieve public keys on received messages that are signed, (3) the inability to deal with very large Certificate Revocation Lists (CRLs) on small devices, and (4) the time delay on mobile devices with slower processors to perform complex mathematical calculations involved with public key encryption algorithms. These problems and others result in a poor and frustrating user experience when trying to exchange S/MIME-based e-mail messages using mobile devices.

The pre-processing and post-processing system and method described herein process secure e-mail messages so that such messages, including for example S/MIME messages, can be exchanged with mobile devices. The system and method also leverages the processor power of a host system associated with a mobile device to enable a better user experience when exchanging S/MIME messages with mobile devices.

Figure 20:
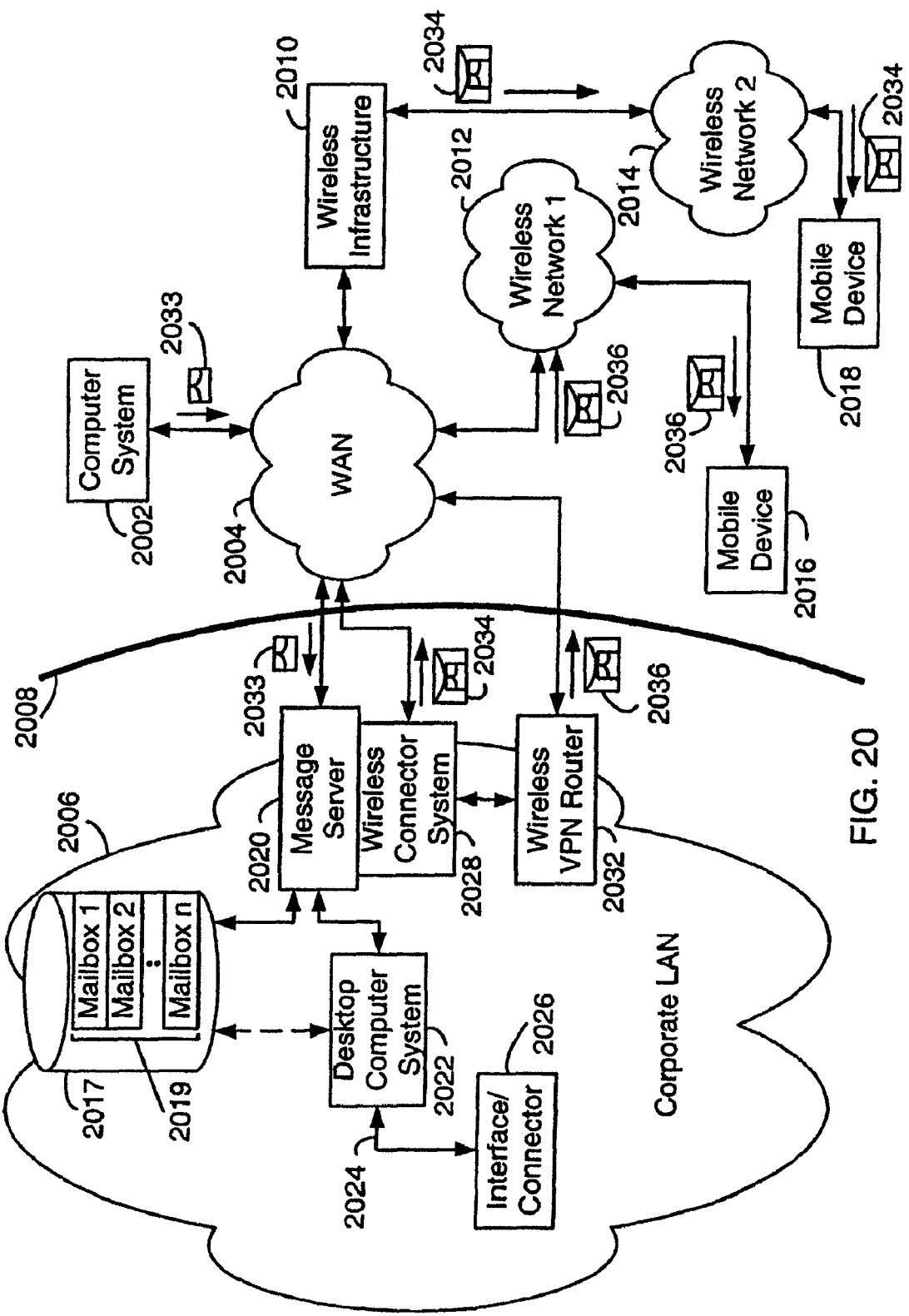
FIG. 20 is a block diagram showing an example communication system.
Figure 21:
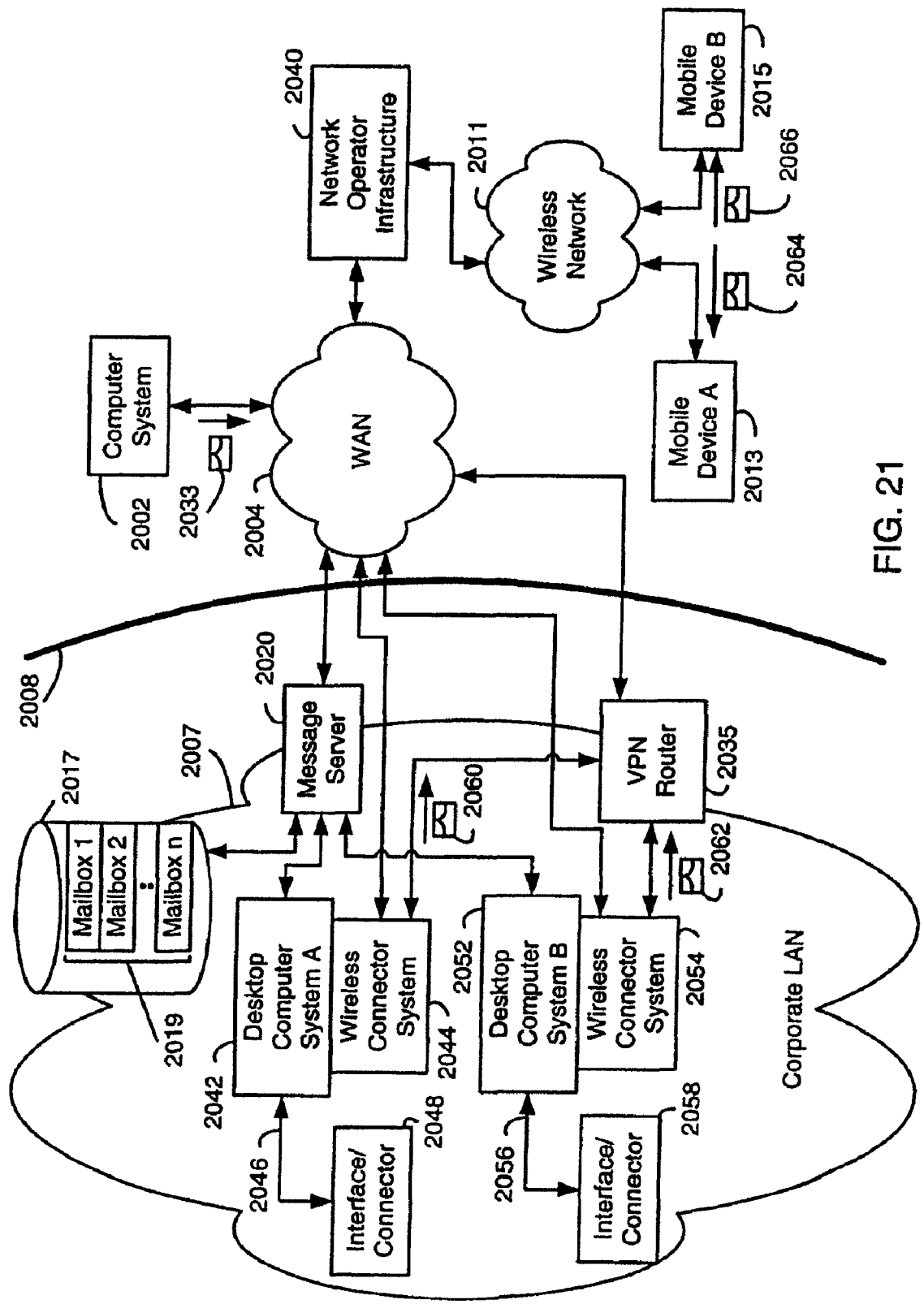
FIG. 21 is a block diagram of an alternative example communication system.
Figure 22:
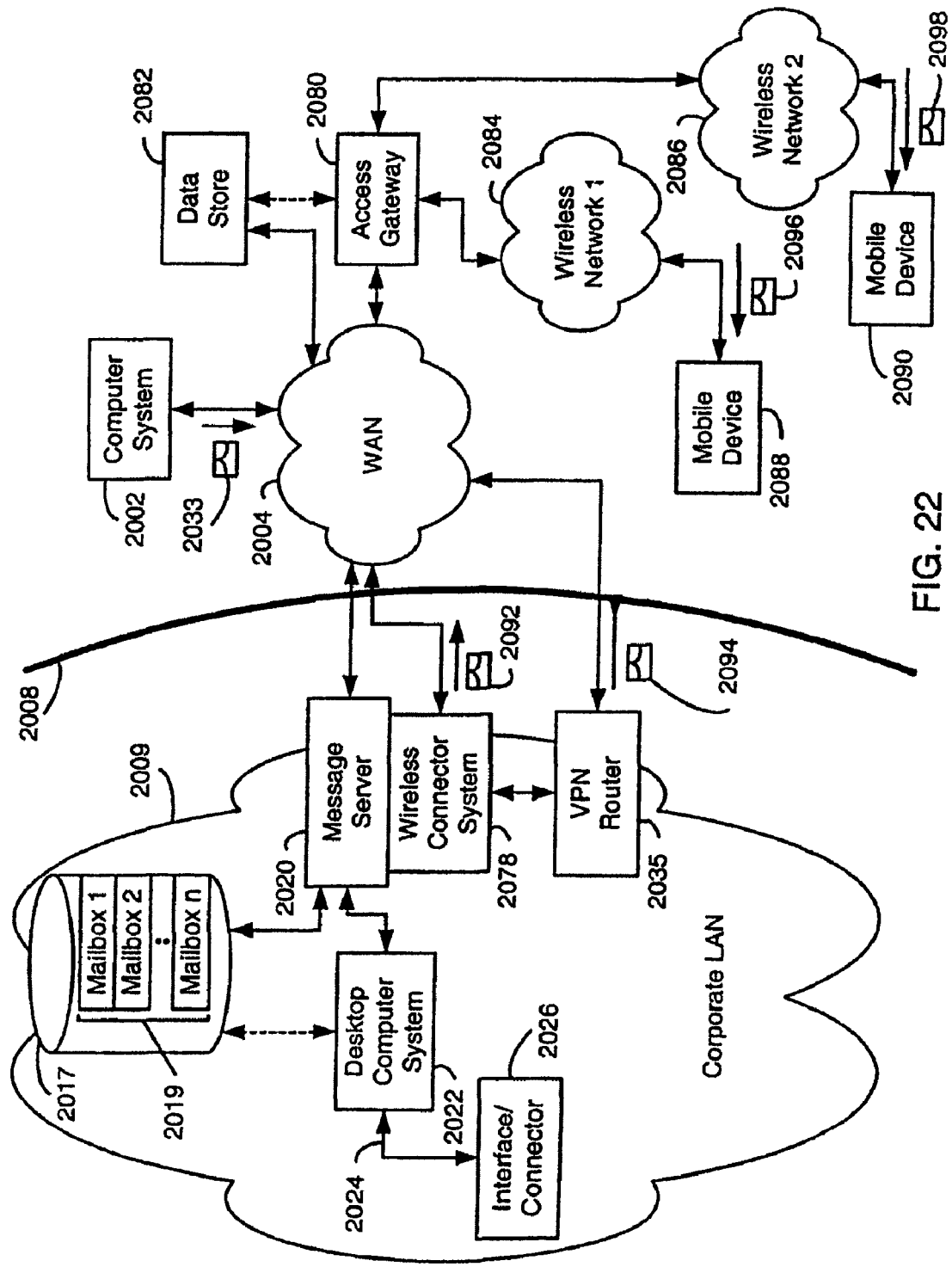
FIG. 22 is a block diagram of another alternative communication system.

Still further examples of the wide scope of the system and method disclosed herein as illustrated in FIGS. 20-22. FIGS. 20-22 describe additional uses of the system and method within different exemplary communication systems. FIG. 20 is a block diagram showing an example communication system. In FIG. 20, there is shown a computer system 2002, a Wide Area Network (WAN) 2004, corporate Local Area Network (LAN) 2006 behind a security firewall 2008, wireless infrastructure 2010, wireless networks 2012 and 2014, and wireless mobile communication devices ("mobile devices") 2016 and 2018. The corporate LAN 2006 includes a message server 2020, a wireless connector system 2028, a data store 2017 including at least a plurality of mailboxes 2019, a desktop computer system 2022 having a communication link directly to a mobile device such as through physical connection 2024 to an interface or connector 2026, and a wireless Virtual Private Network (VPN) router 2032. Operation of the system in FIG. 20 will be described below with reference to the messages 2033, 2034 and 2036.

The computer system 2002 may, for example, be a laptop, desktop or palmtop computer system configured for connection to the WAN 2004. Such a computer system may connect to the WAN 2004 via an Internet Service Provider (ISP) or Application Service Provider (ASP). Alternatively, the computer system 2002 may be a network-connected computer system that, like the computer system 2022 for example, accesses the WAN 2004 through a LAN or other network. Many modern mobile devices are enabled for connection to a WAN through various infrastructure and gateway arrangements, so that the computer system 2002 may also be a mobile device.

The corporate LAN 2006 is an illustrative example of a central, server-based messaging system that has been enabled for wireless communications. The corporate LAN 2006 may be referred to as a "host system", in that it hosts both a data store 2017 with mailboxes 2019 for messages, as well as possibly further data stores (not shown) for other data items, that may be sent to or received from mobile devices 2016 and 2018, and the wireless connector system 2028, the wireless VPN router 2032, or possibly other components enabling communications between the corporate LAN 2006 and one or more mobile devices 2016 and 2018. In more general terms, a host system may be one or more computers at, with or in association with which a wireless connector system is operating. The corporate LAN 2006 is one preferred embodiment of a host system, in which the host system is a server computer running within a corporate network environment operating behind and protected by at least one security communications firewall 2008. Other possible central host systems include ISP, ASP and other service provider or mail systems. Although the desktop computer system 2024 and interface/connector 2026 may be located outside such host systems, wireless communication operations may be similar to those described below.

The corporate LAN 2006 implements the wireless connector system 2028 as an associated wireless communications enabling component, which will normally be a software program, a software application, or a software component built to work with at least one or more message server. The wireless connector system 2028 is used to send user-selected information to, and to receive information from, one or more mobile devices 2016 and 2018, via one or more wireless networks 2012 and 2014. The wireless connector system 2028 may be a separate component of a messaging system, as shown in FIG. 20, or may instead be partially or entirely incorporated into other communication system components. For example, the message server 2020 may incorporate a software program, application, or component implementing the wireless connector system 2028, portions thereof, or some or all of its functionality.

The message server 2020, running on a computer behind the firewall 2008, acts as the main interface for the corporation to exchange messages, including for example electronic mail ("e-mail"), calendaring data, voice mail, electronic documents, and other personal information management (PIM) data with the WAN 2004, which will typically be the Internet. Two of the most common message servers are Microsoft™ Exchange and Lotus Domino™. These servers are often used in conjunction with Internet mail routers to route and deliver messages. The particular intermediate operations and computers will be dependent upon the specific type of message delivery mechanisms and networks via which messages are exchanged, and therefore have not been shown in FIG. 20. The functionality of the message server 2020 may extend beyond message sending and receiving, providing such features as dynamic database storage for data like calendars, todo lists, task lists, e-mail and documentation.

Message servers such as 2020 normally maintain a plurality of mailboxes 2019 in one or more data stores such as 2017 for each user having an account on the server. The data store 2017 includes mailboxes 2019 for a number of ("n") user accounts. Messages received by the message server 2020 that identify a user, a user account, a mailbox, or possibly another address associated with a user, account or mailbox 2019 as a message recipient will typically be stored in the corresponding mailbox 2019. If a message is addressed to multiple recipients or a distribution list, then copies of the same message may be stored to more than one mailbox 2019. Alternatively, the message server 2020 may store a single copy of such a message in a data store accessible to all of the users having an account on the message server, and store a pointer or other identifier in each recipient's mailbox 2019. In typical messaging systems, each user may then access his or her mailbox 2019 and its contents using a messaging client such as Microsoft Outlook or Lotus Notes, which normally operates on a PC, such as the desktop computer system 2022, connected in the LAN 2006. Although only one desktop computer system 2022 is shown in FIG. 20, those skilled in the art will appreciate that a LAN will typically contain many desktop, notebook and laptop computer systems. Each messaging client normally accesses a mailbox 2019 through the message server 2020, although in some systems, a messaging client may enable direct access to the data store 2017 and a mailbox 2019 stored thereon by the desktop computer system 2022. Messages may also be downloaded from the data store 2017 to a local data store (not shown) on the desktop computer system 2022.

Within the corporate LAN 2006, the wireless connector system 2028 operates in conjunction with the message server 2020. The wireless connector system 2028 may reside on the same computer system as the message server 2020, or may instead be implemented on a different computer system. Software implementing the wireless connector system 2028 may also be partially or entirely integrated with the message server 2020. The wireless connector system 2028 and the message server 2020 are preferably designed to cooperate and interact to allow the pushing of information to mobile devices 2016, 2018. In such an installation, the wireless connector system 2028 is preferably configured to send information that is stored in one or more data stores associated with the corporate LAN 2006 to one or more mobile devices 2016, 2018, through the corporate firewall 2008 and via the WAN 2004 and one of the wireless networks 2012, 2014. For example, a user that has an account and associated mailbox 2019 in the data store 2017 may also have a mobile device, such as 2016. As described above, messages received by the message server 2020 that identify a user, account or mailbox 2019 are stored to a corresponding mailbox 2019 by the message server 2020. If a user has a mobile device, such as 2016, messages received by the message server 2020 and stored to the user's mailbox 2019 are preferably detected by the wireless connector system 2028 and sent to the user's mobile device 2016. This type of functionality represents a "push" message sending technique. The wireless connector system 2028 may instead employ a "pull" technique, in which items stored in a mailbox 2019 are sent to a mobile device 2016, 2018 responsive to a request or access operation made using the mobile device, or some combination of both techniques.

The use of a wireless connector 2028 thereby enables a messaging system including a message server 2020 to be extended so that each user's mobile device 2016, 2018 has access to stored messages of the message server 2020. Although the systems and methods described herein are not restricted solely to a push-based technique, a more detailed description of push-based messaging may be found in U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, and in the following co-pending and commonly-owned United States Patent Applications, all of which are related to the '694 Patent: U.S. patent applications Ser. No. 09/401,868 (now issued as U.S. Pat. No. 6,701,378), Ser. No. 09/545,963 (now issued as U.S. Pat. No. 6,779,019), Ser. No. 09/528,495 (now issued as U.S. Pat. No. 6,463,464), Ser. No. 09/545,962 (now issued as U.S. Pat. No. 7,209,955), and Ser. No. 09/649,755 (now issued as U.S. Pat. No. 6,463,463). The complete disclosure of the '694 Patent and each of these applications, including drawings and claims, is hereby incorporated into this application by reference. This push technique uses a wireless friendly encoding, compression and encryption technique to deliver all information to a mobile device, thus effectively extending the company firewall 2008 to include the mobile devices 2016, 2018.

As shown in FIG. 20, there are several paths for exchanging information with a mobile device 2016, 2018 from the corporate LAN 2006. One possible information transfer path is through the physical connection 2024 such as a serial port, using an interface or connector 2026. This path may be useful for example for bulk information updates often performed at initialization of a mobile device 2016, 2018 or periodically when a user of a mobile device 2016, 2018 is working at a computer system in the LAN 2006, such as the computer system 2022. For those skilled in the art of Personal Digital Assistants (PDAs) and data synchronization, Personal Information Management (PIM) data is commonly exchanged over such a connection, for example a serial port connected to an appropriate interface or connector 2026 such as a cradle in or upon which a mobile device 2016, 2018 may be placed. When exchanged for the first time, the amount of PIM data tends to be relatively large and would require a large bandwidth for transfer to the mobile device. The physical connection 2024 may also be used to transfer other information from a desktop computer system 2022 to a mobile device 2016, 2018, including private security keys ("private keys") such as private encryption or signature keys associated with the desktop computer system 2022, or other relatively bulky information such as digital Certificates ("Certs") and Certificate Revocation Lists (CRLs), used in some secure messaging schemes such as S/MIME and Pretty Good Privacy™ (PGP™).

Private key exchange using a physical connection 2024 and connector or interface 2026 allows a user's desktop computer system 2022 and mobile device 2016 or 2018 to share at least one identity for accessing all encrypted and/or signed mail. The user's desktop computer system 2022 and mobile device 2016 or 2018 can also thereby share private keys so that either the host system 2022 or mobile device 2016 or 2018 can process secure messages addressed to the user's mailbox or account on the message server 2020. The transfer of Certs and CRLs over such a physical connection may be desirable in that they represent a large amount of the data that is required for S/MIME, PGP and other public key security methods. A user's own Cert, a chain of Cert(s) used to verify the user's Cert, and CRL, as well as Certs, Cert chains and CRLs for other users, may be loaded onto a mobile device 2016, 2018 from the user's desktop computer system 2022. This loading of other user's Certs and CRLs onto a mobile device 2016, 2018 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a Cert is to be determined.

In known "synchronization" type wireless messaging systems, a physical path has also been used to transfer messages from mailboxes 2019 associated with a message server 2020 to mobile devices 2016 and 2018.

Another method for data exchange with a mobile device 2016, 2018 is over-the-air, through the wireless connector system 2028 and using wireless networks 2012, 2014. As shown in FIG. 20, this could involve a Wireless VPN router 2032, if available in the network 2006, or, alternatively, a traditional WAN connection to wireless infrastructure 2010 that provides an interface to one or more wireless networks 2012, 2014. The Wireless VPN router 2032 provides for creation of a VPN connection directly through a specific wireless network 2012 to a wireless device 2016. Such a Wireless VPN router 2032 may be used in conjunction with a static addressing scheme. For example, if the wireless network 2012 is an Internet Protocol (IP) based wireless network, then the new IP Version 6 (IPV6) would provide enough IP addresses to dedicate an IP address to every mobile device 2016 configured to operate within the network 2012 and thus make it possible to push information to a mobile device 2016 at any time. A primary advantage of using a wireless VPN router 2032 is that it could be an off-the-shelf VPN component which would not require wireless infrastructure 2010. A VPN connection may use a Transmission Control Protocol over IP (TCP/IP) or User Datagram Protocol over IP (UDP/IP) connection to deliver messages directly to and from a mobile device 2016.

If a wireless VPN router 2032 is not available, then a link to a WAN 2004, normally the Internet, is a commonly used connection mechanism that may be employed by the wireless connector system 2028. To handle the addressing of the mobile device 2016 and any other required interface functions, wireless infrastructure 2010 is preferably used. The wireless infrastructure 2010 may also determine a most likely wireless network for locating a given user, and track users as they roam between countries or networks. In wireless networks such as 2012 and 2014, messages are normally delivered to and from mobile devices 2016, 2018 via RF transmissions between base stations (not shown) and the mobile devices 2016, 2018.

A plurality of connections to wireless networks 2012 and 2014 may be provided, including, for example, Integrated Services Digital Network (ISDN), Frame Relay or T1 connections using the TCP/IP protocol used throughout the Internet. The wireless networks 2012 and 2014 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure. Known data-centric networks include the Mobitex™ Radio Network ("Mobitex") and the DataTAC™ Radio Network ("DataTAC"). Examples of older voice-centric data networks include Personal Communication Systems (PCS) networks like Code Division Multiple Access (CDMA), Global System for Mobile Communications (GSM), and Time Division Multiple Access (TDMA) systems. Dual-mode networks include, for example, more recent CDMA networks, GSM and the General Packet Radio Service (GPRS), which is a data overlay on GSM, and third-generation (3G) networks like Enhanced Data rates for Global Evolution (EDGE) and Universal Mobile Telecommunications Systems (UMTS), which are currently under development.

In some implementations, more than one over-the-air information exchange mechanism may be provided in the corporate LAN 2006. In the exemplary communication system of FIG. 20 for example, mobile devices 2016, 2018 associated with users having mailboxes 2019 associated with user accounts on the message server 2020 are configured to operate on different wireless networks 2012 and 2014. If the wireless network 2012 supports IPv6 addressing, then the wireless VPN router 2032 may be used by the wireless connector system 2028 to exchange data with any mobile device 2016 operating within the wireless network 2012. The wireless network 2014 may be a different type of wireless network, however, such as the Mobitex network, in which case information may instead be exchanged with a mobile device 2018 operating within the wireless network 2014 by the wireless connector system 2028 via a connection to the WAN 2004 and the wireless infrastructure 2010.

Operation of the system in FIG. 20 will now be described using an example of an e-mail message 2033 sent from the computer system 2002 and addressed to at least one recipient having both an account and mailbox 2019 or like data store associated with the message server 2020 and a mobile device 2016 or 2018. However, the e-mail message 2033 is intended for illustrative purposes only. The exchange of other types of information between the corporate LAN 2006 is preferably also enabled by the wireless connector system 2028.

The e-mail message 2033, sent from the computer system 2002 via the WAN 2004, may be fully in the clear, or signed with a digital signature and/or encrypted, depending upon the particular messaging scheme used. For example, if the computer system 2002 is enabled for secure messaging using S/MIME, then the e-mail message 2033 may be signed, encrypted, or both.

E-mail messages such as 2033 normally use traditional Simple Mail Transfer Protocol (SMTP), RFC822 headers and Multipurpose Internet Mail Extensions (MIME) body parts to define the format of the e-mail message. These techniques are all well known to one in the art. The e-mail message 2033 arrives at the message server 2020, which determines into which mailboxes 2019 the e-mail message 2033 should be stored. As described above, a message such as the e-mail message 2033 may include a user name, a user account, a mailbox identifier, or other type of identifier that may be mapped to a particular account or associated mailbox 2019 by the message server 2020. For an e-mail message 2033, recipients are typically identified using e-mail addresses corresponding to a user account and thus a mailbox 2019.

The wireless connector system 2028 sends or mirrors, via a wireless network 2012 or 2014, certain user-selected data items or parts of data items from the corporate LAN 2006 to the user's mobile device 2016 or 2018, preferably upon detecting that one or more triggering events has occurred. A triggering event includes, but is not limited to, one or more of the following: screen saver activation at a user's networked computer system 2022, disconnection of the user's mobile device 2016 or 2018 from the interface 2026, or receipt of a command sent from a mobile device 2016 or 2018 to the host system to start sending one or more messages stored at the host system. Thus, the wireless connector system 2028 may detect triggering events associated with the message server 2020, such as receipt of a command, or with one or more networked computer systems 2022, including the screen saver and disconnection events described above. When wireless access to corporate data for a mobile device 2016 or 2018 has been activated at the LAN 2006, for example when the wireless connector system 2028 detects the occurrence of a triggering event for a mobile device user, data items selected by the user are preferably sent to the user's mobile device. In the example of the e-mail message 2033, assuming that a triggering event has been detected, the arrival of the message 2033 at the message server 2020 is detected by the wireless connector system 2028. This may be accomplished, for example, by monitoring or querying mailboxes 2019 associated with the message server 2020, or, if the message server 2020 is a Microsoft Exchange server, then the wireless connector system 2028 may register for advise syncs provided by the Microsoft Messaging Application Programming Interface (MAPI) to thereby receive notifications when a new message is stored to a mailbox 2019.

When a data item such as the e-mail message 2033 is to be sent to a mobile device 2016 or 2018, the wireless connector system 2028 preferably repackages the data item in a manner that is transparent to the mobile device, so that information sent to and received by the mobile device appears similar to the information as stored on and accessible at the host system, LAN 2006 in FIG. 20. One preferred repackaging method includes wrapping received messages to be sent via a wireless network 2012, 2014 in an electronic envelope that corresponds to the wireless network address of the mobile device 2016, 2018 to which the message is to be sent. Alternatively, other repackaging methods could be used, such as special-purpose TCP/IP wrapping techniques. Such repackaging preferably also results in e-mail messages sent from a mobile device 2016 or 2018 appearing to come from a corresponding host system account or mailbox 2019 even though they are composed and sent from a mobile device. A user of a mobile device 2016 or 2018 may thereby effectively share a single e-mail address between a host system account or mailbox 2019 and the mobile device.

Repackaging of the e-mail message 2033 is indicated at 2034 and 2036. Repackaging techniques may be similar for any available transfer paths or may be dependent upon the particular transfer path, either the wireless infrastructure 2010 or the wireless VPN router 2032. For example, the e-mail message 2033 is preferably compressed and encrypted, either before or after being repackaged at 2034, to thereby effectively provide for secure transfer to the mobile device 2018. Compression reduces the bandwidth required to send the message, whereas encryption ensures confidentiality of any messages or other information sent to mobile devices 2016 and 2018. In contrast, messages transferred via a VPN router 2032 might only be compressed and not encrypted, since a VPN connection established by the VPN router 2032 is inherently secure. Messages are thereby securely sent, via either encryption at the wireless connector system 2028, which may be considered a non-standard VPN tunnel or a VPN-like connection for example, or the VPN router 2032, to mobile devices 2016 and 2018. Accessing messages using a mobile device 2016 or 2018 is thus no less secure than accessing mailboxes at the LAN 2006 using the desktop computer system 2022.

When a repackaged message 2034 or 2036 arrives at a mobile device 2016 or 2018, via the wireless infrastructure 2010, or via the wireless VPN router 2032, the mobile device 2016 or 2018 removes the outer electronic envelope from the repackaged message 2034 or 2036, and performs any required decompression and decryption operations. Messages sent from a mobile device 2016 or 2018 and addressed to one or more recipients are preferably similarly repackaged, and possibly compressed and encrypted, and sent to a host system such as the LAN 2006. The host system may then remove the electronic envelope from the repackaged message, decrypt and decompress the message if desired, and route the message to the addressed recipients.

Another goal of using an outer envelope is to maintain at least some of the addressing information in the original e-mail message 2033. Although the outer envelope used to route information to mobile devices 2016, 2018 is addressed using a network address of one or more mobile devices, the outer envelope preferably encapsulates the entire original e-mail message 2033, including at least one address field, possibly in compressed and/or encrypted form. This allows original "To", "From" and "CC" addresses of the e-mail message 2033 to be displayed when the outer envelope is removed and the message is displayed on a mobile device 2016 or 2018. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 2028. Using the user's account or mailbox address from the mobile device 2016 or 2018 allows a message sent from a mobile device to appear as though the message originated from the user's mailbox 2019 or account at the host system rather than the mobile device.

FIG. 21 is a block diagram of an alternative exemplary communication system, in which wireless communications are enabled by a component associated with an operator of a wireless network. As shown in FIG. 21, the system includes a computer system 2002, WAN 2004, a corporate LAN 2007 located behind a security firewall 2008, network operator infrastructure 2040, a wireless network 2011, and mobile devices 2013 and 2015. The computer system 2002, WAN 2004, security firewall 2008, message server 2020, data store 2017, mailboxes 2019, and VPN router 2035 are substantially the same as the similarly-labelled components in FIG. 20. However, since the VPN router 2035 communicates with the network operator infrastructure 2040, it need not necessarily be a wireless VPN router in the system of FIG. 21. The network operator infrastructure 2040 enables wireless information exchange between the LAN 2007 and mobile devices 2013, 2015, respectively associated with the computer systems 2042 and 2052 and configured to operate within the wireless network 2011. In the LAN 2007, a plurality of desktop computer systems 2042, 2052 are shown, each having a physical connection 2046, 2056 to an interface or connector 2048, 2058. A wireless connector system 2044, 2054 is operating on or in conjunction with each computer system 2042, 2052.

The wireless connector systems 2044, 2054 are similar to the wireless connector system 2028 described above, in that it enables data items, such as e-mail messages and other items that are stored in mailboxes 2019, and possibly data items stored in a local or network data store, to be sent from the LAN 2007 to one or more mobile devices 2013, 2015. In FIG. 21 however, the network operator infrastructure 2040 provides an interface between the mobile devices 2013, 2015 and the LAN 2007. As above, operation of the system shown in FIG. 21 will be described below in the context of an e-mail message as an illustrative example of a data item that may be sent to a mobile device 2013, 2015.

When an e-mail message 2033, addressed to one or more recipients having an account on the message server 2020, is received by the message server 2020, the message, or possibly a pointer to a single copy of the message stored in a central mailbox or data store, is stored into the mailbox 2019 of each such recipient. Once the e-mail message 2033 or pointer has been stored to a mailbox 2019, it may preferably be accessed using a mobile device 2013 or 2015. In the example shown in FIG. 21, the e-mail message 2033 has been addressed to the mailboxes 2019 associated with both desktop computer systems 2042 and 2052 and thus both mobile devices 2013 and 2015.

As those skilled in the art will appreciate, communication network protocols commonly used in wired networks such as the LAN 2007 and/or the WAN 2004 are not suitable or compatible with wireless network communication protocols used within wireless networks such as 2011. For example, communication bandwidth, protocol overhead and network latency, which are primary concerns in wireless network communications, are less significant in wired networks, which typically have much higher capacity and speed than wireless networks. Therefore, mobile devices 2013 and 2015 cannot normally access the data store 2017 directly. The network operator infrastructure 2040 provides a bridge between the wireless network 2011 and the LAN 2007.

The network operator infrastructure 2040 enables a mobile device 2013, 2015 to establish a connection to the LAN 2007 through the WAN 2004, and may, for example, be operated by an operator of the wireless network 2011 or a service provider that provides wireless communication service for mobile devices 2013 and 2015. In a pull-based system, a mobile device 2013, 2015 may establish a communication session with the network operator infrastructure 2040 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information for example, stored in a mailbox 2019 in the data store 2017 at the LAN 2007. The network operator infrastructure 2040 then establishes a connection or session with a wireless connector system 2044, 2054, using Secure Hypertext Transfer Protocol (HTTPS) for example, if no session has already been established. As above, a session between the network operator infrastructure 2040 and a wireless connector system 2044, 2054 may be made via a typical WAN connection or through the VPN router 2035 if available. When time delays between receiving a request from a mobile device 2013, 2015 and delivering requested information back to the device are to be minimized, the network operator infrastructure 2040 and the wireless connector systems 2044, 2054 may be configured so that a communication connection remains open once established.

In the system of FIG. 21, requests originating from mobile device A 2013 and B 2015 would be sent to the wireless connector systems 2044 and 2054, respectively. Upon receiving a request for information from the network operator infrastructure 2040, a wireless connector system 2044, 2054 retrieves requested information from a data store. For the e-mail message 2033, the wireless connector system 2044, 2054 retrieves the e-mail message 2033 from the appropriate mailbox 2019, typically through a messaging client operating in conjunction with the computer system 2042, 2052, which may access a mailbox 2019 either via the message server 2020 or directly. Alternatively, a wireless connector system 2044, 2054 may be configured to access mailboxes 2019 itself, directly or through the message server 2020. Also, other data stores, both network data stores similar to the data store 2017 and local data stores associated with each computer system 2042, 2052, may be accessible to a wireless connector system 2044, 2054, and thus to a mobile device 2013, 2015.

If the e-mail message 2033 is addressed to the message server accounts or mailboxes 2019 associated with both computer systems 2042 and 2052 and devices 2013 and 2015, then the e-mail message 2033 may be sent to the network operator infrastructure 2040 as shown at 2060 and 2062, which then sends a copy of the e-mail message to each mobile device 2013 and 2015, as indicated at 2064 and 2066. Information may be transferred between the wireless connector systems 2044, 2054 and the network operator infrastructure 2040 via either a connection to the WAN 2004 or the VPN router 2035. When the network operator infrastructure 2040 communicates with the wireless connector systems 2044, 2054 and the mobile devices 2013, 2015 via different protocols, translation operations may be performed by the network operator infrastructure 2040. Repackaging techniques may also be used between the wireless connector systems 2044, 2054 and the network operator infrastructure 2040, and between each mobile device 2013, 2015 and the network operator infrastructure 2040.

Messages or other information to be sent from a mobile device 2013, 2015 may be processed in a similar manner, with such information first being transferred from a mobile device 2013, 2015 to the network operator infrastructure 2040. The network operator infrastructure 2040 may then send the information to a wireless connector system 2044, 2054 for storage in a mailbox 2019 and delivery to any addressed recipients by the message server 2020 for example, or may alternatively deliver the information to the addressed recipients.

The above description of the system in FIG. 21 relates to pull-based operations. The wireless connector systems 2044, 2054 and the network operator infrastructure may instead be configured to push data items to mobile devices 2013 and 2015. A combined push/pull system is also possible. For example, a notification of a new message or a list of data items currently stored in a data store at the LAN 2007 could be pushed to a mobile device 2013, 2015, which may then be used to request messages or data items from the LAN 2007 via the network operator infrastructure 2040.

If mobile devices associated with user accounts on the LAN 2007 are configured to operate within different wireless networks, then each wireless network may have an associated wireless network infrastructure component similar to 2040.

Although separate, dedicated wireless connector systems 2044, 2054 are shown for each computer system 2042, 2052 in the system of FIG. 21, one or more of the wireless connector systems 2044, 2054 may preferably be configured to operate in conjunction with more than one computer system 2042, 2052, or to access a data store or mailbox 2019 associated with more than one computer system. For example, the wireless connector system 2044 may be granted access to the mailboxes 2019 associated with both the computer system 2042 and the computer system 2052. Requests for data items from either mobile device A 2013 or B 2015 may then be processed by the wireless connector system 2044. This configuration may be useful to enable wireless communications between the LAN 2007 and the mobile devices 2013 and 2015 without requiring a desktop computer system 2042, 2052 to be running for each mobile device user. A wireless connector system may instead be implemented in conjunction with the message server 2020 to enable wireless communications.

FIG. 22 is a block diagram of another alternative communication system. The system includes a computer system 2002, WAN 2004, a corporate LAN 2009 located behind a security firewall 2008, an access gateway 2080, data store 2082, wireless networks 2084 and 2086, and mobile devices 2088 and 2090. In the LAN 2009, the computer system 2002, WAN 2004, security firewall 2008, message server 2020, data store 2017, mailboxes 2019, desktop computer system 2022, physical connection 2024, interface or connector 2026 and VPN router 2035 are substantially the same as the corresponding components described above. The access gateway 2080 and data store 2082 provide mobile devices 2088 and 2090 with access to data items stored at the LAN 2009. In FIG. 22, a wireless connector system 2078 operates on or in conjunction with the message server 2020, although a wireless connector system may instead operate on or in conjunction with one or more desktop computer systems in the LAN 2009.

The wireless connector system 2078 provides for transfer of data items stored at the LAN 2009 to one or more mobile devices 2088, 2090. These data items preferably include e-mail messages stored in mailboxes 2019 in the data store 2017, as well as possibly other items stored in the data store 2017 or another network data store or a local data store of a computer system such as 2022.

As described above, an e-mail message 2033 addressed to one or more recipients having an account on the message server 2020 and received by the message server 2020 may be stored into the mailbox 2019 of each such recipient. In the system of FIG. 22, the external data store 2082 preferably has a similar structure to, and remains synchronized with, the data store 2017. PIM information or data stored at data store 2082 preferably is independently modifiable to the PIM information or data stored at the host system. In this particular configuration, the independently modifiable information at the external data store 2082 may maintain synchronization of a plurality of data stores associated with a user (i.e., data on a mobile device, data on a personal computer at home, data at the corporate LAN, etc.). This synchronization may be accomplished, for example, through updates sent to the data store 2082 by the wireless connector system 2078 at certain time intervals, each time an entry in the data store 2017 is added or changed, at certain times of day, or when initiated at the LAN 2009, by the message server 2020 or a computer system 2022, at the data store 2082, or possibly by a mobile device 2088, 2090 through the access gateway 2080. In the case of the e-mail message 2033 for example, an update sent to the data store 2082 some time after the e-mail message 2033 is received may indicate that the message 2033 has been stored in a certain mailbox 2019 in the store 2017, and a copy of the e-mail message will be stored to a corresponding storage area in the data store 2082. When the e-mail message 2033 has been stored in the mailboxes 2019 corresponding to the mobile devices 2088 and 2090 for example, one or more copies of the e-mail message, indicated at 2092 and 2094 in FIG. 22, will be sent to and stored in corresponding storage areas or mailboxes in the data store 2082. As shown, updates or copies of stored information in the data store 2017 may be sent to the data store 2082 via a connection to the WAN 2004 or the VPN router 2035. For example, the wireless connector system 2078 may post updates or stored information to a resource in the data store 2082 via an HTTP post request. Alternatively, a secure protocol such as HTTPS or Secure Sockets Layer (SSL) may be used. Those skilled in the art will appreciate that a single copy of a data item stored in more than one location in a data store at the LAN 2009 may instead be sent to the data store 2082. This copy of the data item could then be stored either in more than one corresponding location in the data store 2082, or a single copy may be stored in the data store 2082, with a pointer or other identifier of the stored data item being stored in each corresponding location in the data store 2082.

The access gateway 2080 is effectively an access platform, in that it provides mobile devices 2088 and 2090 with access to the data store 2082. The data store 2082 may be configured as a resource accessible on the WAN 2004, and the access gateway 2080 may be an ISP system or WAP gateway through which mobile devices 2088 and 2090 may connect to the WAN 2004. A WAP browser or other browser compatible with the wireless networks 2084 and 2086 may then be used to access the data store 2082, which is synchronized with the data store 2017, and download stored data items either automatically or responsive to a request from a mobile device 2088, 2090. As shown at 2096 and 2098, copies of the e-mail message 2033, which was stored in the data store 2017, may be sent to the mobile devices 2088 and 2090. A data store (not shown) on each mobile device 2088, 2090 may thereby be synchronized with a portion, such as a mailbox 2019, of a data store 2017 on a corporate LAN 2009. Changes to a mobile device data store may similarly be reflected in the data stores 2082 and 2017.

What is claimed is:

1. A method of reducing size of an encrypted message at a host system before the encrypted message is transmitted to a wireless mobile communication device, the method comprising:
   (a) receiving at the host system the encrypted message from a message sender addressed to first and second message receivers, the encrypted message including an encrypted message body and an encrypted session key for each of the message receivers; and
   (b) generating at the host system a first reduced size encrypted message that contains the encrypted message body and the encrypted session key for the first message receiver, the first reduced size encrypted message not including the encrypted session key for the second message receiver;
   wherein the encrypted session keys were encrypted via public keys.

2. The method of claim 1, wherein generating the first reduced size encrypted message comprises removing the encrypted session key for the second message receiver in order to form the first reduced size encrypted message.

3. The method of claim 1, wherein generating the first reduced size encrypted message comprises of removing all encrypted session keys other than the encrypted session key for the first message receiver in order to form the first reduced size encrypted message.

4. The method of claim 3, wherein generating the first reduced size encrypted message comprises removing a message receiver information field of the message which maps each encrypted session key to an associated message receiver.

5. The method of claim 1, wherein the message receivers to which the encrypted message is addressed were specifically chosen by the message sender.

6. The method of claim 1, further comprising:
   determining whether any of the message receivers has a corresponding wireless mobile communication device;
   wherein generating comprises, for each message receiver that is determined to have a corresponding wireless mobile communication device, generating a respective reduced size encrypted message containing the encrypted message body and the encrypted session key only for the message receiver; and
   transmitting the reduced size encrypted message to the corresponding wireless mobile communication device.

7. The method of claim 6, wherein a single address is shared by the respective message receiver and the corresponding wireless mobile communication device.

8. The method of claim 6, wherein each encrypted session key is encrypted using a public key of the message receiver; wherein the message receiver and the corresponding wireless mobile communication device share the public key and an associated private key.

9. The method of claim 1, wherein the encrypted message comprises a message that had been signed and then encrypted, and further includes an encrypted digital signature; and
   generating the first reduced size encrypted message comprises generating a reduced size encrypted message containing the encrypted message body, the encrypted digital signature and the encrypted session key for the first message receiver.

10. The method of claim 9, wherein:
    the encrypted message further comprises encrypted signature-related information; and
    wherein generating the first reduced size encrypted message comprises generating the reduced size encrypted message containing the encrypted message body, the encrypted digital signature, the encrypted signature-related information and the encrypted session key for the first message receiver.

11. The method of claim 1, wherein the encrypted message comprises a Secure Multipurpose Internet Mail Extensions (S/MIME) e-mail message.

12. The method of claim 1, wherein the encrypted message is encrypted according to Pretty Good Privacy.

13. A system for reducing the size of an encrypted message for transmission to a wireless mobile communication device, the system comprising:
    a host system configured to receive an encrypted message from a message sender and addressed to message receivers, the encrypted message including an encrypted message body and an encrypted session key for each message receiver; and
    a wireless connector system associated with the host system and configured to determine whether any of the message receivers has a corresponding wireless mobile connection device and if so, for each message receiver that has a corresponding wireless mobile communication device, to generate a reduced size encrypted message containing the message body and the encrypted session key only for the message receiver, wherein at least two of the encrypted session keys for the message receivers were encrypted via public keys.

14. The system of claim 13, wherein the host system comprises a message server system.

15. The system of claim 14, wherein the message server system is implemented in a secure network behind a network security firewall.

16. The system of claim 13, wherein the host system comprises a desktop computer system or a laptop computer system.

17. The system of claim 13, wherein a network operator infrastructure enables wireless information exchange between the host system and wireless mobile communication devices.

18. A system for reducing size of an encrypted message at a host system before the encrypted message is transmitted to a wireless mobile communication device, said system comprising:
    means for receiving at the host system the encrypted message from a message sender addressed to first and second message receivers, the encrypted message including an encrypted message body and an encrypted session key for each of the message receivers; and
    means for generating at the host system a first reduced size encrypted message that contains the encrypted message body and the encrypted session key for the first message receiver, the first reduced size encrypted message not including the encrypted session key for the second message receiver;
    wherein the encrypted session keys were encrypted via public keys, and
    wherein different electronic security messaging approaches are used to encrypt messages sent to the host system.

19. A wireless device comprising memory for storing a first reduced size encrypted message, wherein the first reduced size encrypted message was generated by a remote system based upon an encrypted message provided to the remote system from a message sender, said encrypted message from the message sender having contained addresses to first and second message receivers, the encrypted message including an encrypted message body and an encrypted session key for each of the message receivers, wherein the first reduced size encrypted message contains the encrypted message body and the encrypted session key for the first message receiver, the first reduced size encrypted message sent by the remote system to the wireless device not including the encrypted session key for the second message receiver, wherein the encrypted session keys were encrypted via public keys.

20. The wireless device of claim 19 wherein the wireless device has an association with the first message receiver, said association indicating that the wireless device is to receive messages sent to the first message receiver.

21. The wireless device of claim 19 wherein the remote system comprises host system means.

22. The wireless device of claim 19 wherein the host system means comprises wireless connection system means.

23. A method of processing an encoded message at a host system before the encoded message is transmitted to a wireless mobile communication device, the method comprising:

receiving at the host system the encoded message from a message sender addressed to a plurality of message receivers;

wherein at least a portion of the encoded message were encoded via electronic asymmetric security keys that are electronically available from different companies over a network to which the host system is connected;

determining whether any of the message receivers has a corresponding wireless mobile communication device; and for each message receiver that has a corresponding wireless mobile communication device:

processing the encoded message so as to modify the encoded message with respect to an encoding aspect, said encoding aspect being, selected from the group consisting of an encryption aspect, an authentication aspect, and a combination thereof.

\* \* \* \* \*